US012775297B2

(12) United States Patent
Zhang et al.

(10) Patent No.: US 12,775,297 B2
(45) Date of Patent: Oct. 27, 2026

(54) ULTRA-THIN VOLTAGE REGULATOR MODULE WITH HIGH CURRENT DENSITY AND INDUCTOR ASSEMBLY

(71) Applicant: MetaPWR Electronics Co., Ltd., Shanghai (CN)

(72) Inventors: Mingzhun Zhang, Shanghai (CN); Qingdong Chen, Shanghai (CN); Xiaoni Xin, Shanghai (CN); Jianhong Zeng, Shanghai (CN)

(73) Assignee: MetaPWR Electronics Co., Ltd., Shanghai (CN)

( * ) Notice: Subject to any disclaimer, the term of this patent is extended or adjusted under 35 U.S.C. 154(b) by 212 days.

(21) Appl. No.: 18/670,734

(22) Filed: May 22, 2024

(65) Prior Publication Data

US 2024/0393815 A1 Nov. 28, 2024

(30) Foreign Application Priority Data

May 23, 2023 (CN) ........................ 202310586288.4

(51) Int. Cl.

| | |
|---|---|
| ***G05F 1/33*** | (2006.01) |
| ***H01F 27/24*** | (2006.01) |
| ***H01F 27/28*** | (2006.01) |
| ***H01F 27/38*** | (2006.01) |

(52) U.S. Cl.

CPC ............... *G05F 1/33* (2013.01); *H01F 27/24* (2013.01); *H01F 27/2804* (2013.01); *H01F 27/38* (2013.01)

(58) Field of Classification Search

CPC .... H02M 3/156; H02M 3/158; H02M 3/1588; H02M 3/155; H02M 3/1582; H02M 3/157; H02M 3/1563; H02M 3/1584

See application file for complete search history.

(56) References Cited

U.S. PATENT DOCUMENTS

| | | | | |
|---|---|---|---|---|
| 2021/0159797 A1* | 5/2021 | Kaneko | ............... | H02M 1/0048 |
| 2022/0285087 A1* | 9/2022 | Zhang | ..................... | H01F 17/04 |

* cited by examiner

*Primary Examiner* — Bryan R Perez

(74) *Attorney, Agent, or Firm* — JCIPRNET

(57) ABSTRACT

An ultra-thin voltage regulator module with high current density and an inductor assembly are described. The ultra-thin voltage regulator module comprising at least one inductor assembly, at least one top assembly and a power electrical connection assembly, wherein the inductor assembly is a 2N-phase ultra-thin inductor; the inductor assembly comprises a magnetic core and an inductor winding; the shape of the inductor winding is specifically I-shaped; the power electrical connection assembly comprises a first power electrical connector and a second power electrical connector; the top assembly comprises a top plate and an IPM unit, and the SW end of the IPM unit is perpendicular to the position of the inductor winding.

36 Claims, 54 Drawing Sheets

ULTRA-THIN VOLTAGE REGULATOR MODULE WITH HIGH CURRENT DENSITY AND INDUCTOR ASSEMBLY

CROSS-REFERENCE TO RELATED APPLICATIONS

This application claims the priority benefit of Chinese application serial no. 202310586288.4, filed on May 23, 2023. The entirety of the above-mentioned patent application is hereby incorporated by reference herein and made a part of this specification.

BACKGROUND

In recent years, with the development of technologies such as data centers, artificial intelligence, supercomputers, and the like, more and more powerful ASICs are applied, such as CPUs, GPUs, machine learning accelerators, network switches, servers, and the like, which consume a large amount of current, for example, reach thousands of amps, and their current needs to jump rapidly. This load is traditionally supplied by using a voltage regulator module (VRM, Voltage Regulator Modules) composed of multiphase buck circuits (Buck).

With the progress of semiconductor technology, the voltages of these loads become lower and lower, and now have been as low as 0.65V, while the current of the load continues to increase, how to improve efficiency in the VRM module of a low-voltage large current, and improve the power density to meet an ASIC requirement, which is also a core problem designed by the VRM module;

As the load current continues to increase, the heat dissipation problem of the VRM module is also a key problem that needs to be considered. At present, in order to share a radiator with a load ASIC, the VRM module implements a small thermal resistance upward on the top surface, and a switch device as a heat source is disposed on the top surface, and the filter inductor is disposed on the bottom surface. The input power current and the control signal need to be transmitted from the main board of the bottom surface to the switch device on the top surface, and signals such as current sampling data and temperature sampling in the working state of the top switch device need to be transmitted from the top surface to the main board of the bottom surface; therefore, in the longitudinal current transmission architecture, the height of the voltage regulator module is reduced as much as possible, on one hand, the impedance loss can be reduced, and on the other hand, heat dissipation is facilitated. How to make the current density of the voltage regulator module as high as possible and the height as small as possible is an urgent problem to be solved.

SUMMARY

The application provides an ultra-thin voltage regulator module with high current density, which is a series of large-current ultra-thin VRM module structures and an inductor structure provided after various factors influencing the efficiency are fully considered, and a cylindrical winding shape is adopted to avoid occupying the volume of the magnetic core in the transverse detour section and reduce the transmission impedance, so that the VRM module has high efficiency, high current density, high integration level, high reliability and high manufacturability.

An ultra-thin voltage regulator module with high current density, comprising at least one inductor assembly and at least one top assembly, wherein the inductor assembly is a 2N-phase ultra-thin inductor, and N is a positive integer;

- wherein the inductor assembly comprises a magnetic core and an inductor winding, and the number of the inductor windings is at least the number of phases of the inductor assembly; the shape of the inductor winding is specifically an I-shaped or horizontal detour n shape;
- at least one power electrical connection assembly is embedded in the inductor assembly, and/or at least one power electric connection assembly is arranged on at least one side of the inductor assembly;
- wherein the power electric connection assembly comprises a first power electrical connector and a second power electrical connector, and the top ends of the first power electrical connector and the second power electrical connector are electrically connected with the top assembly respectively;
- wherein the top assembly comprises a top plate and an IPM unit, the number of the IPM units is at least the total phase number of the inductor assembly, the SW end of the IPM unit is vertically corresponding to the position of the inductor winding, and the SW end is electrically connected with the top of the inductor winding.

Preferably, the ultra-thin voltage regulator module further comprising a vertical plate and a signal electrical connector arranged in the vertical plate, wherein the vertical plate is arranged on at least one side of the inductor assembly, and a signal shielding layer is arranged on the side, facing the inductor assembly, of the vertical plate.

Preferably, the ultra-thin voltage regulator module further comprising a control assembly, wherein the control assembly is arranged on the vertical plate or in the vertical plate, and the control assembly controls the IPM unit.

Preferably, wherein the inductor assembly has a first side surface and a third side surface opposite to each other, the third side surface is provided with a signal electrical connector, the distance between the inductor winding and the first side surface is less than the distance between the inductor winding and the third side surface, and the top end of the signal electrical connector is electrically connected to the top component.

Preferably, wherein the inductor assembly is in a mirror symmetry shape, one symmetrical surface of the inductor assembly is a first symmetric surface, the inductor assembly is provided with a first side surface and a third side surface which are parallel to the first symmetric surface, signal electrical connectors are arranged on the first side surface and the third side surface, and the distance between the inductor winding and the first symmetric surface is smaller than the distance between the inductor winding and the first side surface or the third side surface.

Preferably, wherein the signal electrical connector comprises an analog signal electrical connector, and the at least one first power electrical connector or the at least one second power electrical connector is disposed at a position inside the magnetic core adjacent to the analog signal electrical connector.

Preferably, further comprising a bottom assembly, the bottom assembly being arranged at the bottom of the inductor assembly and electrically connected to the inductor assembly, and the bottom assembly being used for wiring when the ultra-thin voltage regulator module is electrically connected to an external load.

Preferably, wherein the bottom assembly comprises a bottom plate, a bottom capacitor and a bottom metal column, the bottom capacitor and the bottom metal column are arranged on the bottom plate, a spacing area used for containing a bottom capacitor is arranged between the top surface of the bottom plate and the bottom surface of the inductor assembly, and the two ends of the bottom metal column are electrically connected with the bottom plate and the inductor assembly respectively.

Preferably, wherein the bottom assembly comprises a bottom plate and a bottom capacitor arranged on the bottom plate, a spacing area used for containing a bottom capacitor is arranged between the top face of the bottom plate and the bottom surface of the inductor assembly, and the lower end of the inductor winding and the lower end of the power electrical connector assembly protrude downwards to the bottom surface of the inductor assembly and extend to the bottom plate.

Preferably, wherein the inductor assembly is provided with a first side surface and a third side surface which are opposite to each other, and the bottom assembly comprises a bottom plate and a bottom capacitor arranged on the bottom plate;

wherein the bottom of the inductor assembly is provided with a step protruding part at the side edge of the third side surface, a signal electrical connector is arranged on the third side surface, the top end and the bottom end of the signal electrical connector are electrically connected with the top assembly and the bottom plate respectively, and a spacing area used for containing a bottom capacitor is formed between the non-step protruding part at the bottom of the inductor assembly and the bottom plate.

Preferably, wherein the interval area is filled with a plastic package material.

Preferably, wherein the at least one power electrical connection assembly comprises a plurality of first power electrical connectors and a plurality of second power electrical connectors which are alternately arranged in an array.

Preferably, wherein the magnetic core comprises a first magnetic material area and a second material area, the magnetic conductivity of the second material area is smaller than that of the first magnetic material area, the inductor winding is arranged in the first magnetic material area, and the at least one power electric connection assembly is arranged in the second material area.

Preferably, wherein at least one first power electrical connector and at least one second power electrical connector form a first input power loop, and the first input power loop is arranged around at least a portion of the magnetic core;

at least one first power electrical connector and the at least one second power electrical connector form a second input power loop, and the first power electrical connector and the second power electrical connector forming the second input power loop are disposed adjacent to at least one side of the magnetic core in pairs;

a first power electrical connector in the first input power loop and a first power electrical connector in the second input power loop are connected in parallel;

a second power electrical connector in the first input power loop and a second power electrical connector in the second input power loop are connected in parallel.

Preferably, wherein the magnetic core has a first side surface and a third side surface opposite to each other, and the magnetic core further has a second side surface and a fourth side surface which are respectively adjacent to the third side surface;

a second power electrical connector in the first input power loop is disposed on the second side and/or the fourth side;

a first power electrical connector in the first input power loop is disposed on the third side and/or within the magnetic core.

Preferably, further comprising a vertical plate and a signal electrical connector arranged in the vertical plate, the vertical plate is arranged on at least one side of the inductor assembly, and a signal shielding layer is arranged on the side, facing the inductor assembly, of the vertical plate;

wherein the signal electrical connector and the first power electrical connector and the second power electrical connector forming the second input power loop are jointly arranged in the vertical plate in an array mode.

Preferably, wherein the shape of the inductor winding is specifically a horizontally detour zigzag shape, and the two ends of the inductor winding are exposed out of the first side surface of the magnetic core.

Preferably, further comprising an intermediate PCB. The inductor assembly is embedded in the intermediate PCB. The inductor assembly is electrically connected to an upper surface and a lower surface of the intermediate PCB by means of a blind hole electrical connector provided in the intermediate PCB. The upper surface of the intermediate PCB is electrically connected to the top assembly.

Preferably, wherein the inductor winding is specifically I-shaped;

wherein the cross section of the inductor winding is one of a rectangle, a rounded rectangle, an oval and a runway shape, or the end face of the inductor winding extends into one of a rectangle, a rounded rectangle, an ellipse and a runway shape;

one end face of each inductor winding is electrically connected with a plurality of blind hole electrical connectors arranged in an array.

Preferably, wherein at least a part of the first power electrical connector and at least a part of the second power electrical connector are arranged in a through hole of the intermediate PCB, and the first power electrical connector and the second power electrical connector are alternately arranged in an array.

Preferably, a signal electrical connection through hole is used for signal electrical connection is further formed in the intermediate PCB.

Preferably, wherein the magnetic core is formed by laminating a sheet-shaped magnetic material or a strip-shaped magnetic material.

Preferably, wherein the sheet-shaped magnetic material or the strip-shaped magnetic material is a material with high magnetic permeability and high saturation magnetic flux density, the magnetic core is provided with an air gap, and the air gap is arranged at a position avoiding the power electrical connection assembly.

Preferably, further comprising a cylindrical auxiliary winding, wherein the number of the cylindrical auxiliary windings corresponds to the inductor winding, and each cylindrical auxiliary winding is arranged adjacent to the corresponding inductor winding;

wherein the auxiliary winding is connected in series through a auxiliary winding electrical connector to form a TLVR loop.

Preferably, wherein a third material area is arranged between the cylindrical auxiliary winding and the corresponding inductor winding;

wherein the third material region is an insulating non-magnetic conductive material, or the third material region is a material that is insulated and has a magnetic permeability of less than 10.

Preferably, wherein the top assembly further comprises a top capacitor, and at least a part of the top capacitor is arranged around the IPM unit.

Preferably, wherein the top assembly further comprises a plastic package body, and the plastic package body covers the IPM unit, the top capacitor and the upper surface of the top plate.

Preferably, wherein the height of the ultra-thin voltage regulator module is less than 6 mm.

An inductor assembly, comprising a magnetic core and an inductor winding, wherein the inductor assembly is a 2N-phase ultra-thin inductor, and N is a positive integer;

wherein the number of the inductor windings is at least the number of phases of the inductor assembly; the shape of the inductor winding is specifically an I-shaped or horizontal detour n shape;

at least one power electrical connection assembly is embedded in the inductor assembly, and/or at least one power electric connection assembly is arranged on at least one side of the inductor assembly;

wherein the power electric connection assembly comprises a first power electrical connector and a second power electrical connector, and the ends of the first power electrical connector and the second power electrical connector are electrically connected with some other assemblies respectively;

Preferably, wherein the inductor assembly has a first side surface and a third side surface opposite to each other, the third side surface is provided with a signal electrical connector, the distance between the inductor winding and the first side surface is less than the distance between the inductor winding and the third side surface, and the ends of the signal electrical connector is electrically connected to some other components.

Preferably, wherein the inductor assembly is in a mirror symmetry shape, one symmetrical surface of the inductor assembly is a first symmetric surface, the inductor assembly is provided with a first side surface and a third side surface which are parallel to the first symmetric surface, signal electrical connectors are arranged on the first side surface and the third side surface, and the distance between the inductor winding and the first symmetric surface is smaller than the distance between the inductor winding and the first side surface or the third side surface.

Preferably, wherein the magnetic core comprises a first magnetic material area and a second material area, the magnetic conductivity of the second material area is smaller than that of the first magnetic material area, the inductor winding is arranged in the first magnetic material area, and the at least one power electric connection assembly is arranged in the second material area.

Preferably, wherein the magnetic core is formed by laminating a sheet-shaped magnetic material or a strip-shaped magnetic material; The sheet-shaped magnetic material or the strip-shaped magnetic material is a material with high magnetic permeability and high saturation magnetic flux density, the magnetic core is provided with an air gap, and the air gap is arranged at a position avoiding the power electrical connection assembly.

Preferably, further comprising a cylindrical auxiliary winding, wherein the number of the cylindrical auxiliary windings corresponds to the inductor winding, and each cylindrical auxiliary winding is arranged adjacent to the corresponding inductor winding;

wherein the auxiliary winding is connected in series through a auxiliary winding electrical connector to form a TLVR loop;

wherein a third material area is arranged between the cylindrical auxiliary winding and the corresponding inductor winding;

wherein the third material region is an insulating non-magnetic conductive material, or the third material region is a material that is insulated and has a magnetic permeability of less than 10.

Preferably, wherein the inductor assembly is embedded in a intermediate PCB; The inductor assembly is electrically connected to an upper surface and a lower surface of the intermediate PCB by means of a blind hole electrical connector provided in the intermediate PCB;

wherein one end face of each inductor winding is electrically connected with a plurality of blind hole electrical connectors arranged in an array;

wherein at least a part of the first power electrical connector and at least a part of the second power electrical connector are arranged in a through hole of the intermediate PCB, and the first power electrical connector and the second power electrical connector are alternately arranged in an array.

The beneficial effects of the application include:

1) According to the application, the connection path between the inductance winding and the switching device and the path between the winding and the connection path between the winding and the load are all perpendicular to each other, so that the path is shortest, the impedance of the power path is reduced, the direct current loss is greatly reduced, and the efficiency of the VRM module, especially the efficiency under heavy load, is improved;
2) The I-shaped inductance winding does not have a transverse detour section, more space is reserved for the magnetic core, the magnetic flux generated by the current in the inductance winding of the cylinder has the shortest flux path, the loss of the magnetic core is reduced, the efficiency of the VRM module under the light load is improved, the n-shaped inductance can be improved under the condition that the inductance height is not increased, the ripple current is reduced, the alternating current loss of the switching device is reduced, and the high-frequency performance of the VRM module is improved;
3) According to the application, the power input loop with different parasitic inductance is arranged, so that the resonant frequency can be improved/reduced to avoid the influence of resonance on the VRM module, meanwhile, the overall impedance of the power input loop is reduced through mutual supplement of the resonant frequency and the resonant frequency, and the working performance of the VRM module is improved;
4) According to the application, the inductor assembly is embedded in the middle PCB, the PCB process can be used for manufacturing the power electrical connecting assembly and the signal electrical connector, the difficulty of high-density integrated electrical connector can be reduced, so that the parasitic inductance of the VIN-GND power input loop is smaller, and the loss and the lifting efficiency are further reduced.

DETAILED DESCRIPTION

Figure 1A:
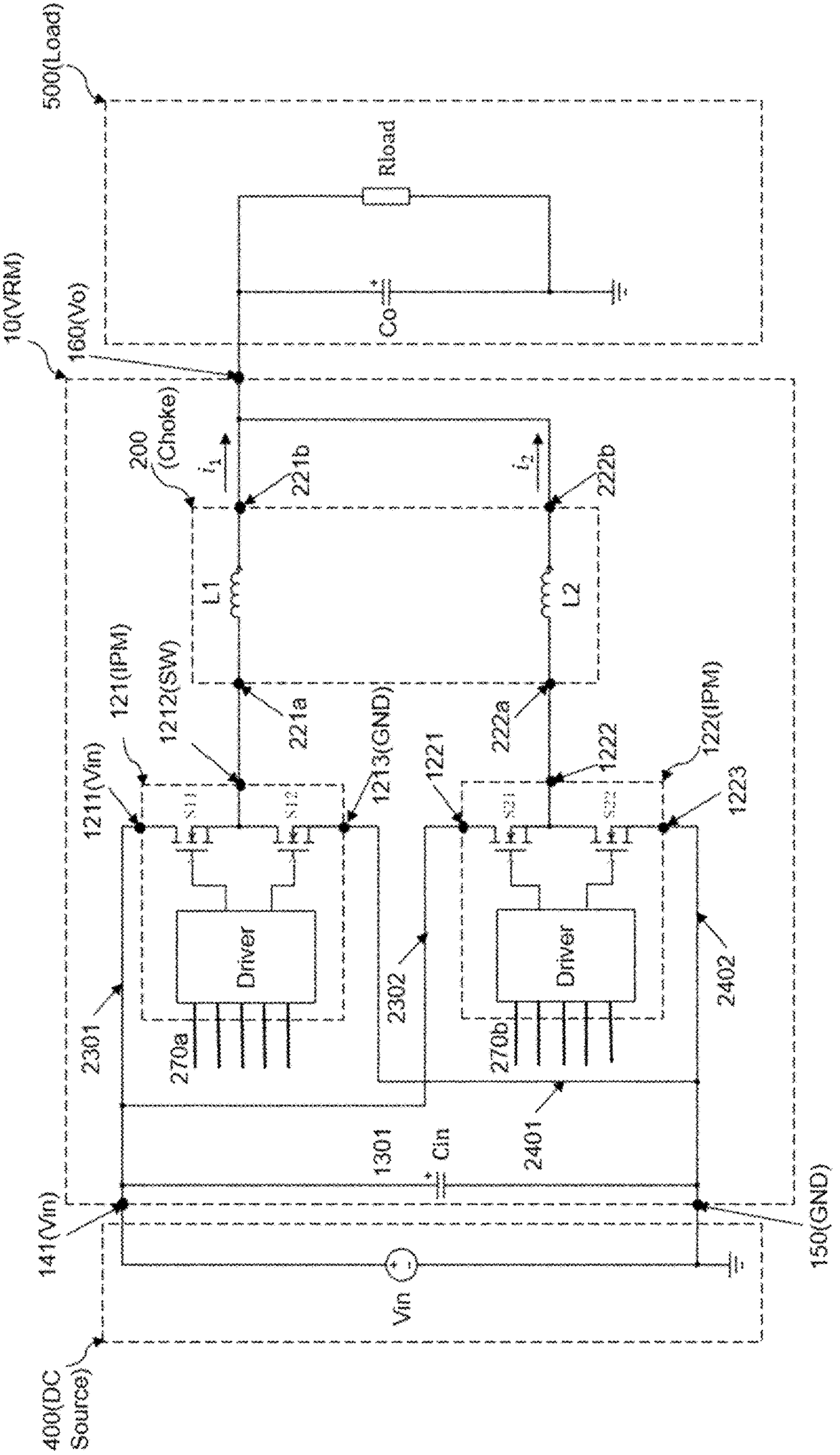
FIG. 1A and FIG. 1B are schematic diagrams of a two-phase VRM module in the prior art.

The present application discloses various embodiments or examples of implementing the thematic technological schemes mentioned. To simplify the disclosure, specific instances of each element and arrangement are described below. However, these are merely examples and do not limit the scope of protection of this application. For instance, a first feature recorded subsequently in the specification formed above or on top of a second feature may include an embodiment where the first and second features are formed through direct contact, or it may include an embodiment where additional features are formed between the first and second features, allowing the first and second features not to be directly connected. Additionally, these disclosures may repeat reference numerals and/or letters in different examples. This repetition is for brevity and clarity and does not imply a relationship between the discussed embodiments and/or structures. Furthermore, when a first element is described as being connected or combined with a second element, this includes embodiments where the first and second elements are directly connected or combined with each other, as well as embodiments where one or more intervening elements are introduced to indirectly connect or combine the first and second elements.

As shown in FIG. 1A, a complete two-phase VRM module 10 in the prior art comprises an IPM unit 121, an IPM unit 122 and an intermediate assembly 200 (the windings in the two-phase VRM module can be coupled or not coupled), and the VIN electrical connector 2301 and the VIN electrical connector 2302 on the input side are connected in parallel and then connected to the positive end of the input power supply, namely the input voltage end VIN 141; the GND electrical connector 2401 and the GND electrical connector 2402 of the input side grounding PIN are connected in parallel and then connected to the negative end of the input power supply, namely the grounding end GND 150. The input capacitor 1301 is bridged between the positive end of the input power supply and the negative end of the input power supply. The signal electrical connector **270*a* and the signal electrical connector 270*b* are connected to the exterior of the two-phase VRM module. The IPM units 121/122 each comprise two semiconductor switch devices and a driver (Driver), the two switch devices are respectively a high-end MOSFET and a low-end MOSFET, and the two MOSFETs are connected in series to form a bridge arm. One end of the bridge arm is connected with the positive end of the input power supply, namely the input voltage end VIN 141, the other end of the bridge arm is connected with the grounding end, namely the grounding end GND 150. That is, the voltage waveform phase shift of the midpoint 1212/1222 (the switch point, denoted as SW) meets 180 degrees and is connected to the input ends of the two-phase inductor respectively, and the output ends of the inductors are connected with the load after being connected in parallel or not in parallel to provide energy for the load. The output capacitor Co is connected in parallel at two ends of the load and is used for filtering the voltage at the two ends of the load and providing transient energy required by the load. The output capacitor Co can be arranged outside or inside the two-phase VRM module. The input capacitor is used for bypassing the ripple current of the high-frequency switch and ensuring the stability of the input voltage. The signal electrical connector 270*a*/270*b* is used for transmission of signals such as driving and control of the IPM unit 121/122**.

Figure 1B:
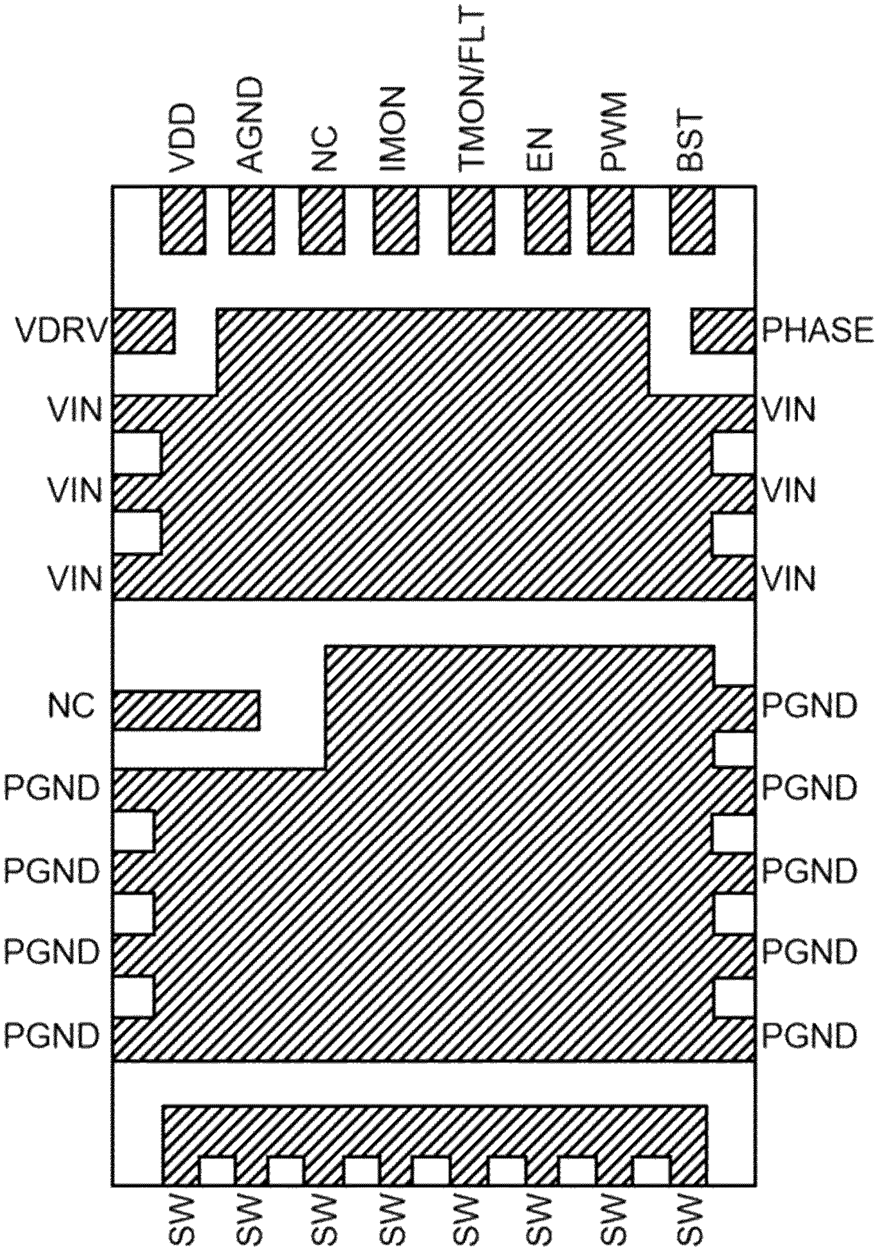

FIG. 1B is a schematic diagram of pins of a standard package of the IPM unit 121/122 in FIG. 1A, the SW end is arranged at one end of the IPM unit, and the connecting end of the control signal is arranged at the other end opposite to the SW; and the connecting end of the VIN electrical connector and the GND electrical connector is sequentially arranged in the middle.

Embodiment 1

Figure 2A:
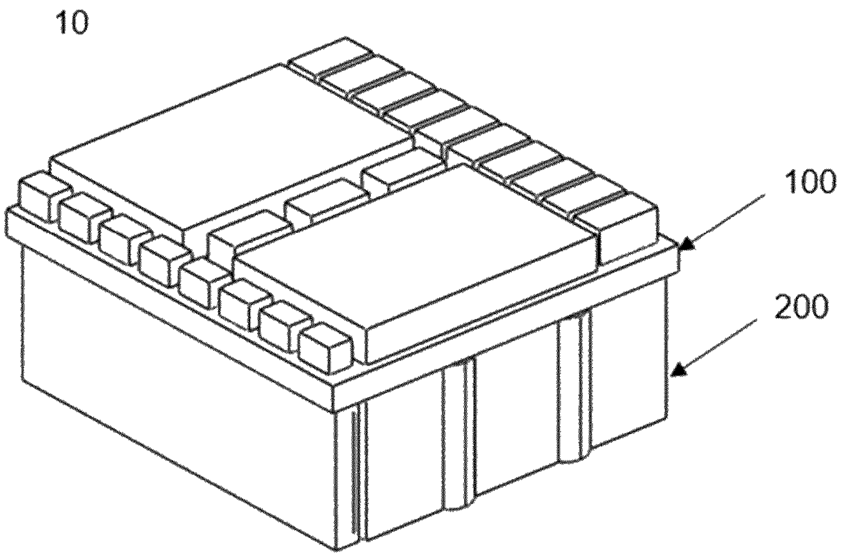
FIG. 2A to FIG. 2I are schematic diagrams of Embodiment 1.
Figure 2B:
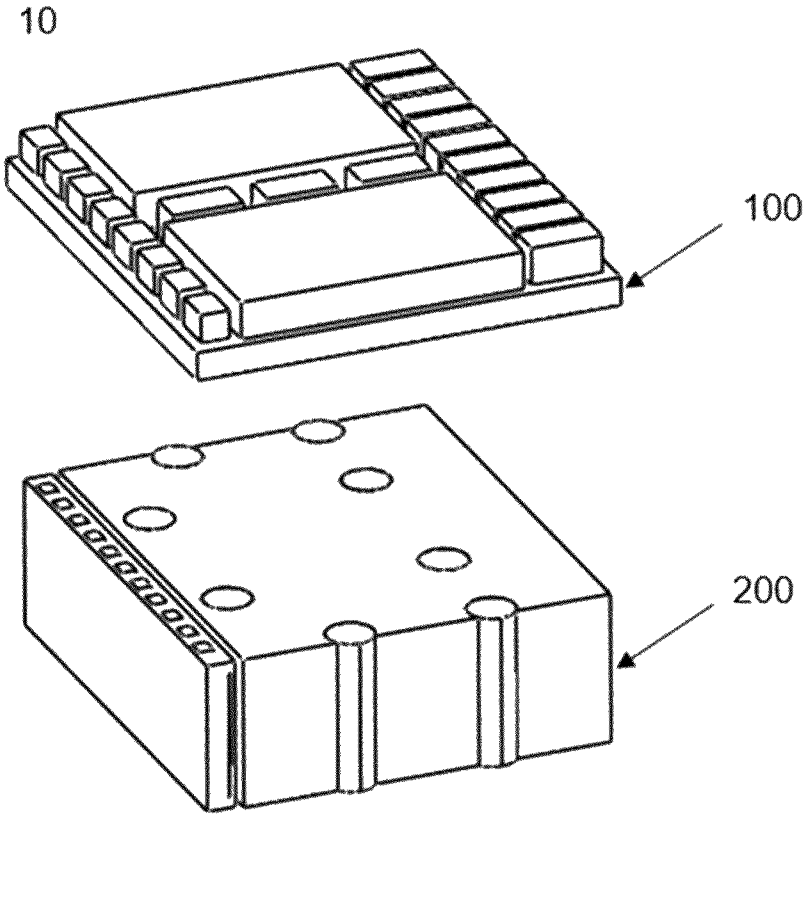
Figure 2C:
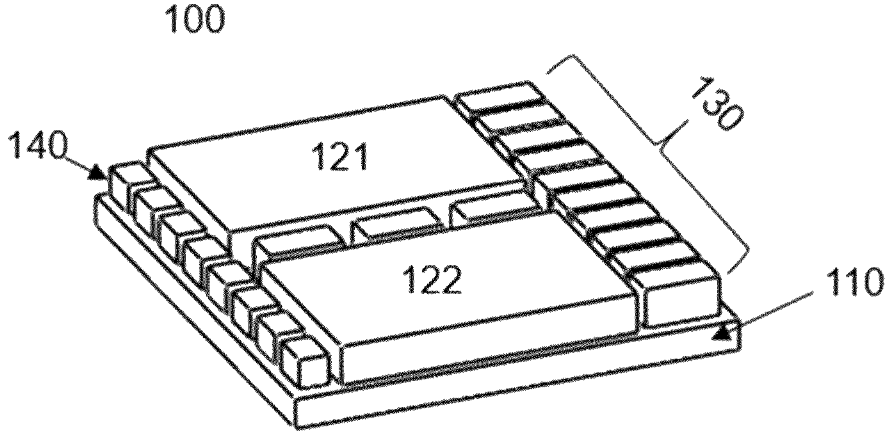
Figure 2D:
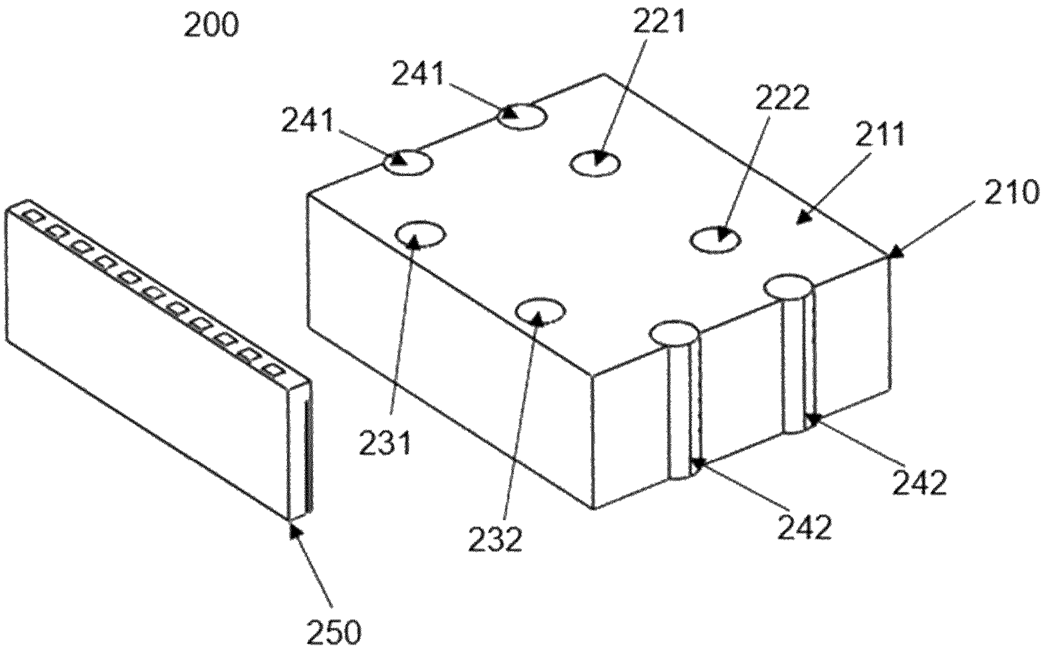
Figure 2E:
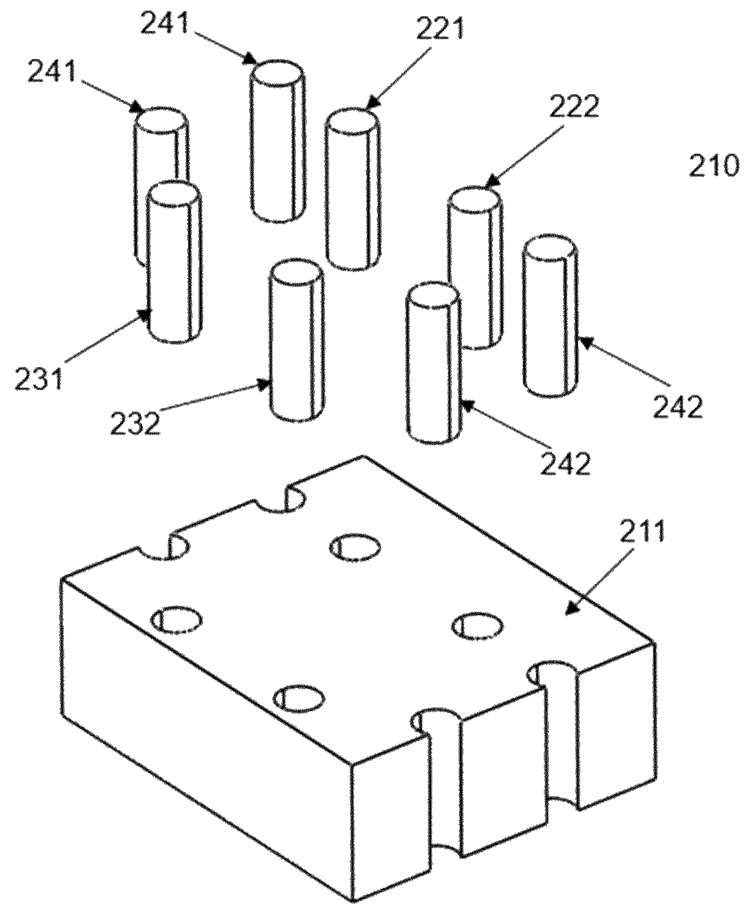
Figure 2F:
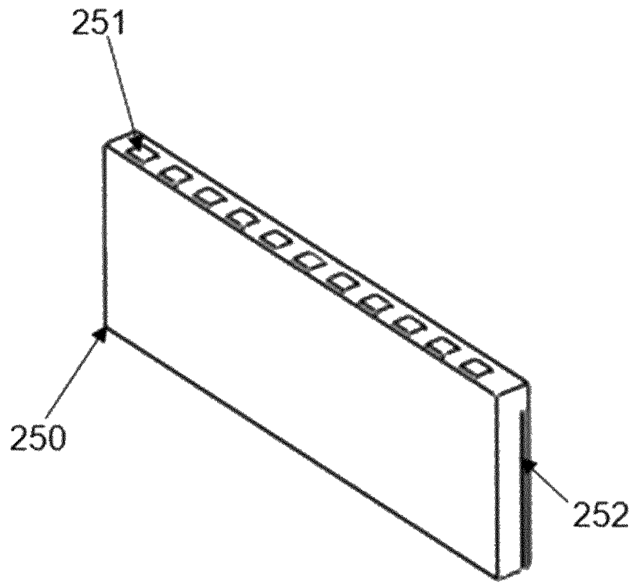

The two-phase VRM module is taken as an example to show the main technical scheme of the embodiment of the application. FIG. 2A is a schematic structural diagram of a two-phase VRM module in the embodiment. FIG. 2B is an exploded view of FIG. 2A. FIG. 2C is a schematic structural diagram of the top assembly 100 in FIG. 2B. FIG. 2D is a structural exploded view of the intermediate assembly 200 in FIG. 2B. FIG. 2E is a structural exploded view of the inductor assembly 210 in FIG. 2D. FIG. 2F is a schematic structural diagram of the vertical plate 250 in FIG. 2D. As shown in FIG. 2A to 2C, the VRM module comprises a top assembly 100 and an intermediate assembly 200. The top assembly 100 comprises a top plate 110, an IPM unit 121, a PM unit 122, an input capacitor 130, and other passive elements 140. The IPM units 121 and 122 are arranged in the middle of the top plate 110. Due to the fact that the connection points of the high-end MOSFET and the low-end MOSFET are arranged at the edge of the IPM unit 121/122. The IPM unit 121/122 is arranged in the middle of the top plate 110, so that the input end of the inductor assembly is directly connected with the SW end of the IPM unit 121/122, and the efficiency loss caused by transverse current is reduced. The other passive element 140 is mainly a passive element of a control signal loop of the IPM unit 121/122; and the control signal of the IPM unit 121/122 is arranged at the other opposite end of the SW end, so that the passive element needs to be close to the IPM unit to achieve good filtering and other effects, and therefore the other passive elements 140 are arranged close to the IPM unit 121/122. The input capacitor is divided into two parts, one part is arranged on the edge of the other end of the top plate 110 and is close to one side of the SW pad of the IPM unit; the other part of the input capacitors is arranged between the two IPM units 121/122; because the input capacitor is closer to the VIN input end of the IPM unit, the better the filtering effect is, and the VIN input end on the IPM unit is arranged on the side close to the control signal.

As shown in FIG. 2D to FIG. 2F, the intermediate assembly 200 comprises an inductor assembly 210 and a vertical plate 250. The inductor assembly 210 comprises a magnetic core 211, a first winding 221 and a second winding 222. The inductor assembly 210 also integrates a power electrical connection assembly;

The first winding 221 and the second winding 222 of the inductor assembly 210 are both inductor windings, and specifically, the I-shaped copper column (I-shaped refers to a shape with no transverse detour section penetrating from the top to the bottom, and comprises an I shape without a lining line, and a shape with two ends extending out of the end face of the larger cross section, that is, the I-shape of the lining line. The I-shape do not limit the shape of the cross section, the cross section of the inductor winding in the embodiment is circular), and the two ends of the inductor winding are respectively provided with the bonding pad on the top surface and the bottom surface of the inductor assembly 210. The I-shaped copper column winding is low in direct current impedance and low in direct current conduction loss, can effectively improve the efficiency, and is particularly beneficial to improving the efficiency under heavy load. Meanwhile, the cylindrical winding enables the magnetic flux generated by the current in the cylindrical winding to have the shortest magnetic flux path, which is beneficial to improving the inductance and reducing the loss of the magnetic core 211. Therefore, the efficiency under light load is improved. Therefore, the inductance structure of the embodiment is suitable for the high-current density and ultra-thin VRM module structure.

The first winding 221 is provided with a first bonding pad on the top surface of the magnetic core 211, and is used for connecting the SW Pad of the IPM unit 121. The second winding 222 is provided with a first bonding pad on the top surface of the magnetic core 211 and used for connecting the SW Pad of the IPM unit 122. The first winding 221 is provided with a second bonding pad on the bottom surface of the magnetic core 211 and is used for being connected with an external load and supplying power to an external load. The second winding 222 is provided with a second bonding pad on the bottom surface of the magnetic core 211 and used for being connected with an external load and supplying power to an external load. The winding of the inductor assembly 210 is directly and vertically connected or nearby connected with the SW Pad of the IPM unit 121/122 on the mainboard, and the efficiency loss caused by transverse current is reduced. (The pad is not shown in the figures)

In the embodiment, the power electrical connection assembly comprises a first power electrical connector and a second power electrical connector. The first power electrical connector and the second power electrical connector are both I-shaped round copper columns and are the same as the windings. The direct current impedance of the power electrical connection assembly is low, the direct current conduction loss of the power electrical connection assembly is low, and the efficiency is improved. The winding of the power electric connecting assembly and the winding of the magnetic core 211 are both I-shaped round copper columns, the power electrical connection assembly and the magnetic core 211 are easy to integrally form, the manufacturing process is simplified, and the reliability is improved.

The first power electrical connector is a VIN electrical connector 231/232 (functioning as a corresponding VIN electrical connector 2301/2302 in FIG. 1). The second power electrical connector is a GND electrical connector 241/242 (functioning as a GND electrical connector 2401/2402 in FIG. 1). A first bonding pad is arranged on the top surface of the VIN electrical connector 231/232, and a second bonding pad is arranged on the bottom surface. A first bonding pad is arranged on the top surface of the GND electrical connector 241/242, and a second bonding pad is arranged on the bottom surface of the GND electrical connector 241/242. (The pad is not shown in the figures)

A parasitic inductance exists in a loop formed by the first power electrical connector, the IPM unit and the second power electrical connector. The existence of the parasitic inductance can resonant with the input capacitance. When the resonant frequency of the resonance is close to the equivalent switching frequency of the VRM (if the PWM phases of the IPM units 121 and 122 are the same, the equivalent working frequency of the two-phase VRM is equal to the switching frequency of the IPM; and if the PWM phases of the IPM units 121 and 122 differ by 180 degrees, the equivalent working frequency is equal to twice the switching frequency of the IPM unit), the current amplitude of the parasitic inductor is increased, the normal work of the VRM module is interfered, and the efficiency of the power circuit is reduced. In the embodiment, part of the power electrical connection assembly is arranged in the magnetic core 211, so that the parasitic inductance of the input loop is large, the two VIN electrical connector 231/232 are arranged in the embodiment, and the two VIN electrical connector 231/232 are connected in parallel on the top surface and the bottom surface of the intermediate assembly 200. Comparing with setting one VIN electrical connector, the parasitic inductance of the input loop is lower due to the fact that the two VIN electrical connectors 231/232 are arranged, so that the adjustment flexibility of the parasitic inductance of the input loop is increased. The resonant frequency between the parasitic inductor and the input capacitor is moderate in value, and is in an interval of [½,1] of the equivalent switching frequency of the two-phase VRM module (in some embodiments, the resonant frequency can also be in one-third time to one-time interval). The influence of resonance on the efficiency of the VRM module is reduced, the efficiency is improved. When the load is dynamic, the influence of the inductance of the input parasitic loop on the stability of the voltage at the two ends of the load is reduced. The second power electrical connection assembly (GND electrical connector 241/242) is formed by connecting two I-shaped copper columns in parallel, so that the purpose of the above setting is to reduce the direct current impedance of the second power electrical connector and improve the efficiency.

As shown in FIG. 2F, the vertical plate 250 comprises a signal electrical connector 251 and a signal shielding layer 252. The signal electrical connector 251 is used for signal transmission between the top plate and the bottom plate. A certain face-to-face area is arranged between the signal electrical connector 251 and the inductor winding, so that a parasitic capacitance exists between the signal electrical connector 251 and the inductor winding. Because the switching frequency is high, the voltage change rate on the inductor winding is large. The rapidly changing voltage on the inductor winding is coupled to the signal electrical connector 251 through the parasitic capacitor, so that the signal electrical connector 251 has electric field interference. As shown in FIG. 2F, a signal shielding layer 252 is arranged on the vertical plate 250. The signal shielding layer 252 is arranged between the signal electrical connector 251 and the magnetic core 211 body and is electrically connected with the GND electrical connector 241/242, so that shielding of electromagnetic interference is realized. It is ensured that the signal electrical connector 251 is not subjected to electromagnetic interference, and reliable work of the IPM unit is ensured; and details such as the structural shape and the grounding form of the signal shielding layer 252 are not shown.

In the embodiment, the VIN electrical connector 231/232 and the GND electrical connector 241/242 are sintered together with the magnetic core 211 through the metal copper column. In other embodiments, the metal copper sheet and the magnetic core 211 can also be assembled together; in some embodiments, the power electrical connection assembly may also be implemented by means of a plurality of vertical PCBs or through holes of a PCB process; in some embodiments, the PCB may also be a flexible PCB having a certain bending capability.

Figure 2G:
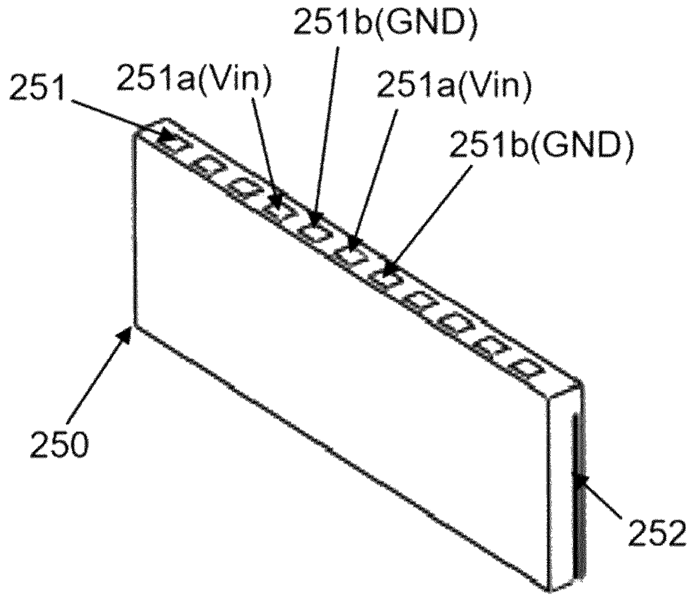

In a preferred embodiment, as shown in FIG. 2G, the signal electrical connector 251, the VIN electrical connector 251*a* and the GND electrical connector 251*b* are arranged in a common array in the vertical plate 250, and the VIN electrical connector 251*a* and the GND electrical connector 251*b* may have only one pair or multiple pairs of alternating arrays. The VIN electrical connector 251*a* and the VIN electrical connector 231/232 are connected in parallel. The GND electrical connector 251*b* and the GND electrical connector 241/242 are also connected in parallel. Different from a first power input loop formed by a VIN electrical connector 231/232 and a GND electrical connector 241/242, the parasitic inductance of the second power input loop formed by the VIN electrical connector 251*a* and the GND electrical connector 251*b* is small. By improving the resonant frequency between the VIN electrical connector 251*a* and the input capacitor CIN to be much higher than the equivalent working frequency of the two-phase VRM module, the influence of resonance on the efficiency of the VRM module is reduced.

Specifically, due to the fact that the loop area of the second power input loop is small, the parasitic inductance is small, the alternating current impedance is small, but the cross section area of the second power input loop is far smaller than that of the power electrical connector integrated on the magnetic core 211, so that the direct current impedance is large. The first power input loop integrated on the magnetic core has a large parasitic inductance and a high alternating current impedance, but the direct current impedance is low. Because the current always tends to flow in the low-impedance loop, the direct current component of the current tends to flow in the first power input loop, and the high-frequency alternating current component of the current tends to flow in the second power input loop. In the second power input loop, VIN and GND in the VIN electrical connector 251*a* and the GND electrical connector 251*b* are arranged more closely or in a staggered manner or the VIN and the GND in the vertical board are arranged adjacent to each other, so that the second power input loop has a lower parasitic inductance, so that the resonant frequency between the input parasitic inductance of the second power input loop and the input capacitor Cin is far higher than the equivalent working frequency of the two-phase VRM module, the influence of resonance on the efficiency of the VRM module is greatly reduced, and the improvement efficiency is facilitated.

In general, it is desired that the resonant frequency between the input parasitic inductance of the second power input loop and the input capacitor Cin is higher than the phase number of the VRM module multiplied by the IPM switching frequency. Preferably, the resonant frequency between the input parasitic inductance and the input capacitor Cin is higher than the phase number of the VRM module multiplied by the IPM switching frequency and multiplied by 1.5 times.

Figure 2H:
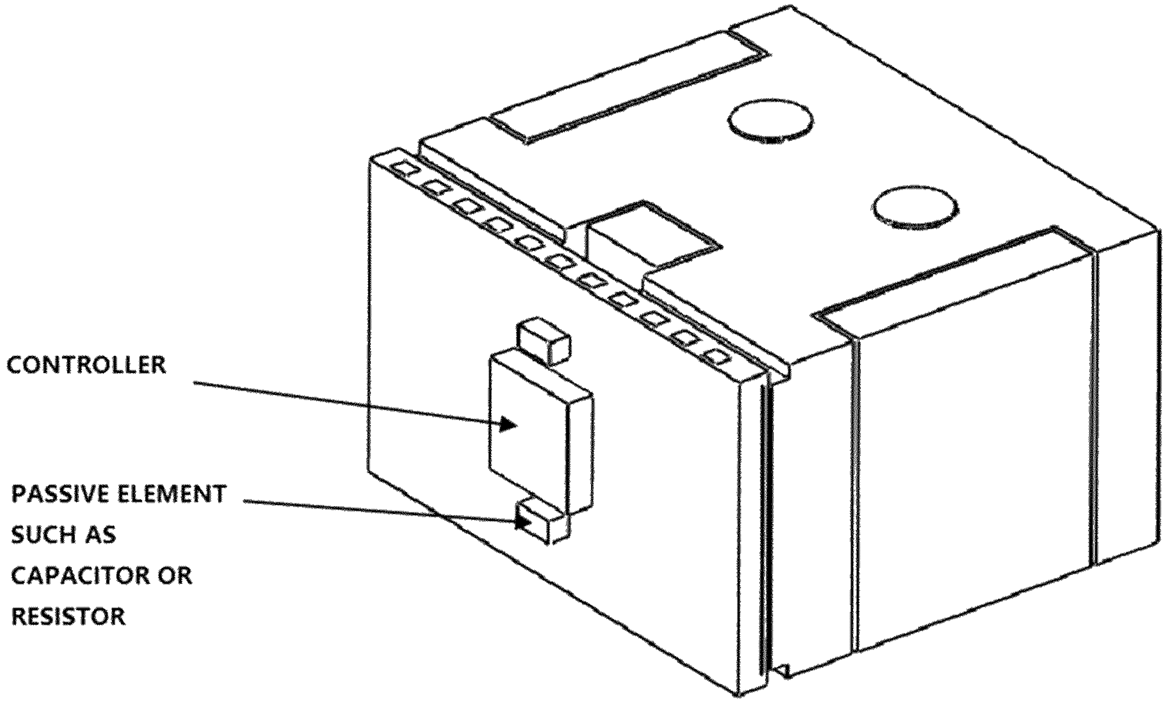
Figure 2I:
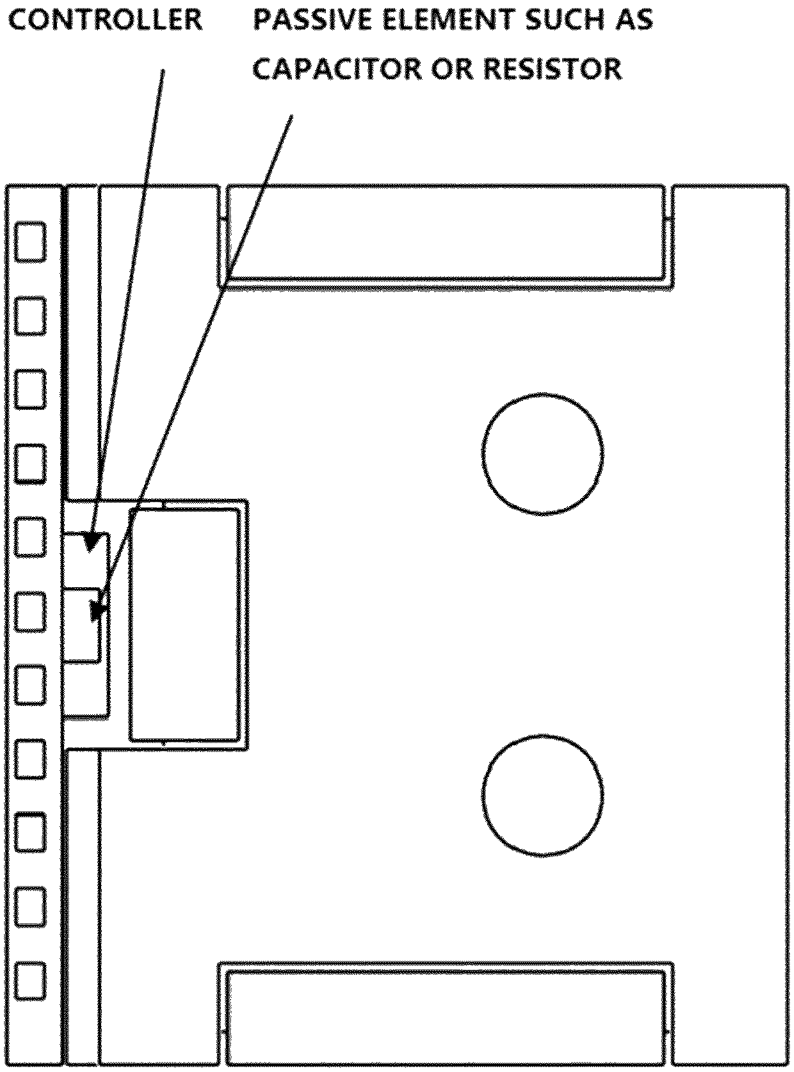

In a preferred embodiment, as shown in FIG. 2H and FIG. 2I, a control assembly is further arranged on the vertical plate 250 and comprises a controller (generally a control chip) and other passive elements connected with the controller. The controller can be arranged on the outer side surface, the inner side surface or embedded inside the vertical plate 250, so that the space is saved, and the utilization rate of the magnetic element is improved. On one hand, the controller drives and controls the two IPM units 121/122 to work; on the other hand, communication with an external load mainboard is realized; and the control of the IPM unit 121/122 by an external load (such as a CPU) according to the working condition is realized, so that the control and adjustment of the output voltage current of the VRM module are realized.

In a preferred embodiment, the VRM module is a multiphase integrated VRM module (similar to that shown in FIG. 17A), and the control assembly provided on the vertical plate 250 can simultaneously control each IPM unit of the VRM module.

The connection path between the inductor winding and the IPM unit 121/122 and the connection path between the inductor winding and the external load are all set to be a vertically through path, so that the path is the shortest path, the impedance of the power path is reduced, the direct current loss is greatly reduced, the efficiency of the VRM module is improved, and the method is particularly suitable for an application scene of vertical power supply. In the application scene of vertical power supply, the VRM module is arranged on the back face of the external load mainboard which the CPU is arranged on the front face of the external load mainboard, and the height of the VRM module is very critical, so that the ultra-thin VRM module (for example, the VRM module with the height smaller than 6 mm) has more application ranges. In addition, a vertically-electrically connected signal electrical connector 251 also needs to be arranged in an application scenario of vertical power supply to implement signal transmission between a part in the top components such as IPM units 121/122 and a controller on an external load mainboard.

Embodiment 2

Figure 3A:
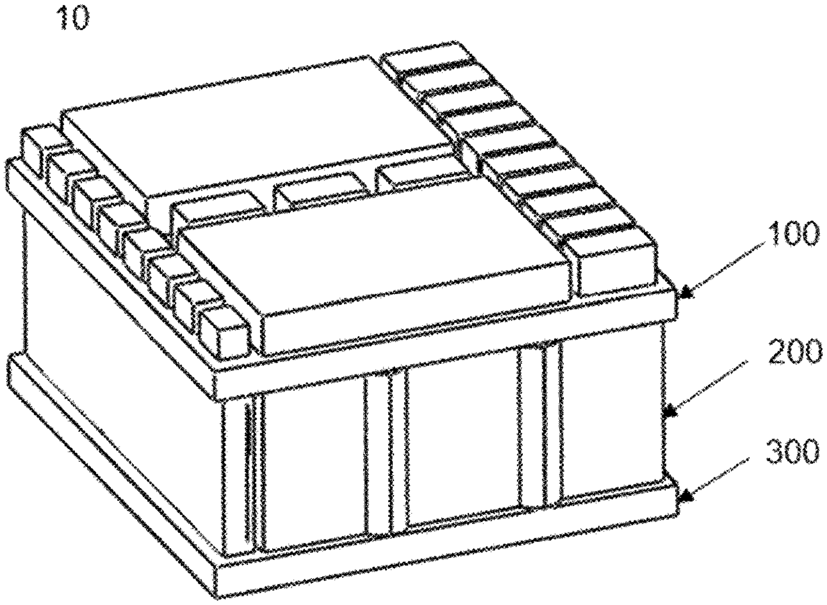
FIG. 3A to FIG. 3E are schematic diagrams of Embodiment 2.
Figure 3B:
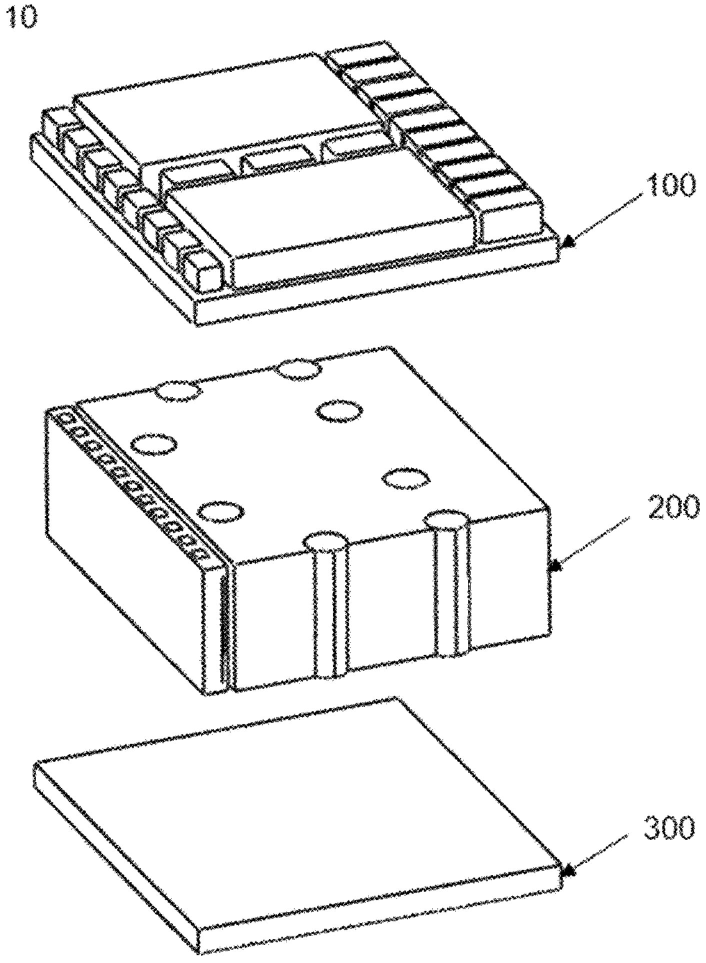

FIG. 3A is a schematic structural diagram of a two-phase VRM module according to an embodiment. FIG. 3B is an exploded view of FIG. 3A. The difference between the present embodiment and the first embodiment is that a bottom assembly 300 is added in the VRM module in the present embodiment. The bottom assembly 300 can meet the variable requirements of the footprints of the VRM module.

Figure 3C:
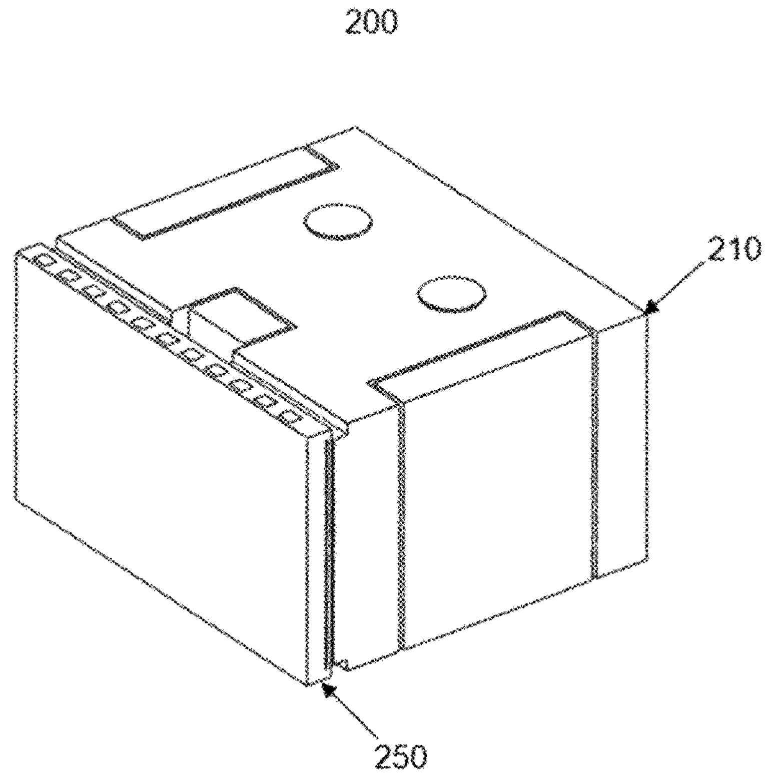
Figure 3D:
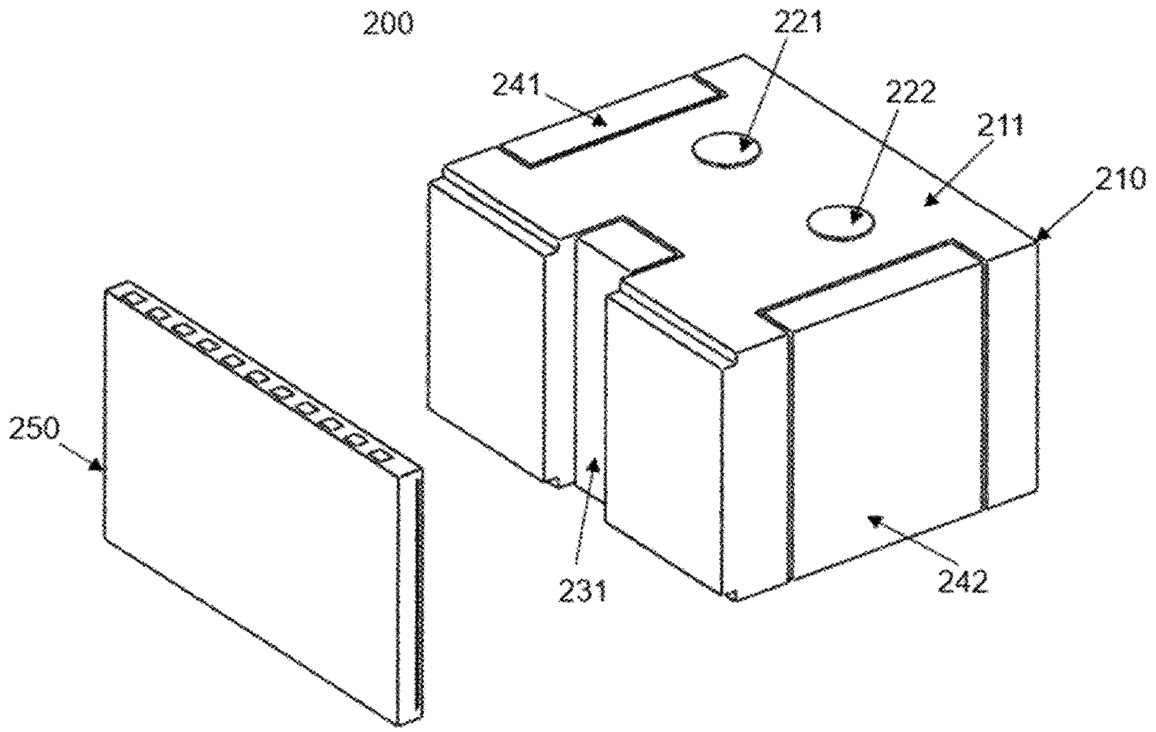
Figure 3E:
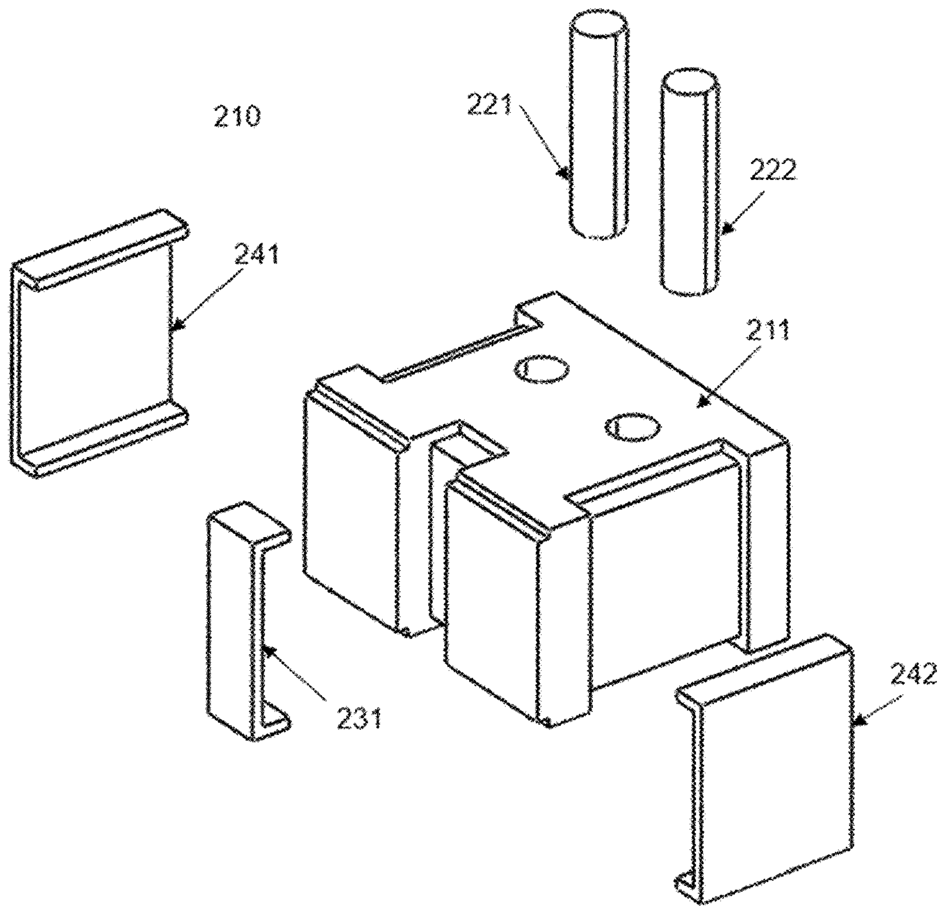

As shown in FIGS. 3C-3E, another optimized embodiment of the intermediate assembly 200 in the present embodiment is shown. FIG. 3C is a schematic structural diagram of the intermediate assembly 200, and FIG. 3D is a structural exploded view of FIG. 3C. FIG. 3E is an exploded view of the inductor assembly 210 in FIG. 3D. The difference between the intermediate assembly 200 shown in FIGS. 3C-3E and the intermediate assembly 200 shown in FIG. 3A is the Vin electrical connector 231 and the GND electrical connector 241/242 are copper sheets which are assembled together with the magnetic core 211 in an assembled manner. The Vin electrical connector 231 and the GND electrical connector 241/242 are arranged on different side surfaces of the magnetic core 211. The arrangement manner enables the VIN-GND loop to surround a part of the magnetic core 211, so that the parasitic inductance of the VIN-GND loop is increased to the resonant frequency of the loop far lower than the equivalent working frequency of the two-phase VRM module, and the module efficiency is improved; and the VIN electrical connector 231 is arranged on one side close to the vertical plate 250 and is recessed at a certain distance from the surface of the magnetic core 211, so as to avoid short circuit between the VIN electrical connector 231 and the signal electrical connector 251 in the welding process. The VIN electrical connector 231 and the magnetic core 211 are assembled, so that the manufacturing process of integrally forming the inductor magnetic core 211 and the winding is simple.

Embodiment 3

Figure 4A:
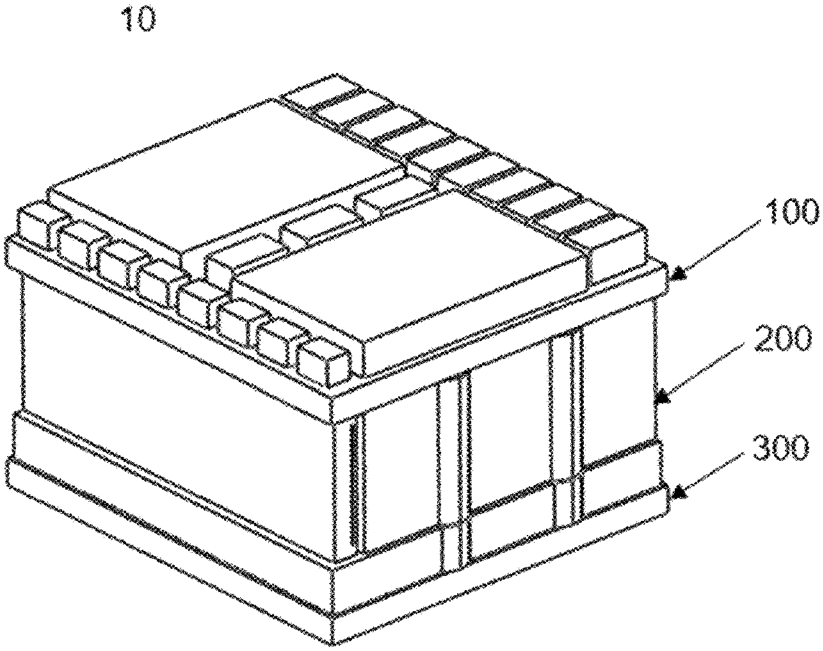
FIG. 4A to FIG. 4C are schematic diagrams of Embodiment 3.
Figure 4B:
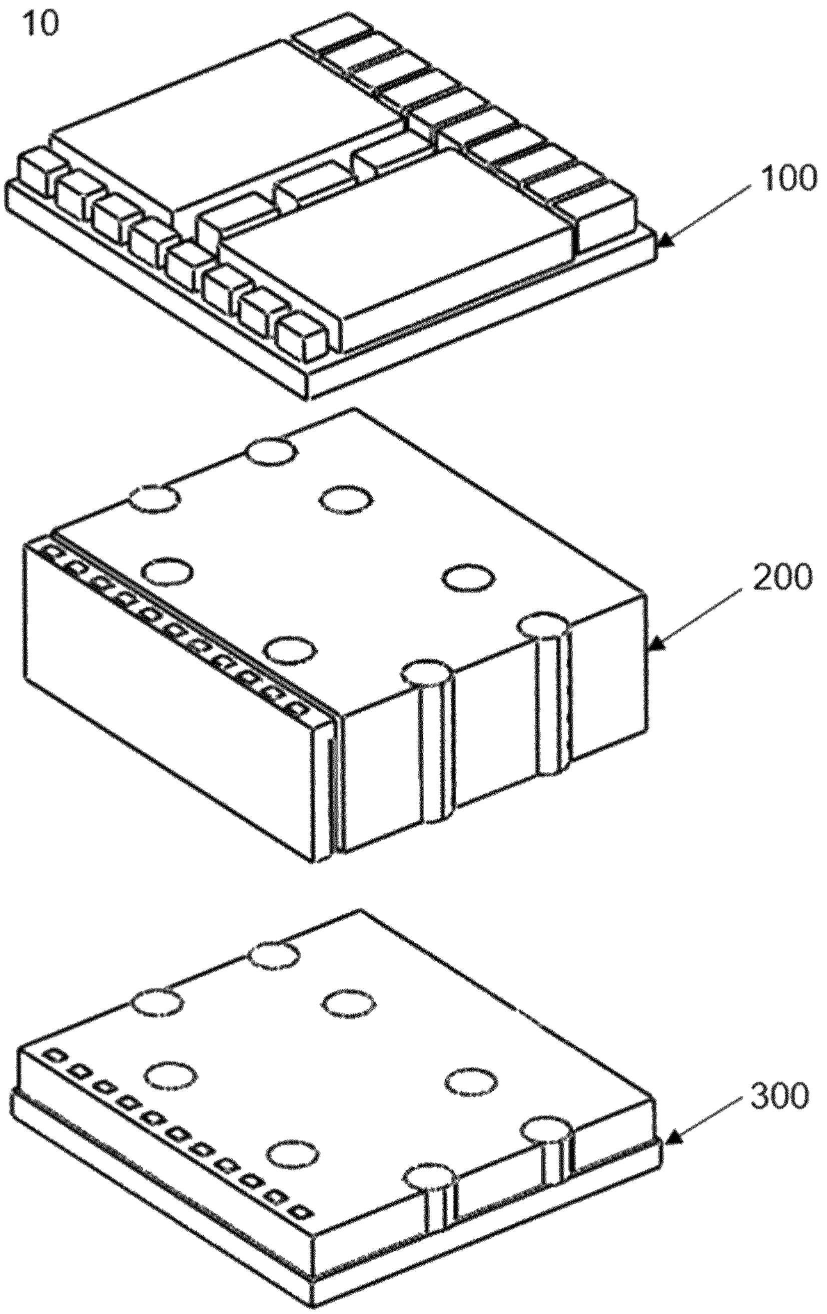
Figure 4C:
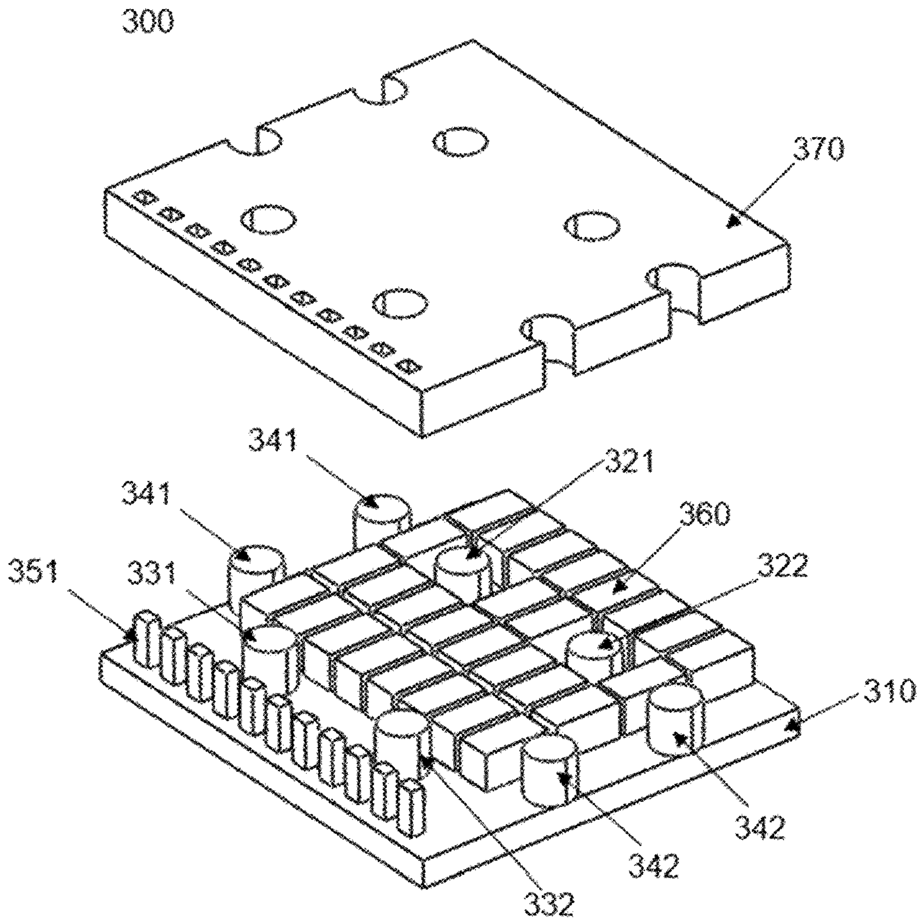

FIG. 4A is a schematic structural diagram of a two-phase VRM module according to an embodiment. FIG. 4B is an exploded view of FIG. 4A. FIG. 4C is a structural exploded view of the bottom assembly 300 in FIG. 4B. The difference between the present embodiment and Embodiment 2 is that the bottom assembly 300 in the present embodiment is different.

As shown in FIGS. 4A-4C, the bottom assembly 300 in the present embodiment comprises a output capacitor Co 360. The bottom plate 310 is further provided with a copper column 321/322/331/332/341/342/351, etc.; the copper column 321 is used for connecting the second pad of the first winding 221 and the Vo Pad on the bottom plate 310 in the bottom assembly 300; the copper column 322 is used for connecting the second pad of the second winding 222 and the Vo Pad on the bottom plate 310 in the bottom assembly 300;

The copper column 331 is used for connecting the second pad of the VIN electrical connector 231 with the VIN pad on the bottom plate 310; the copper column 341/342 is used for being connected with a GND electrical connector 241/242 and a GND pad on the bottom plate 310; and the copper column 351 is used for connecting the signal electrical connector 251 and the bottom plate 310. In order to follow the increasing of the load current and bandwidth, according to the embodiment of the application, the output capacitor Co 360 added on the bottom plate 310 is connected in parallel with the output voltage and is bridged between the Vo pad and the GND pad on the bottom plate, so that the dynamic performance of the output voltage of the VRM can be greatly improved.

In a preferred embodiment, the output capacitor 360 on the bottom plate 310 and the copper columns 321/322/331/332/341/342/351 can also be plastic packaged together by means of the plastic packaging material 370, thereby improving the reliability.

Embodiment 4

Figure 5A:
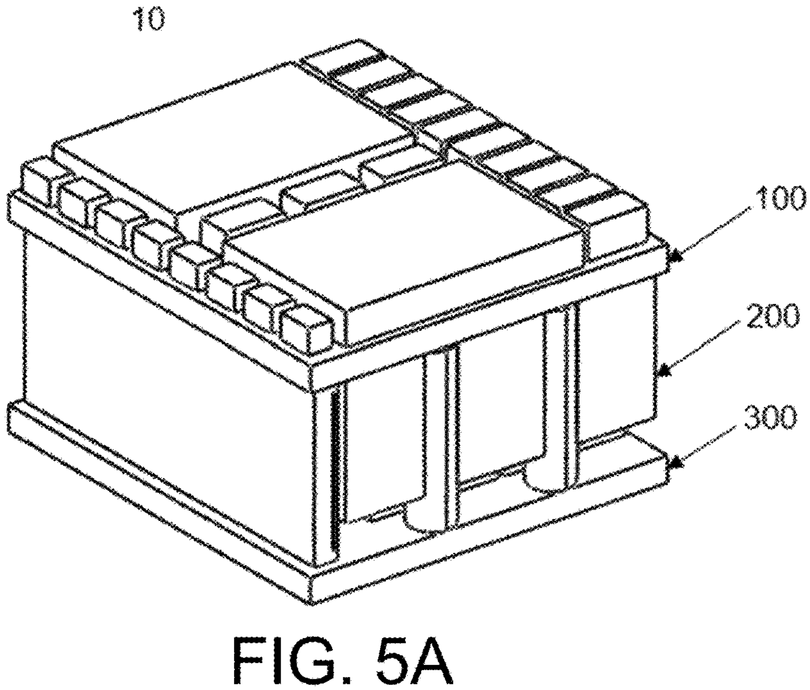
FIG. 5A to FIG. 5D are schematic diagrams of Embodiment 4.
Figure 5B:
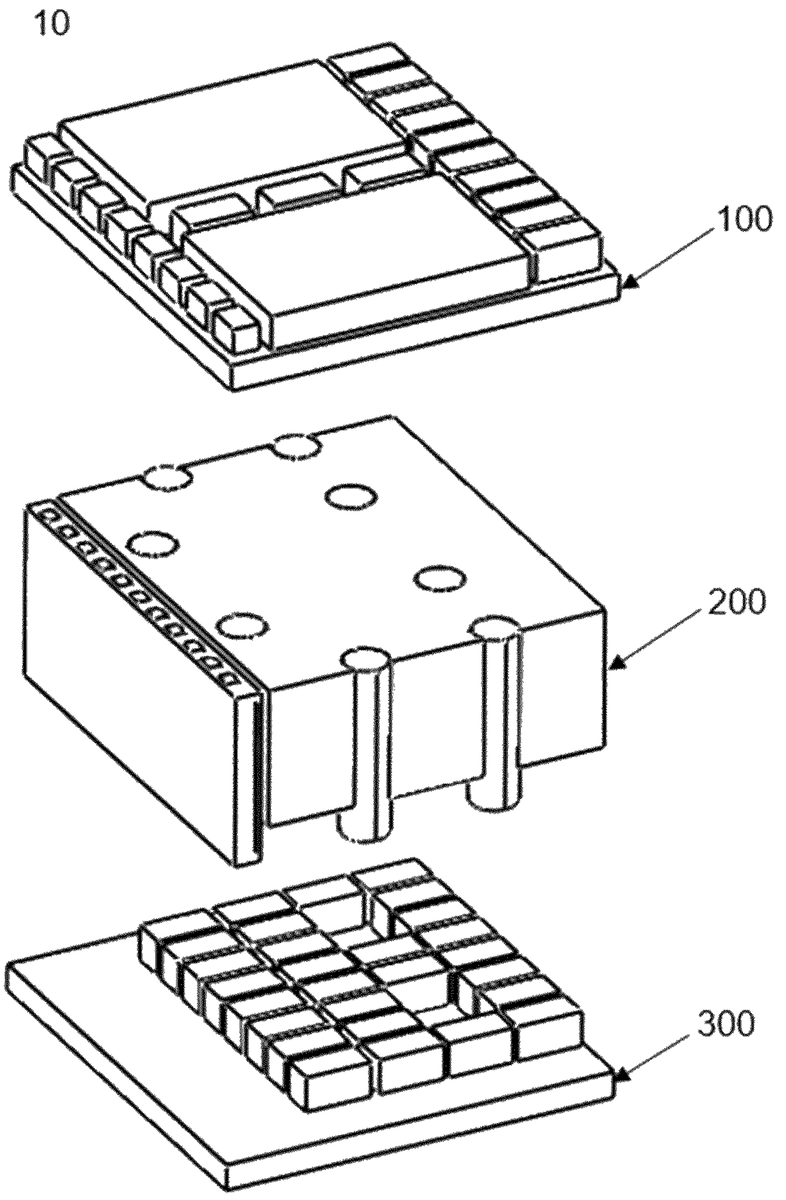
Figure 5C:
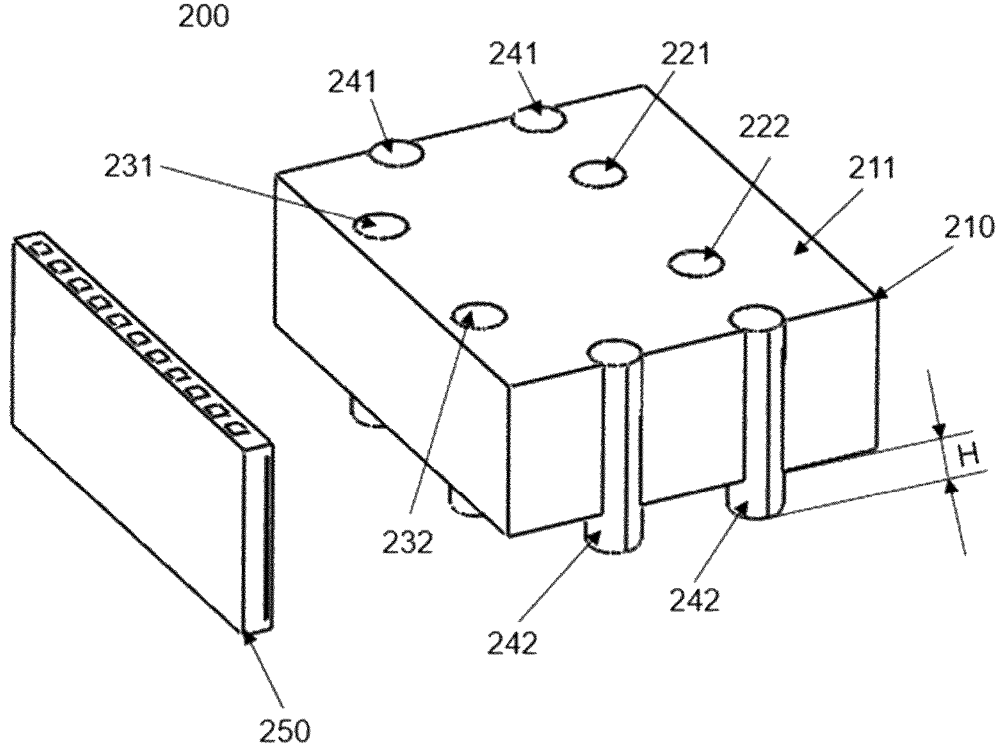
Figure 5D:
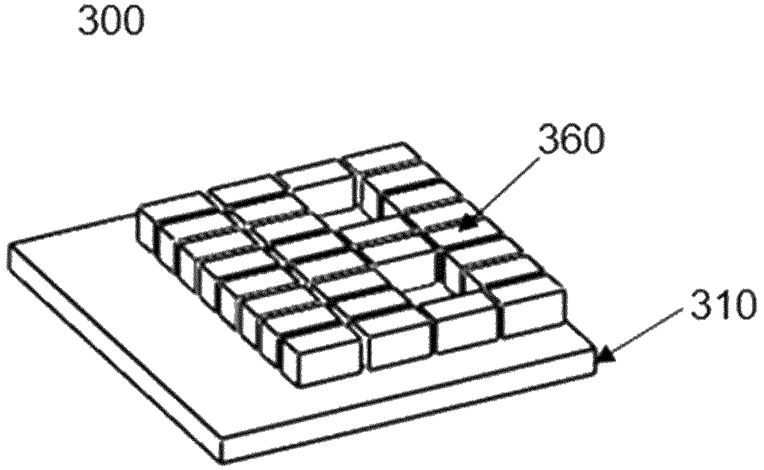

FIG. 5A is a schematic structural diagram of a two-phase VRM module according to an embodiment; FIG. 5B is an exploded view of FIG. 5A; FIG. 5C is a schematic structural diagram of the intermediate assembly 200 in FIG. 5B; and FIG. 5D is a schematic structural diagram of the bottom assembly 300. As shown in FIGS. 5A and 5B, the VRM module comprises a top assembly 100, a intermediate assembly 200 and a bottom assembly 300. The embodiment has the same technical effect as the third embodiment, and the difference between the embodiment and the third embodiment is that the intermediate assembly 200 and the bottom assembly 300 in the two embodiments are different. As shown in FIGS. 5C and 5D, the second pad of the inductor winding is higher than the bottom surface of the magnetic core 211. The second pad of the VIN electrical connector 231/232 and the second pad of the GND electrical connector 241/242 are all higher than the bottom surface of the magnetic core 211 by a certain distance H. The distance H needs to be greater than the height of the output capacitor 360 on the bottom plate 310. As shown in FIG. 5D, a copper column is not arranged on the bottom plate 310, and a second bonding pad of the inductor winding and the VIN electrical connector 231/232 is directly connected with the bottom plate 310. The advantage that the second bonding pad of the inductor winding and the VIN electrical connector 231/232 is directly connected with the bottom plate 310 is that the connection point of large current is reduced, the direct current impedance is increased due to the connection point is reduced, the efficiency is improved, the welding frequency is reduced, the plastic packaging process is omitted, and the cost is reduced.

Embodiment 6

Figure 6A:
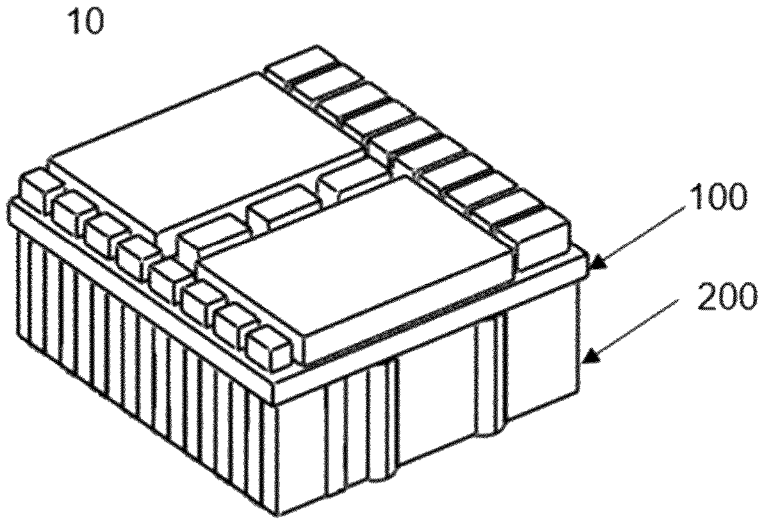
FIG. 6A to FIG. 6C are schematic diagrams of Embodiment 5.
Figure 6B:
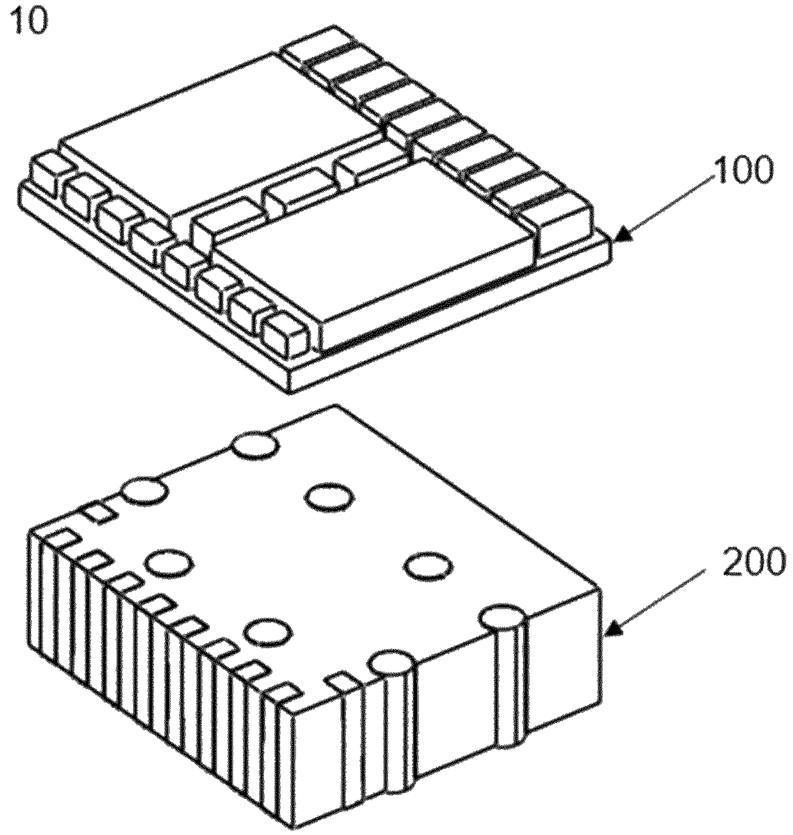
Figure 6C:
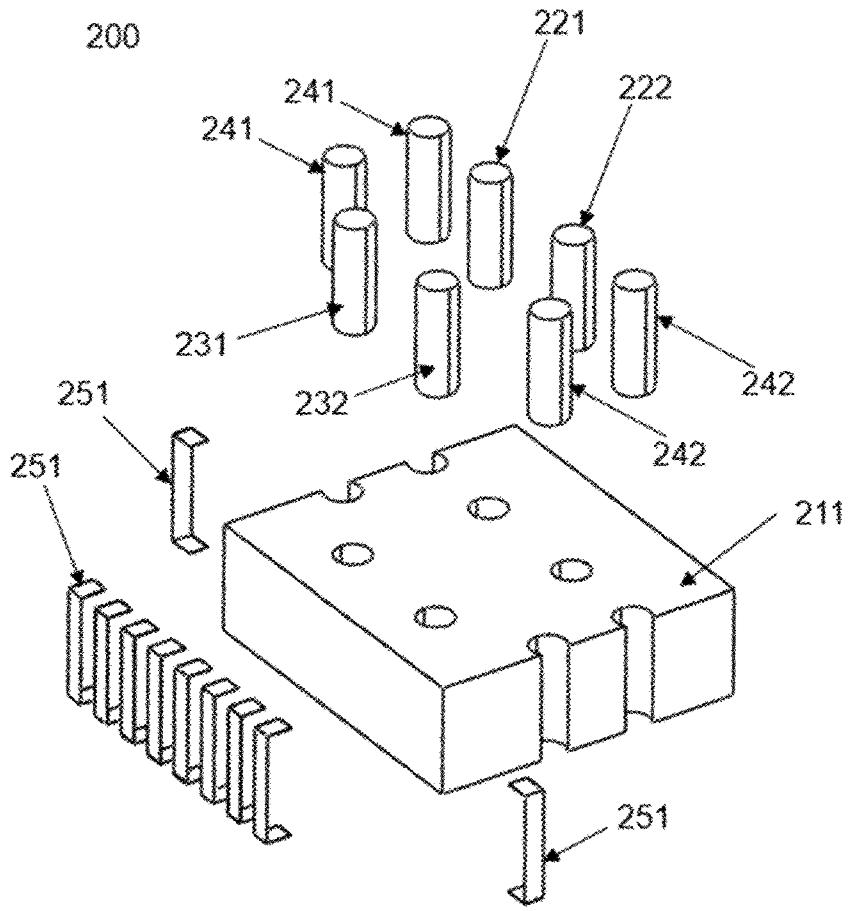

FIG. 6A is a schematic structural diagram of a two-phase VRM module according to an embodiment. FIG. 6B is an exploded view of FIG. 6A. FIG. 6C is a structural exploded view of the intermediate assembly 200 in FIG. 6B. and the embodiment has the same technical effect as the first embodiment. The difference between the embodiment and the first embodiment lies in an implementation mode of the signal electrical connector 251. As shown in FIGS. 6A to 6C, the inductor 210 of the present embodiment integrates a first winding 221, a second winding 222, a VIN electrical connector 231/232, a GND electrical connector 241/242 and a signal electrical connector 251. The signal electrical connector 251 is assembled onto the magnetic core 211 by means of a copper foil, or by electroplating, at least one layer of metal is electroplated on the magnetic core 211 to achieve the function of signal transmission.

In the embodiment, no signal shielding layer 252 is arranged between the signal electrical connector 251 and the magnetic core 211. Therefore, the signal electrical connector 251 is easily interfered by electric field generated by rapidly changing voltage on the winding. Therefore, the easily interfered analog signal needs to be arranged close to the VIN electrical connector 231/232, so that the VIN electrical connector 231/232 is arranged between the easily interfered signal electrical connector 251 and the winding, and the VIN electrical connector 231/232 plays a role in the shielding layer.

According to the embodiment, the copper foil or the electroplating mode is adopted, so that the structure and assembly of the inductor are greatly simplified, the space utilized by the magnetic core 211 material is greatly increased, the loss of the magnetic core 211 is reduced, the efficiency is improved, the current density is improved, and meanwhile, the cost of the intermediate assembly 200 is also reduced.

Embodiment 6

Figure 7A:
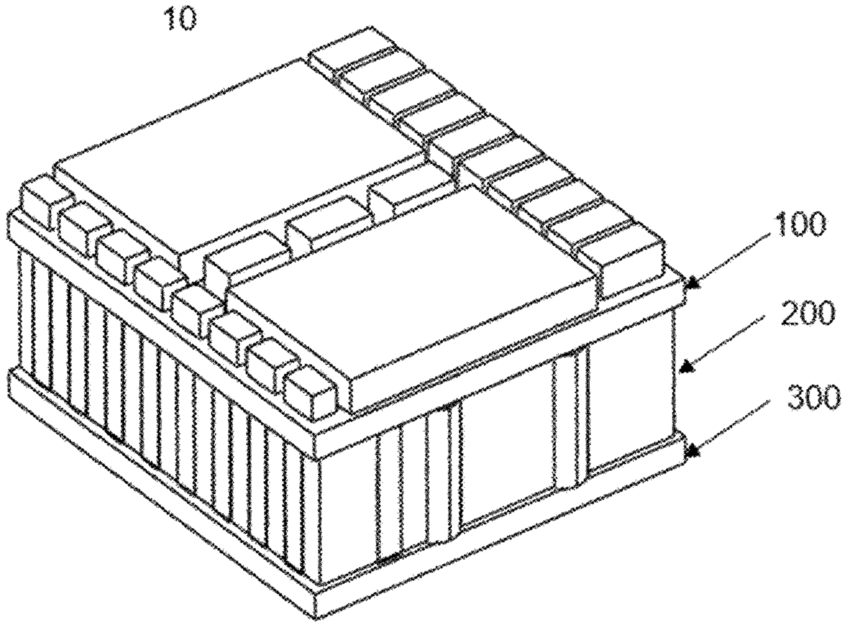
FIG. 7A to FIG. 7E are schematic diagrams of Embodiment 6.
Figure 7B:
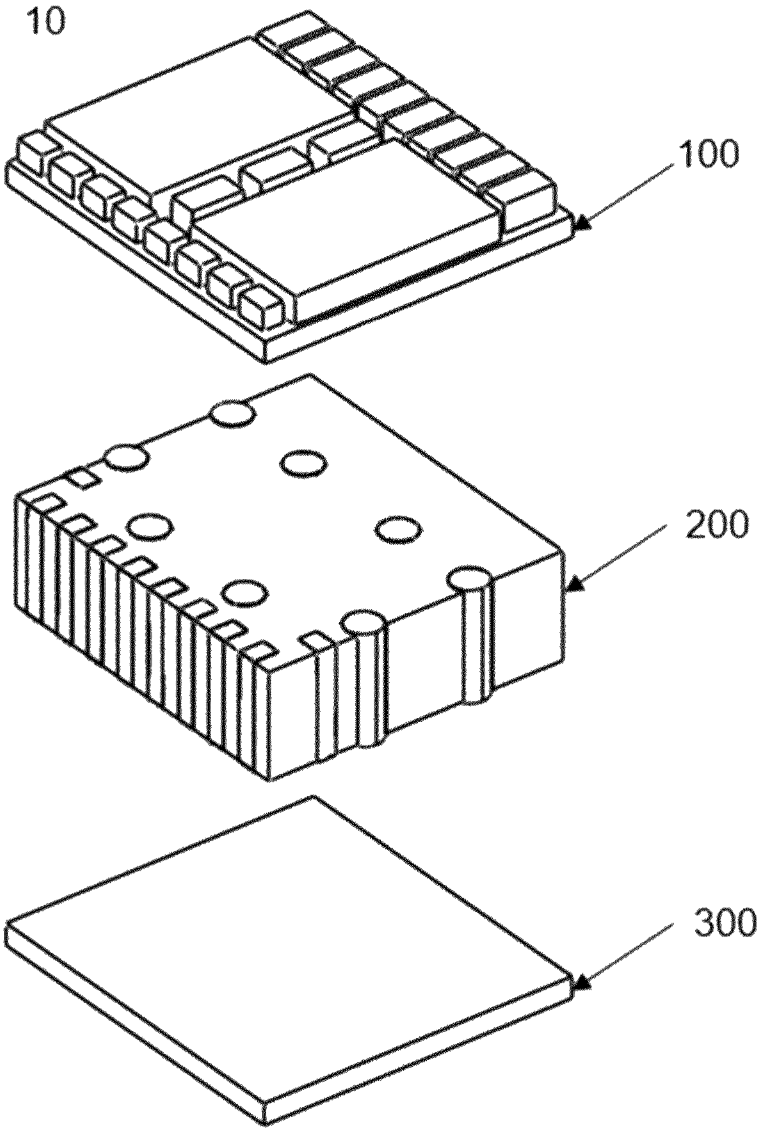
Figure 7C:
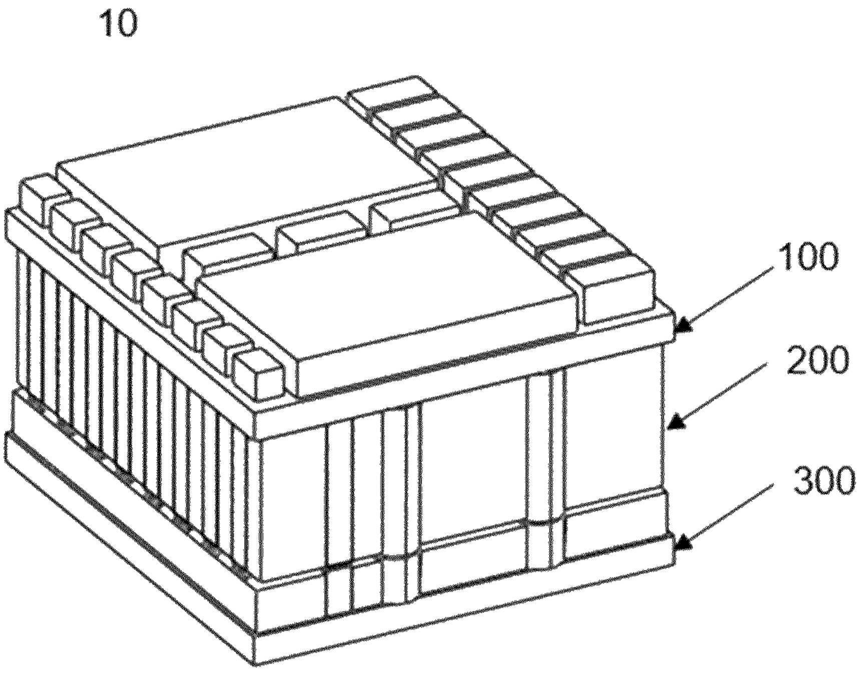
Figure 7D:
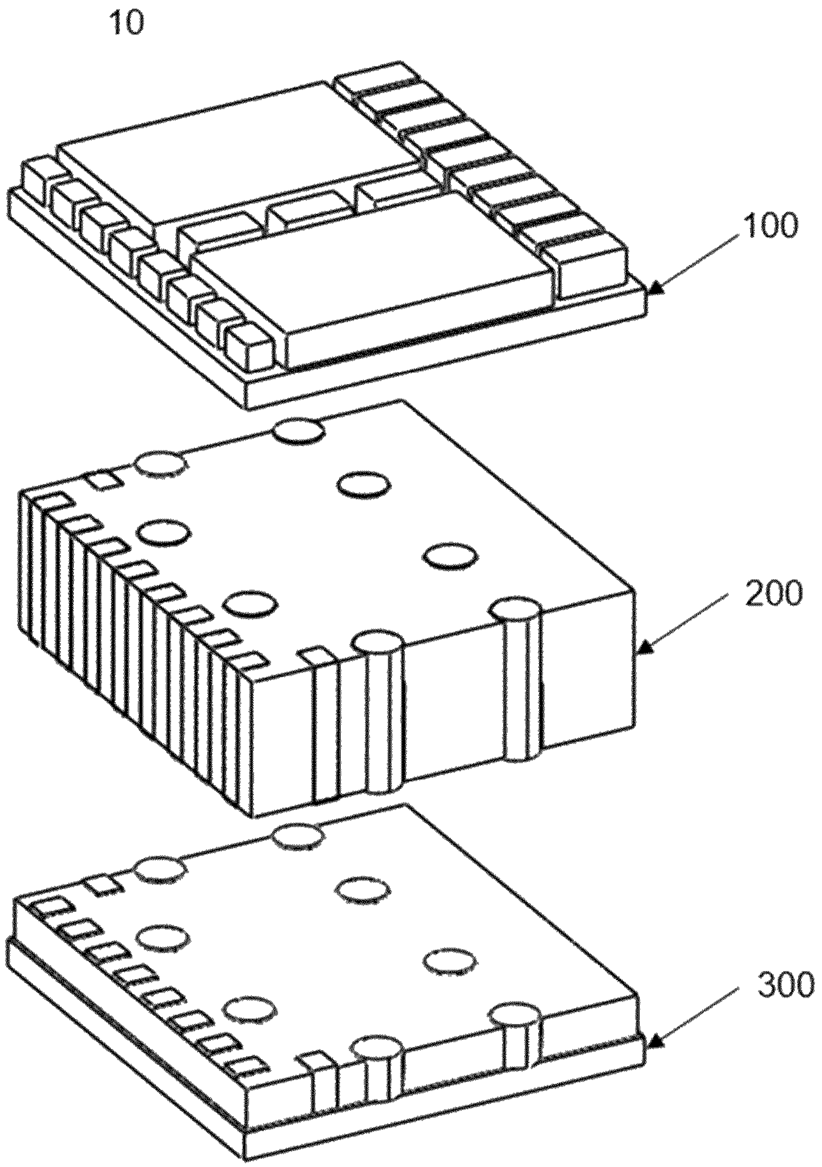
Figure 7E:
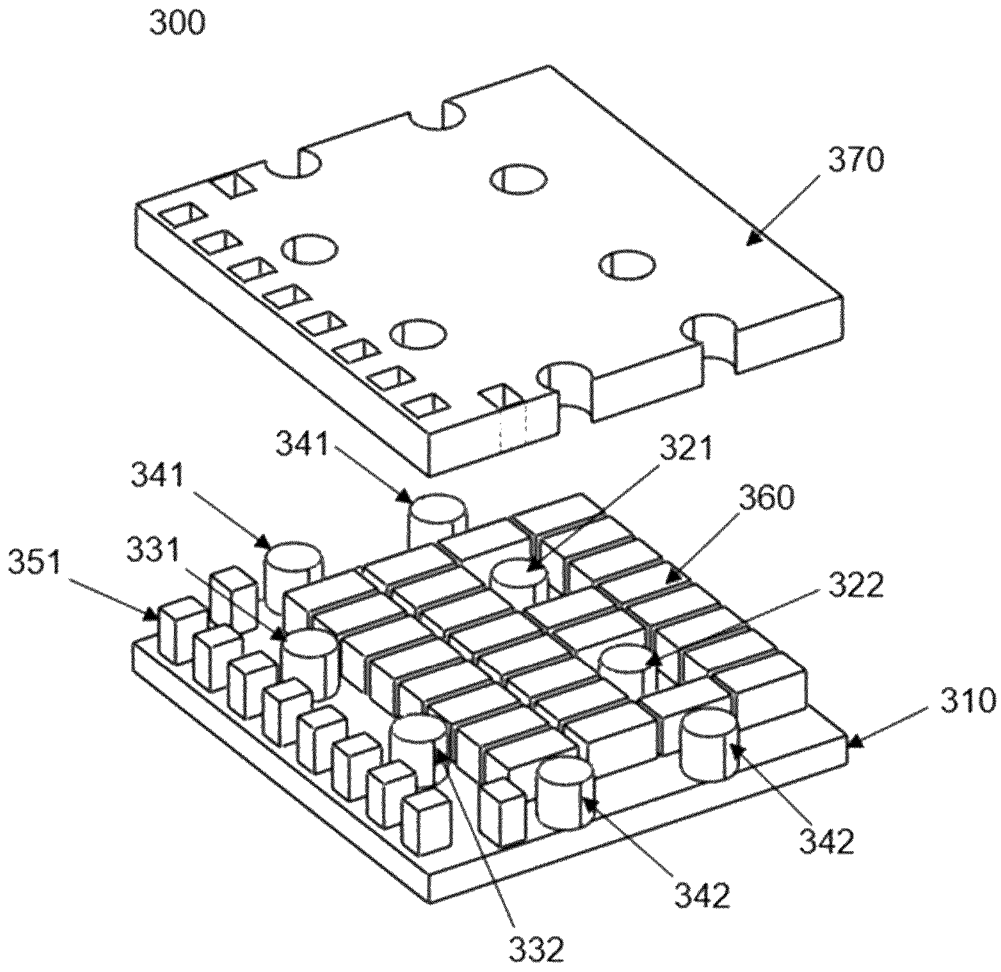

The embodiment shows a combination of Embodiment 5 and Embodiment 2 and Embodiment 3. FIG. 7A is a schematic structural diagram of a two-phase VRM module of a combination scheme of Embodiment 2 and Embodiment 5. FIG. 7B is an exploded view of FIG. 7A. FIGS. 7C-7E are schematic structural diagrams of a two-phase VRM module of a combination scheme according to Embodiment 3 and Embodiment 5. The present embodiment has the same technical effect as Embodiment 5. The difference between the present embodiment and Embodiment 5 is that a bottom assembly 300 is added with the bottom of the intermediate assembly 200 for satisfying the customized requirements of the customer on the form of the bonding pad between the module and the load, and the specific structure is not repeated here.

Embodiment 7

FIG. 8A to FIG. 8E are schematic diagrams of a two-phase VRM module applying a TLVR technology according to an embodiment (since a TLVR technology is generally used in a multi-phase circuit, a plurality of two-phase VRM modules or a multi-phase VRM module generally needs to be used in practical application. A multi-phase VRM module applying a TLVR technology is not shown, and a person skilled in the art would have been able to obtain a corresponding technical solution by combining the embodiments with the subsequent embodiments involving a multi-phase VRM module).

Figure 8A:
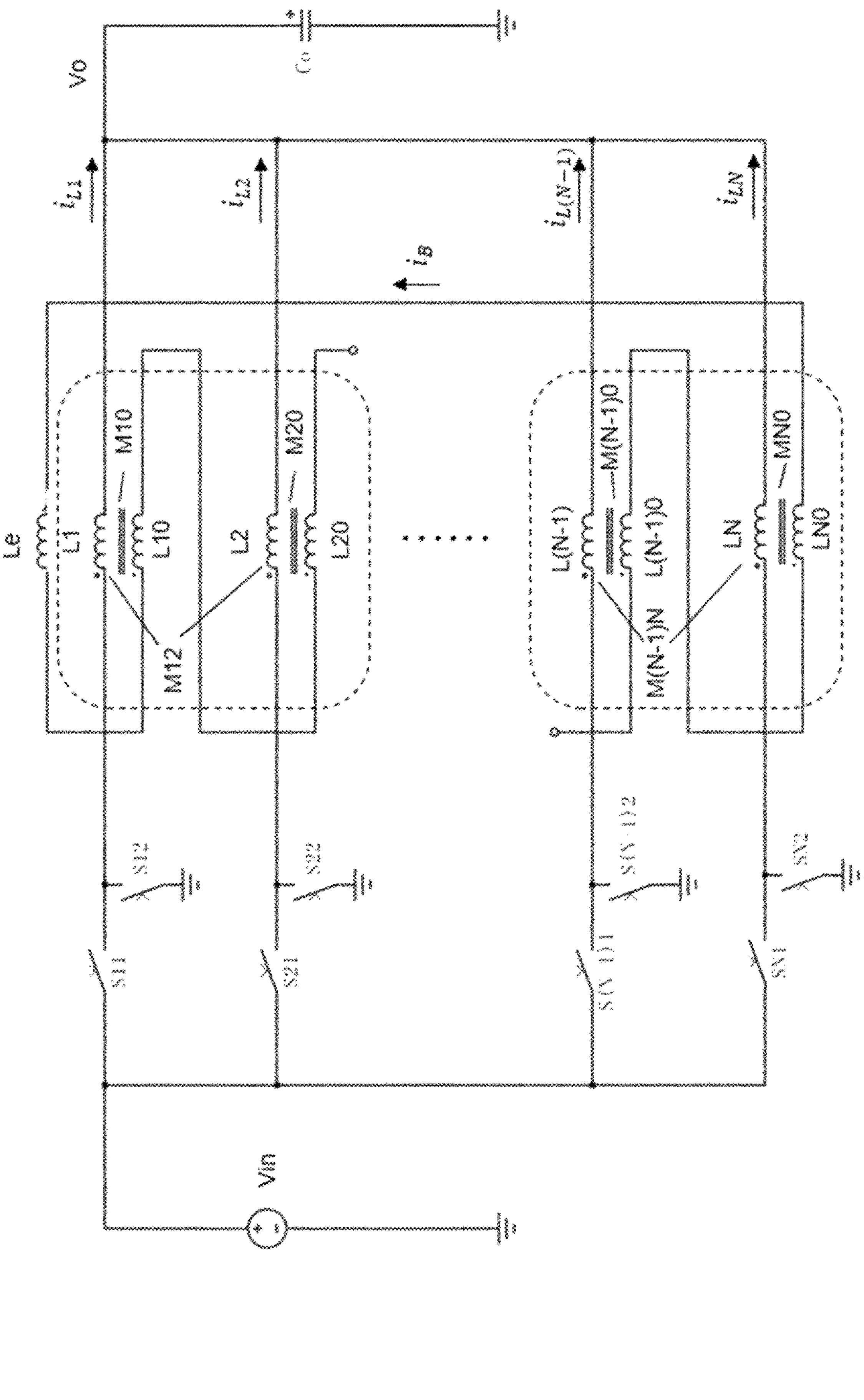
FIG. 8A to FIG. 8E are schematic diagrams of Embodiment 7.
Figure 8B:
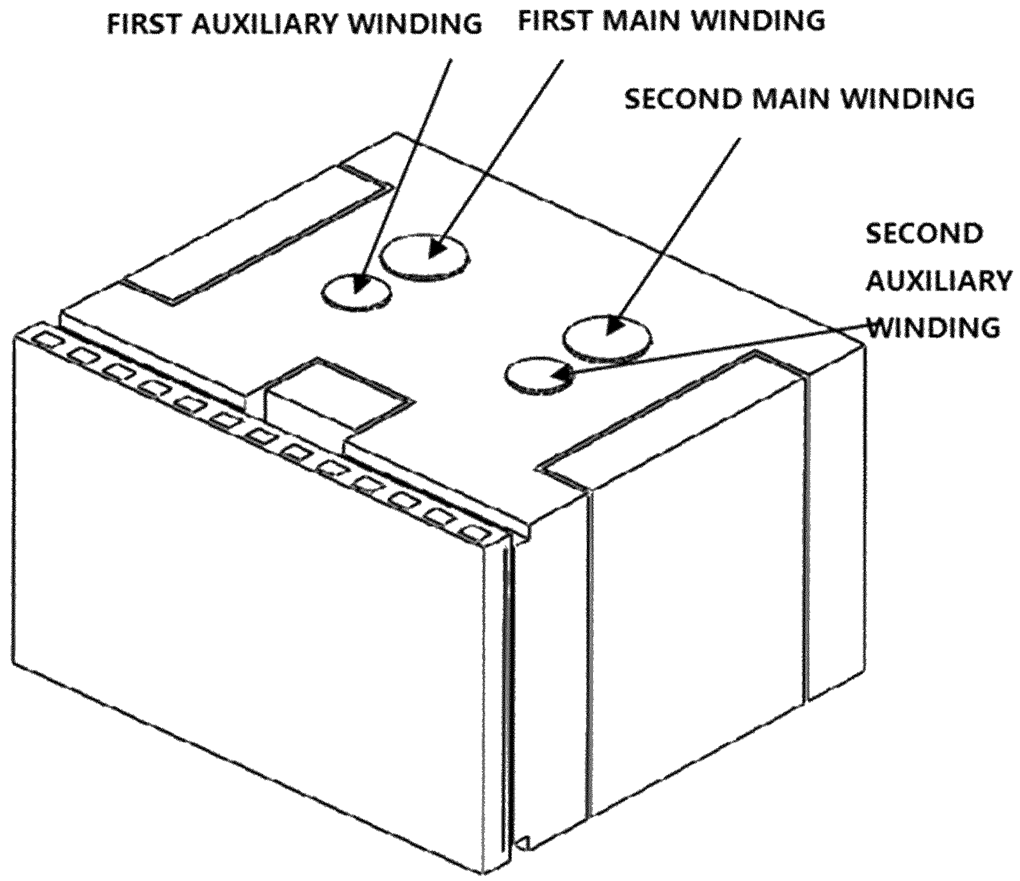
Figure 8C:
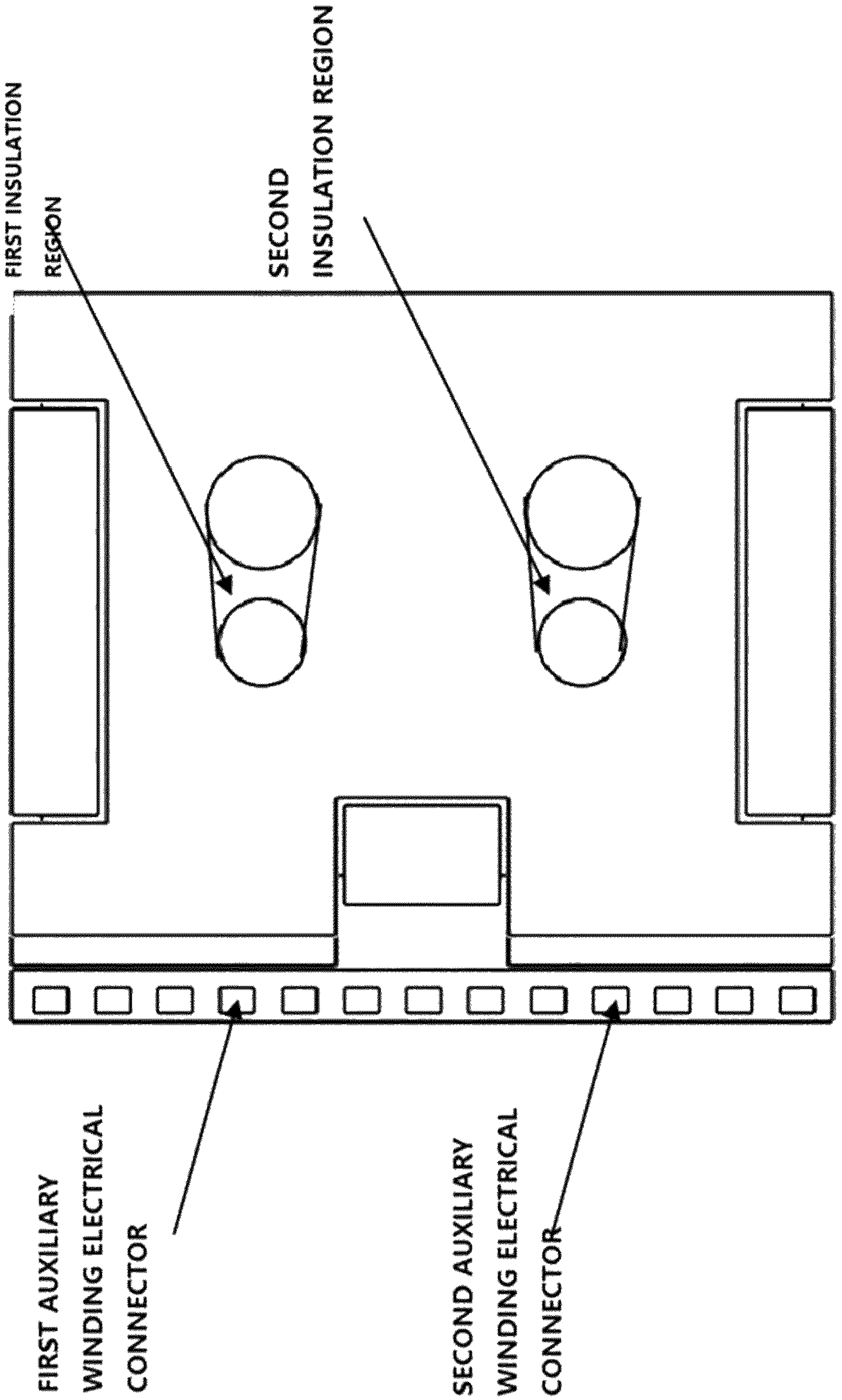
Figure 8D:
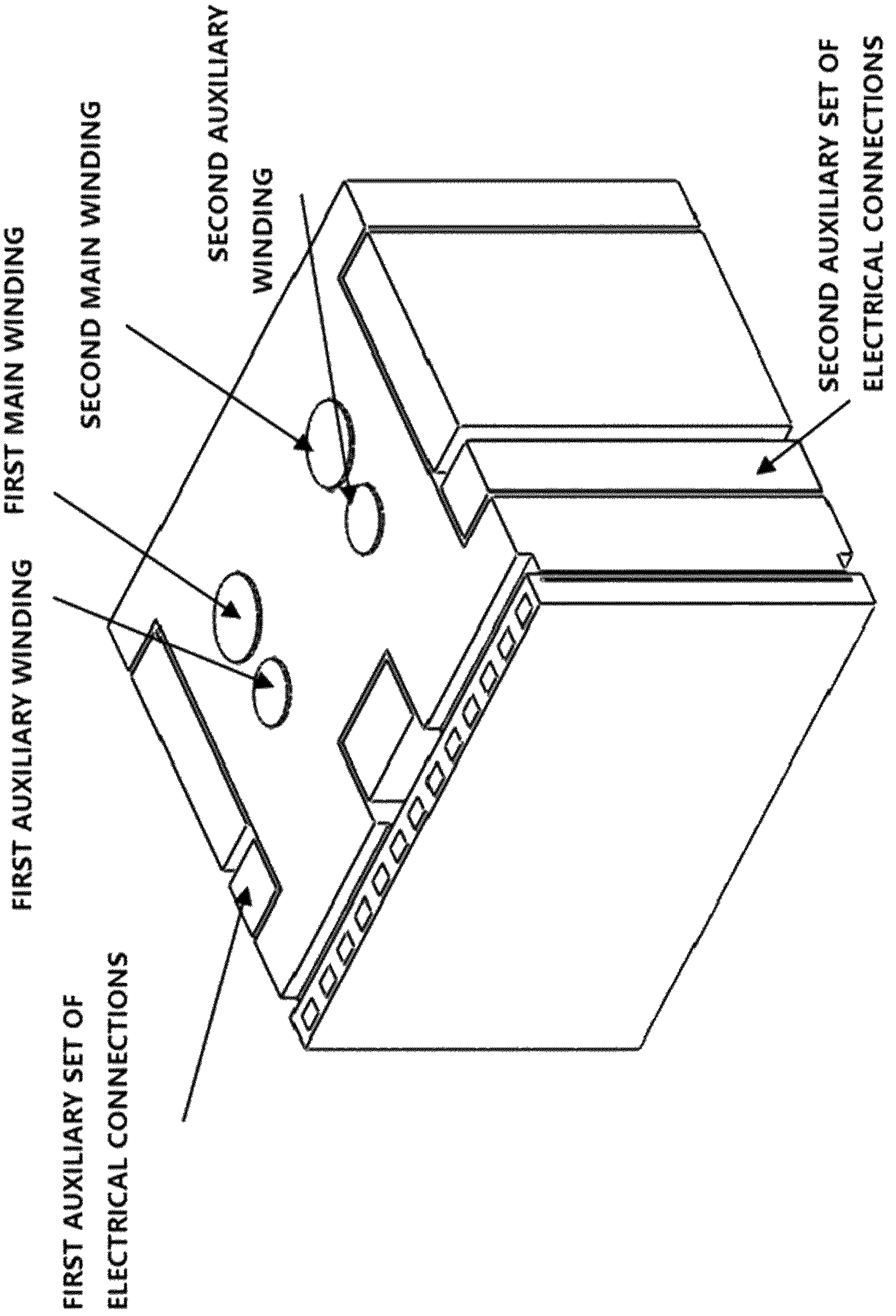

FIG. 8A shows a schematic circuit diagram of a TLVR technology, main inductors L1, L2, and L3 . . . LN are independent inductors (ie, inductor windings) having no coupling relationship with each other, and auxiliary windings L10, L20, and L30 . . . LN0 are respectively coupled to main inductors L1, L2, and L3 . . . LN. The auxiliary windings L10, L20 and L30 . . . LN0 can be directly connected end to end to form a TLVR loop, or an external compensation inductor Le is added in a TLVR loop of the auxiliary winding; so that any two inductors of the N independent main inductors L1, L2 and L3 . . . LN are coupled together to form N phase inductors with back coupling.

According to the specific structure of the embodiment, the auxiliary winding is additionally arranged at the adjacent position of each I-shaped inductor winding, and the material of the area between the inductor winding and the auxiliary winding is an insulating non-magnetic conductive material or a magnetic material with the magnetic conductivity lower than the magnetic permeability of the magnetic core, so that a coupling relationship is formed between the inductor winding and the auxiliary winding.

The purpose of setting the insulating material is to achieve electrical isolation between the inductor winding and the auxiliary winding. The aim of using a non-magnetic material or a magnetic material with low magnetic permeability to reduce the magnetic flux generated by the current through the inductor winding to pass through the area between the inductor winding and the auxiliary winding, so that the coupling performance between the inductor winding and the auxiliary winding is improved; the dynamic inductance of the TLVR is easy to adjust through an external compensation inductor.

In some other embodiments, a magnetic material having a magnetic permeability the same as that of the magnetic core can also be arranged between the main winding and the auxiliary winding (ie, no additional special material area is provided), and the coupling coefficient between the main winding and the auxiliary winding is adjusted by adjusting the distance between the main winding and the auxiliary winding, so that the function of the TLVR can be realized by adjusting the distance between the main winding and the auxiliary winding, and the space and cost of the load mainboard can be saved.

In order to form a TLVR loop with a plurality of auxiliary windings in series, and achieve a TLVR function, a corresponding number of auxiliary winding electrical connectors need to be set. The auxiliary winding electrical connector can be arranged on the vertical plate and can also be electroplated on the other side of the magnetic core and can also be attached to the side of the power electrical connection assembly.

Figure 8E:
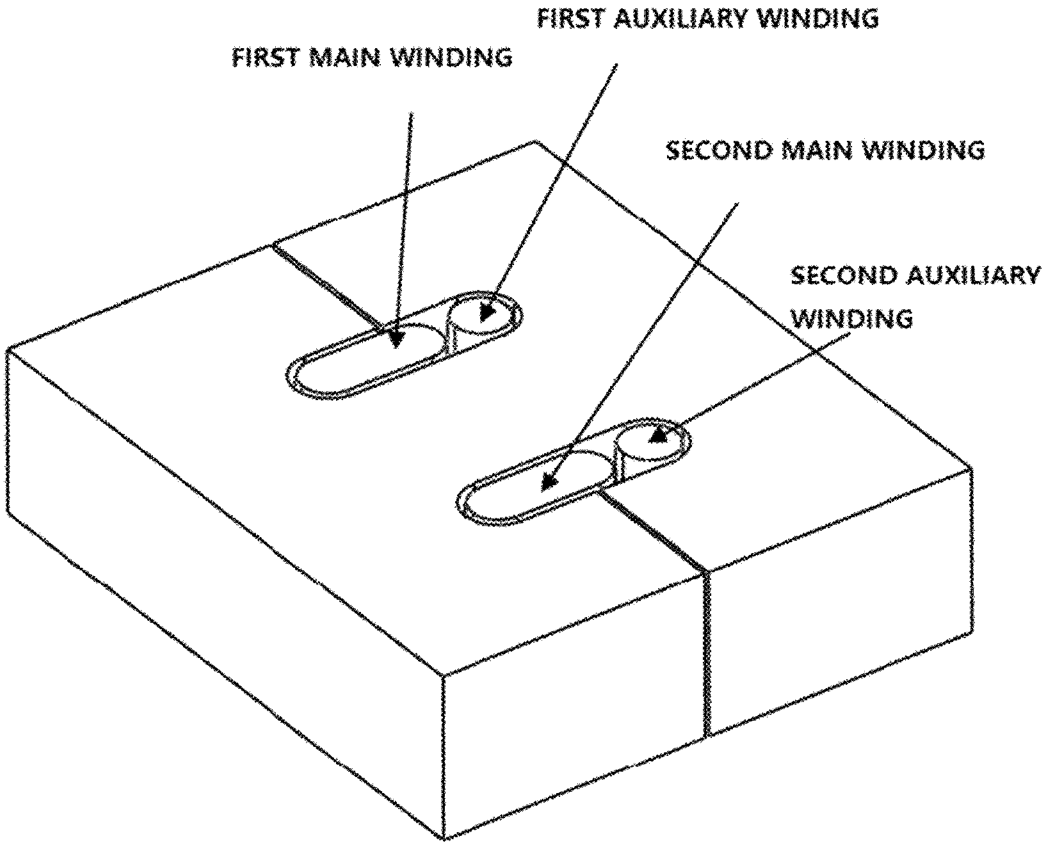

In some other embodiments (for example, similar to the inductor assembly shown in FIG. 16), the magnetic core 211 needs to be provided with an air gap to adjust the inductance. When the TLVR technical solution of the present embodiment is applied, both sides of the air gap are respectively in communication with the inductor winding and the outer surface of the magnetic core 211, as shown in FIG. 8E.

Embodiment 8

Figure 9A:
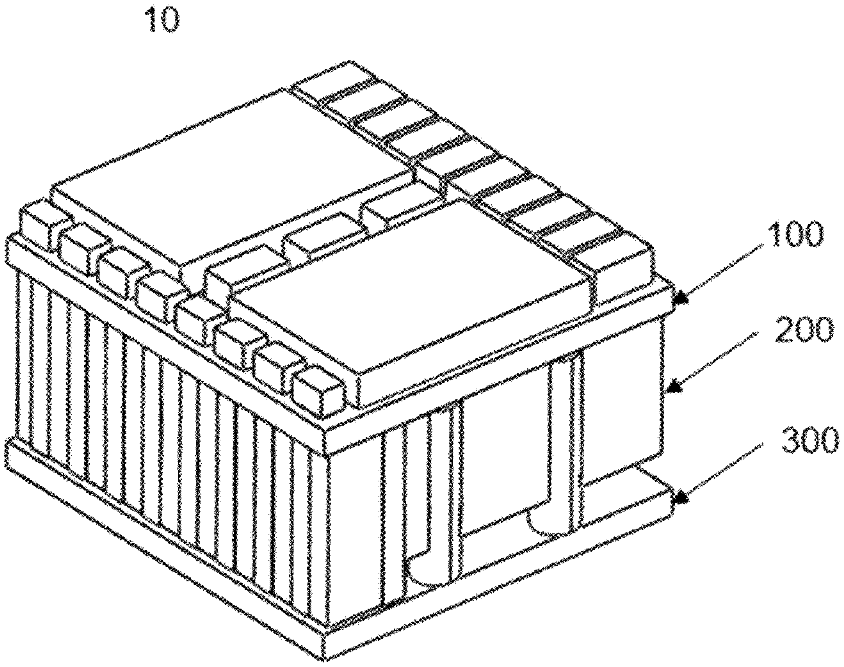
FIG. 9A to FIG. 9E are schematic diagrams of Embodiment 8.
Figure 9B:
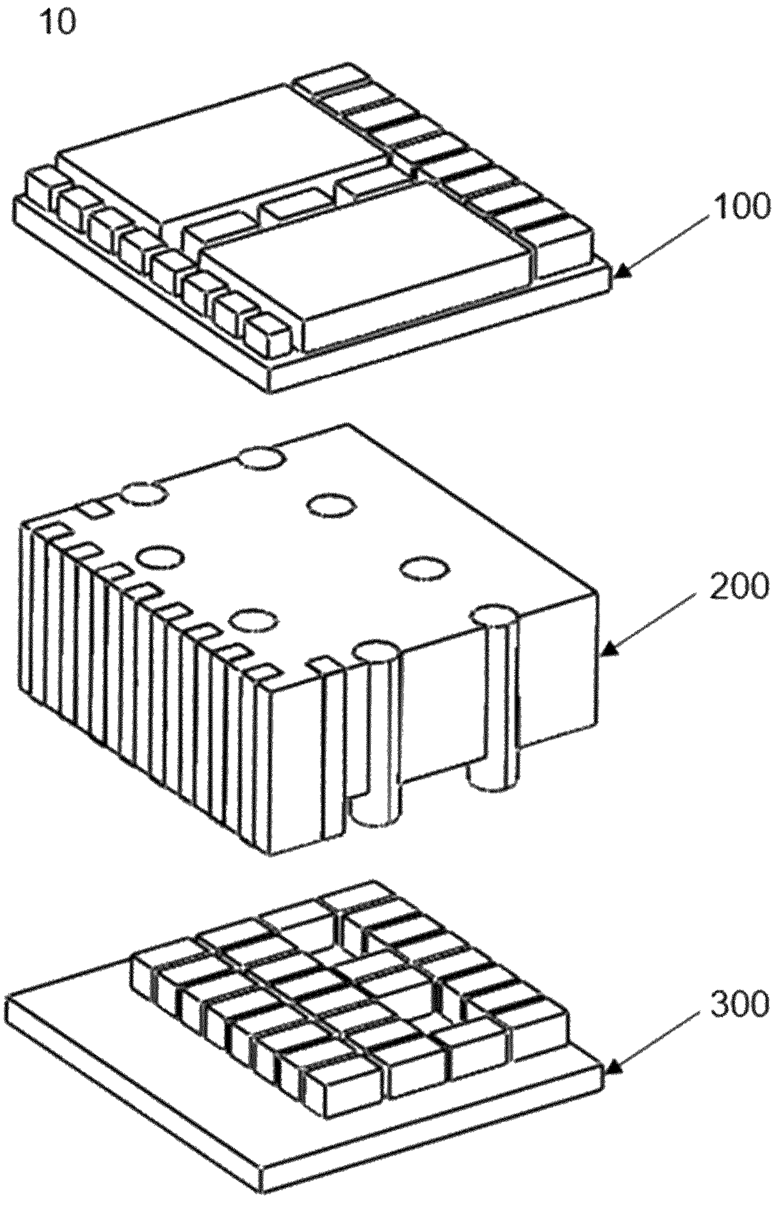
Figure 9C:
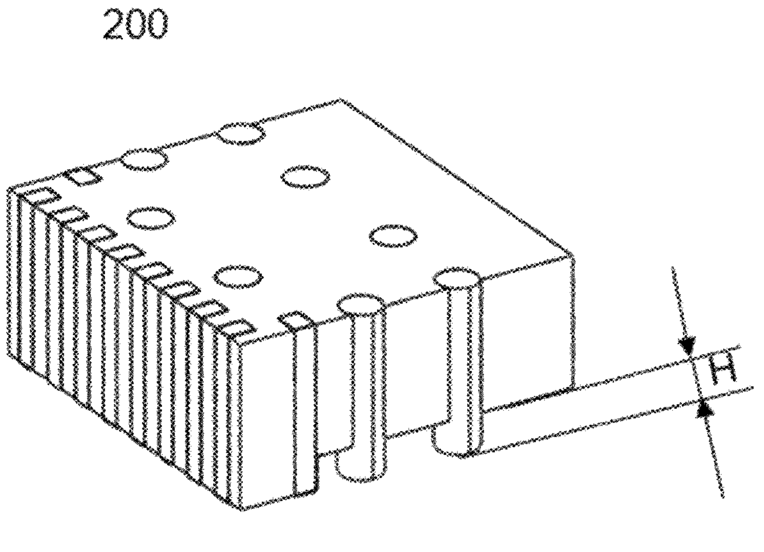
Figure 9D:
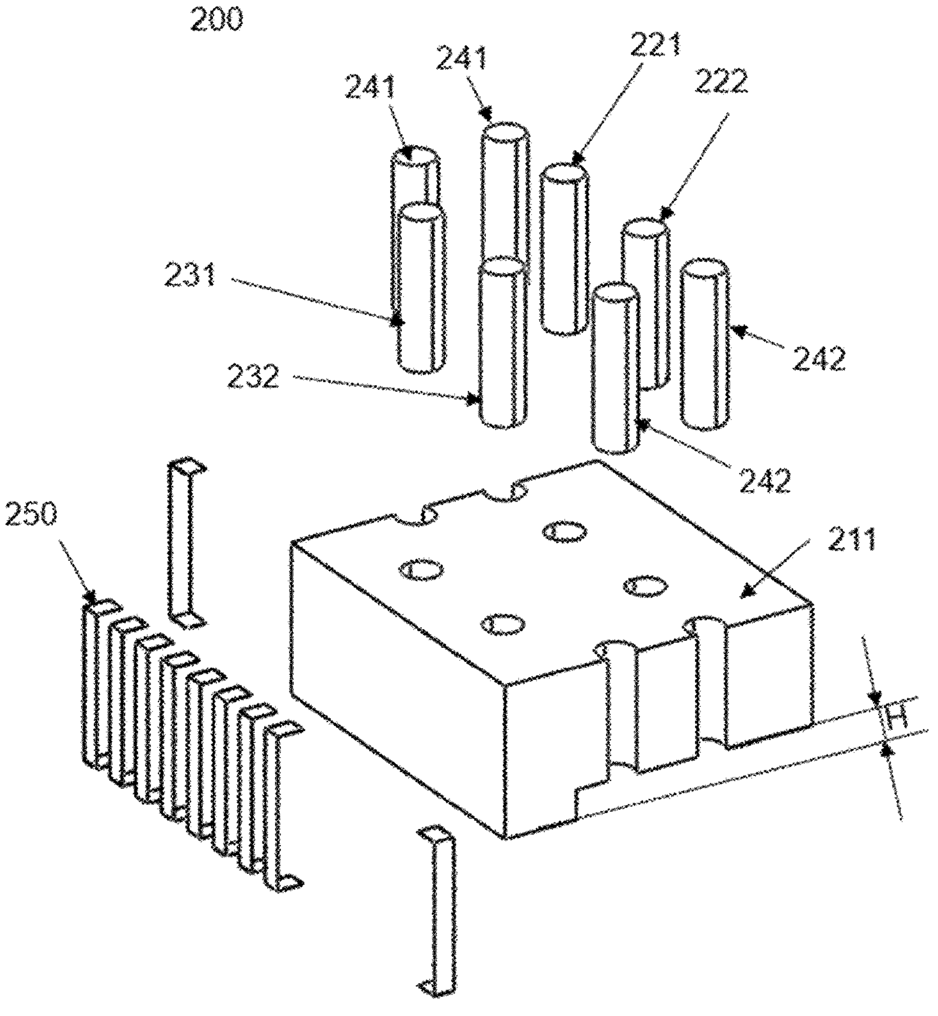
Figure 9E:
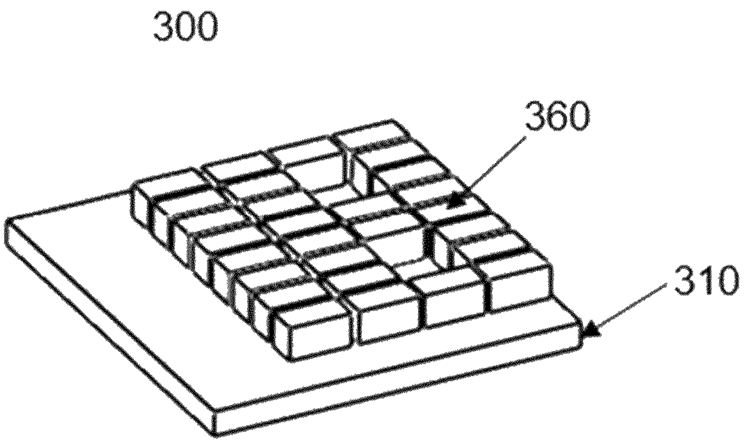

FIG. 9A is a schematic structural diagram of a two-phase VRM module according to an embodiment; FIG. 9B is an exploded view of FIG. 9A; FIG. 9C is a schematic structural diagram of the intermediate assembly 200 in FIG. 9B; FIG. 9D is a structural exploded view of the intermediate assembly 200. As shown in FIGS. 9A and 9B, the VRM module comprised a top assembly 100, a intermediate assembly 200 and a bottom assembly 300. The present embodiment has the same technical effect as Embodiment 6. As shown in FIGS. 9C and 9D, the bottom surface of the inductor magnetic core 211 is provided with a step, and the height of the step is H; and the step is close to the position of the signal electrical connector 251, so that the lower end of the signal electrical connector 251 is higher than the bottom face of other parts of the magnetic core 211. In addition, the second pad of the inductor winding is higher than the bottom surface of the magnetic core 211, and the second pad of the VIN electrical connector 231/232 and the second pad of the GND electrical connector 241/242 are also higher than the bottom surface of the magnetic core 211 by a certain distance H. The distance H needs to be greater than the height of the capacitor on the bottom plate, so that the formed interval region can accommodate the capacitor on the bottom plate. As shown in FIG. 9E, a copper column is not arranged on the bottom plate 310, a winding of the inductor and a second bonding pad of the VIN electrical connector 231/232 are directly connected with the bottom plate 310. The advantage that the second bonding pad of the inductor winding and the second bonding pad of the VIN electrical connector 231/232 are directly connected with the bottom plate 310 is that the connecting point of large current is reduced, the direct current impedance increased due to the connecting point is reduced, the efficiency is improved, the welding frequency is reduced, the plastic packaging process is omitted, and the cost is reduced. Meanwhile, the position of the step on the magnetic core 211 can be realized through an electroplating process to realize the connection of electrical connector 251, the assembly difficulty of the vertical plate 250 is eliminated, and the space formed by the step of the magnetic core 211 can accommodate the output capacitor Co 360. The output capacitor Co 360 is connected in parallel with the output ends, so that the dynamic performance of the output voltage is improved.

In the embodiment, the signal shielding layer 252 is not arranged between the signal electrical connector 251 and the magnetic core 211, so that the signal electrical connector 251 is easily interfered by the electric field generated by the rapidly changing voltage on the winding. Therefore, the easily interfered analog signal needs to be arranged close to the VIN electrical connector 231/232, so that the VIN electrical connector 231/232 is arranged between the easily interfered signal electrical connector and the winding, and the VIN electrical connector 231/232 plays a role in the shielding layer.

Embodiment 9

Figure 10A:
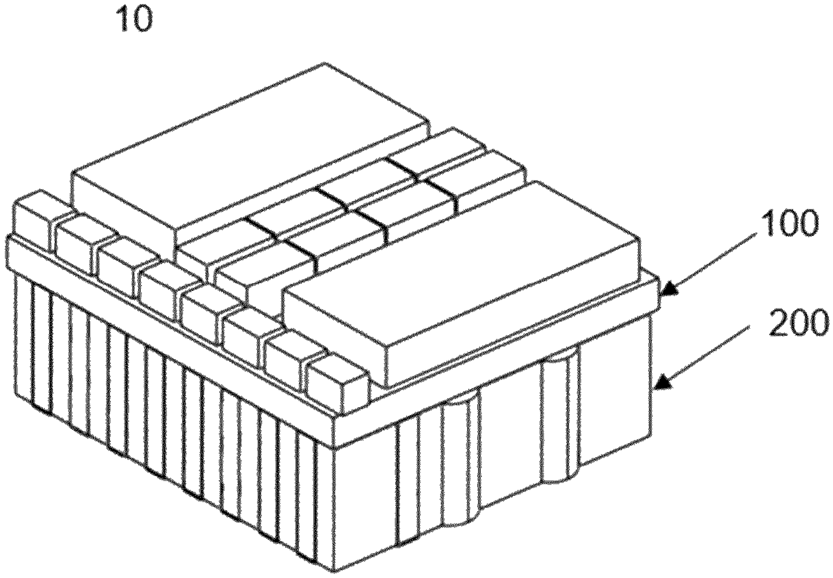
FIG. 10A to FIG. 11C are schematic diagrams of Embodiment 9.
Figure 10B:
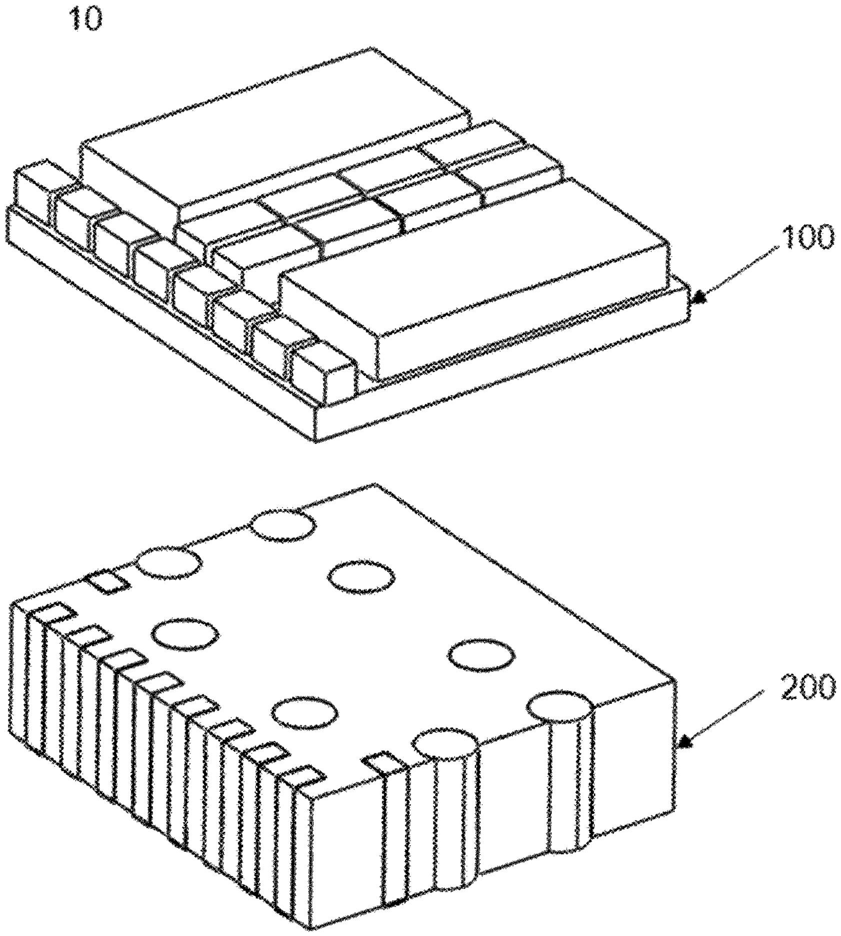
Figure 10C:
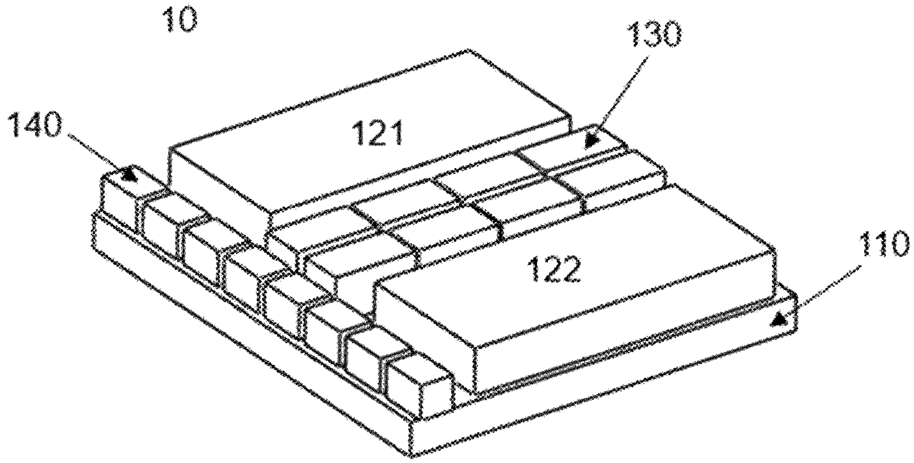

FIG. 10A is a schematic structural diagram of a two-phase VRM module according to an embodiment, FIG. 10B is an exploded view of FIG. 10A, and FIG. 10C is a schematic structural diagram of the top assembly 100 in FIG. 10B. As shown in FIGS. 10A to 10C, the VRM module comprises a top assembly 100 and an intermediate assembly 200. The top assembly 100 comprises a top plate 110 and an IPM unit 121/122 (the IPM unit in the embodiment is an unpackaged bare die, and SW, VIN and GND pins are distributed in a staggered mode), an input capacitor Cin 130 and other passive elements 140. The IPM units 121 and 122 are arranged on the first side surface which is close to the top plate 110. The input capacitor Cin 130 is arranged between the two IPM units 121/122. Because the closer to the VIN input end of the IPM, the better the filtering effect is. The other passive elements 140 are mainly passive elements for controlling the signal loop in the IPM units 121/122 and are arranged at one end close to the control signal of the IPM, so that a good filtering effect is achieved.

As shown in FIG. 10B, the intermediate assembly 200 and the fifth embodiment of the present embodiment have the same structure and technical effect, and details are not described herein again.

Figure 10D:
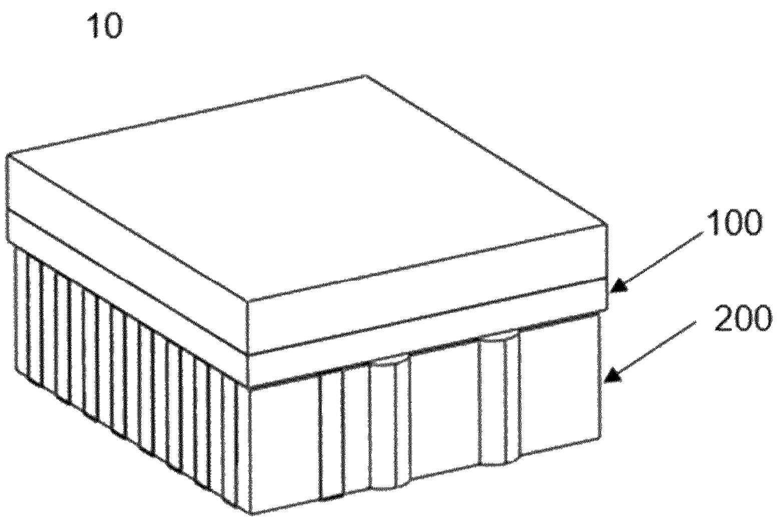
Figure 10E:
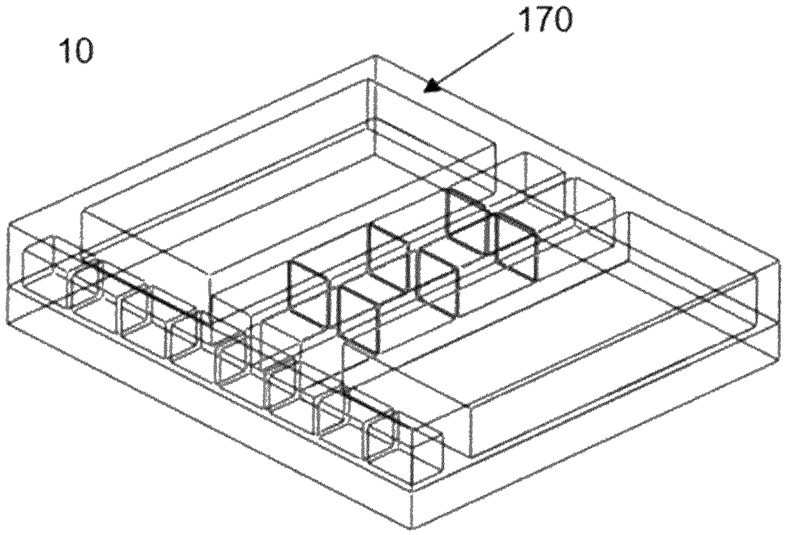

As shown in FIG. 10D and FIG. 10E, the IPM units 121/122 and the input capacitor 130 on the top plate 110 are packaged together by the plastic package 170 to improve the reliability of the module, and FIG. 10E is a perspective view of the top assembly 100 in FIG. 10D.

Figure 11A:
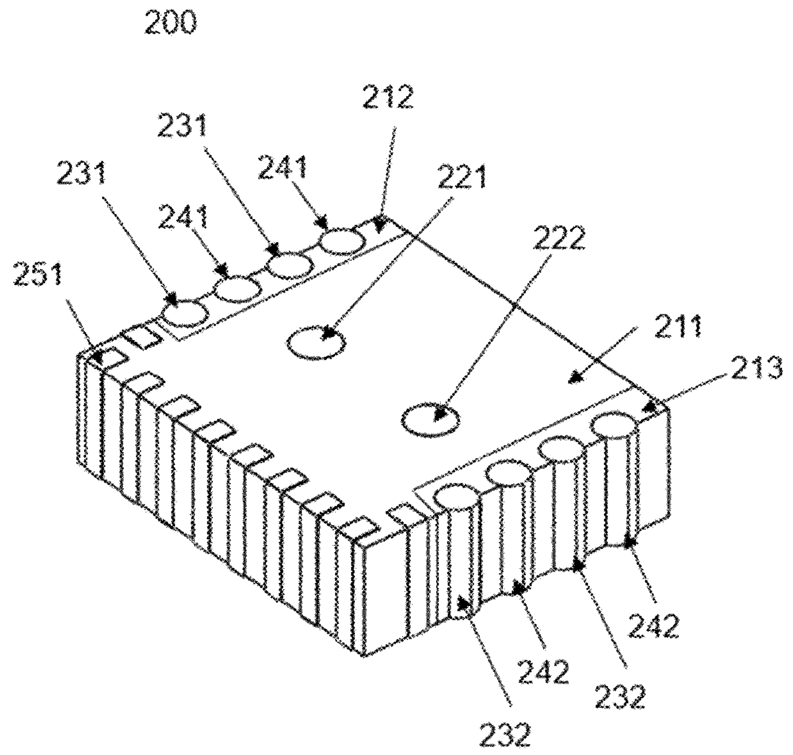
Figure 11B:
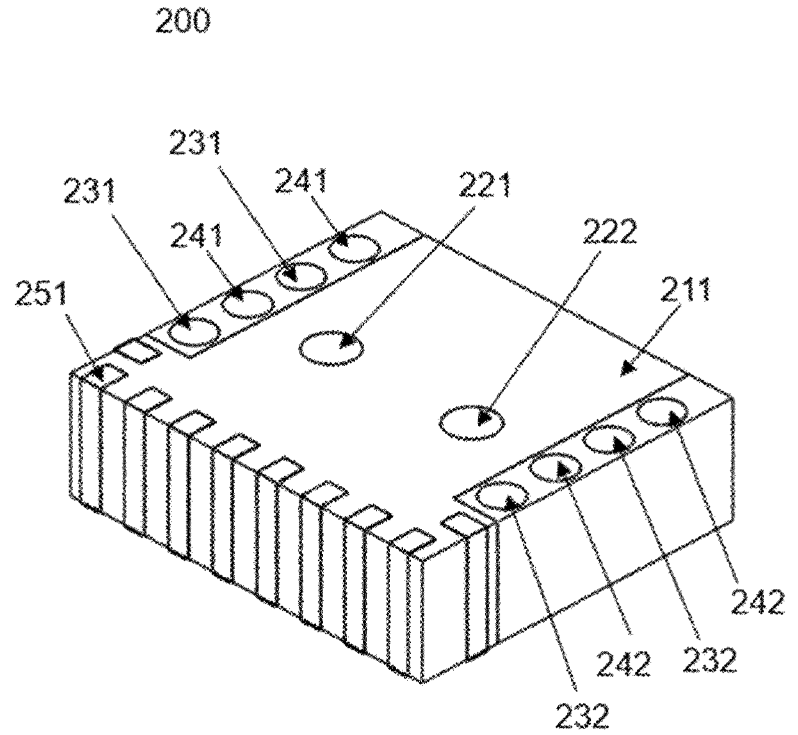
Figure 11C:
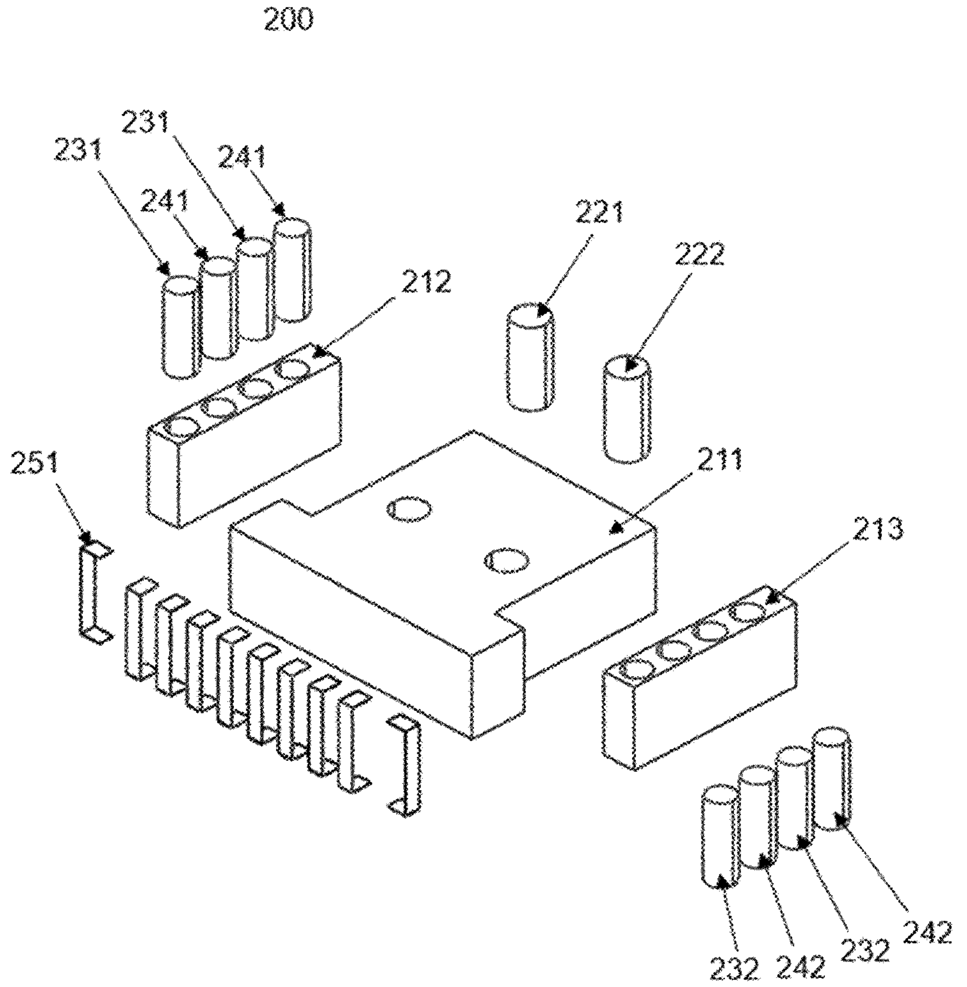

FIGS. 11A and 11B are another structural form of the present embodiment; FIG. 11C is an exploded view of the structure of FIG. 11B. The main difference of the intermediate assembly 200 shown in FIG. 11A lies in the arrangement of a VIN electrical connector 231/232 and a GND electrical connector 241/242. A plurality of VIN electrical connectors 231 and a plurality of GND electrical connectors 241 are staggered on a second side surface of the magnetic core 211. A plurality of VIN electrical connectors 232 and A plurality of GND electrical connectors 242 are arranged on the fourth side surface of the magnetic core 211 in a staggered mode, so that the parasitic inductance of the VIN-GND loop is small, the resonance frequency of resonance between the parasitic inductance of the VIN-GND loop and the input capacitor is far higher than the equivalent working frequency of the two-phase VRM module, the influence of resonance on normal work of the VRM module is avoided, and the improvement efficiency is facilitated.

It is generally desired that the resonant frequency between the input parasitic inductance and the input capacitor is higher than the phase number of the voltage reduction circuit of the VRM module multiplied by the switching frequency of the IPM. Preferably, the resonant frequency between the input parasitic inductance and the input capacitor is higher than the phase number of the voltage reduction circuit of the VRM module multiplied by the switching frequency of the IPM and multiplied by 1.5 times.

Specifically, as shown in FIG. 11B and FIG. 11C, in this embodiment, a magnetic core 211, a magnetic core 212, and a magnetic core 213 are included. The magnetic core 212 completely wraps the VIN electrical connector 231 and the GND electrical connector 241. The magnetic core 213 completely wraps the VIN electrical connector 232 and the GND electrical connector 242. The magnetic core 212 and the magnetic core 213 have relatively low magnetic permeability, so that the parasitic inductance of the VIN-GND loop is further reduced, and the resonance frequency of resonance between the VIN-GND loop parasitic inductance and the input capacitor is far higher than the equivalent working frequency of the two-phase VRM module.

Therefore, the influence of resonance on the normal work of the VRM module is avoided, and the improvement efficiency is facilitated.

In a preferred embodiment, the material of the magnetic core 212/213 area close to the VIN electrical connector 231/232 and the GND electrical connector 241/242 has a lower magnetic permeability, and further has a numerical value, for example, less than 10; or the material of the magnetic core 212/213 area is a non-magnetic material, thereby further reducing the parasitic inductance of the VIN-GND loop.

Embodiment 10

Figure 12A:
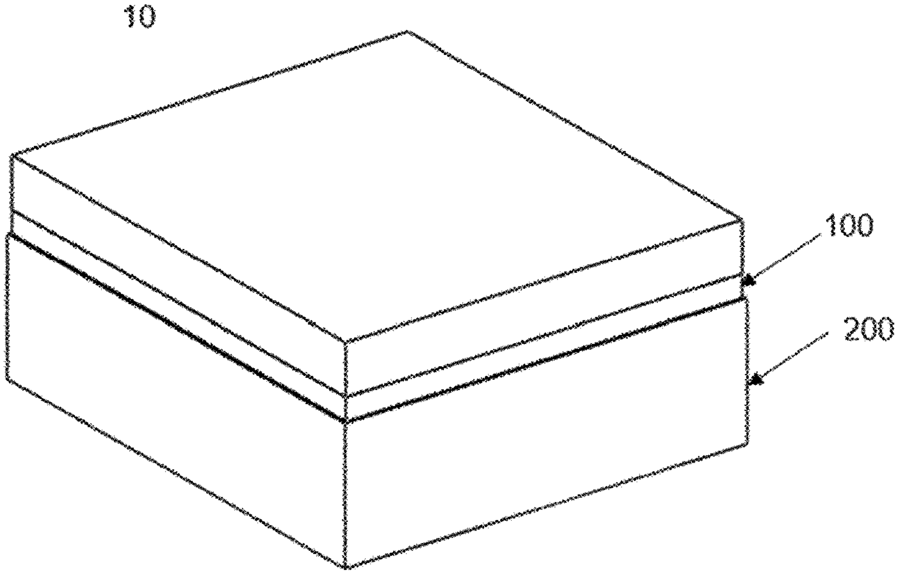
FIG. 12A to FIG. 12C are schematic diagrams of Embodiment 10.
Figure 12B:
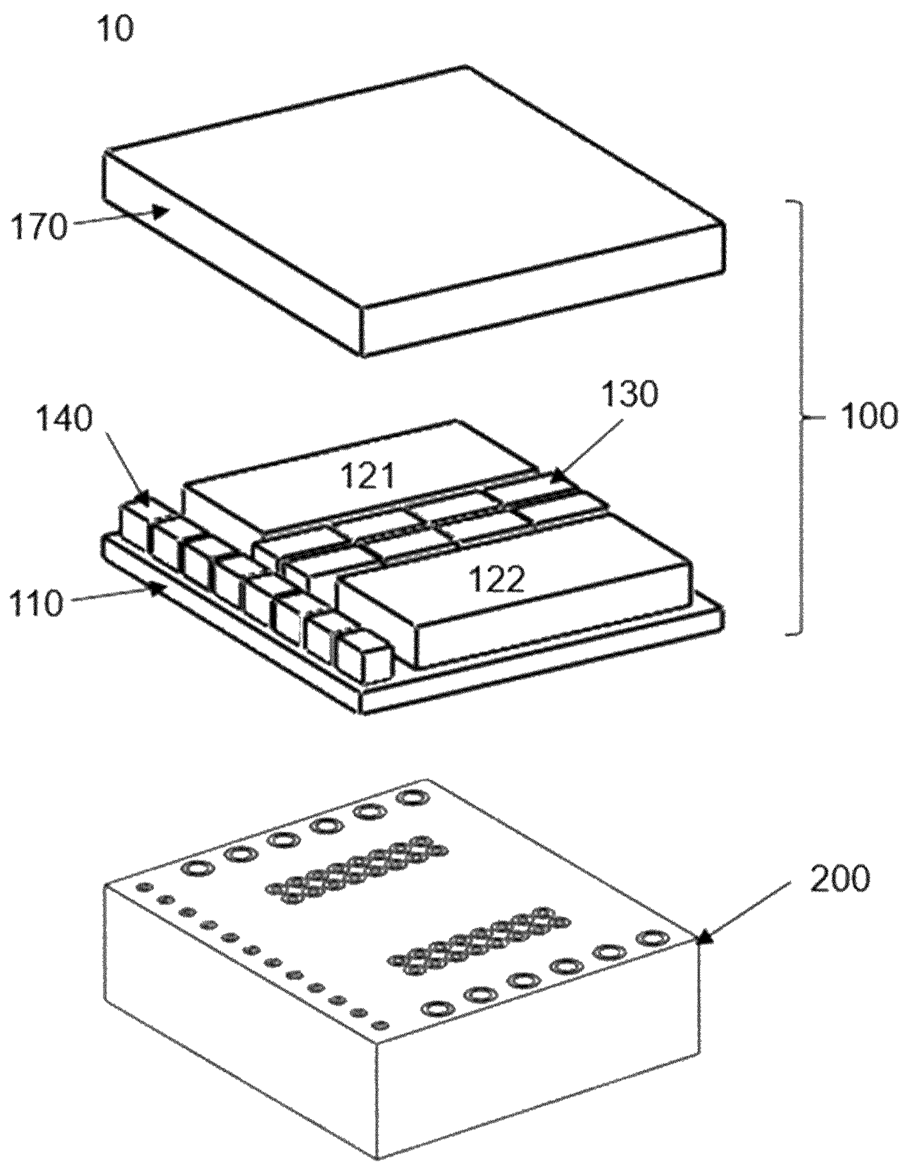
Figure 12C:
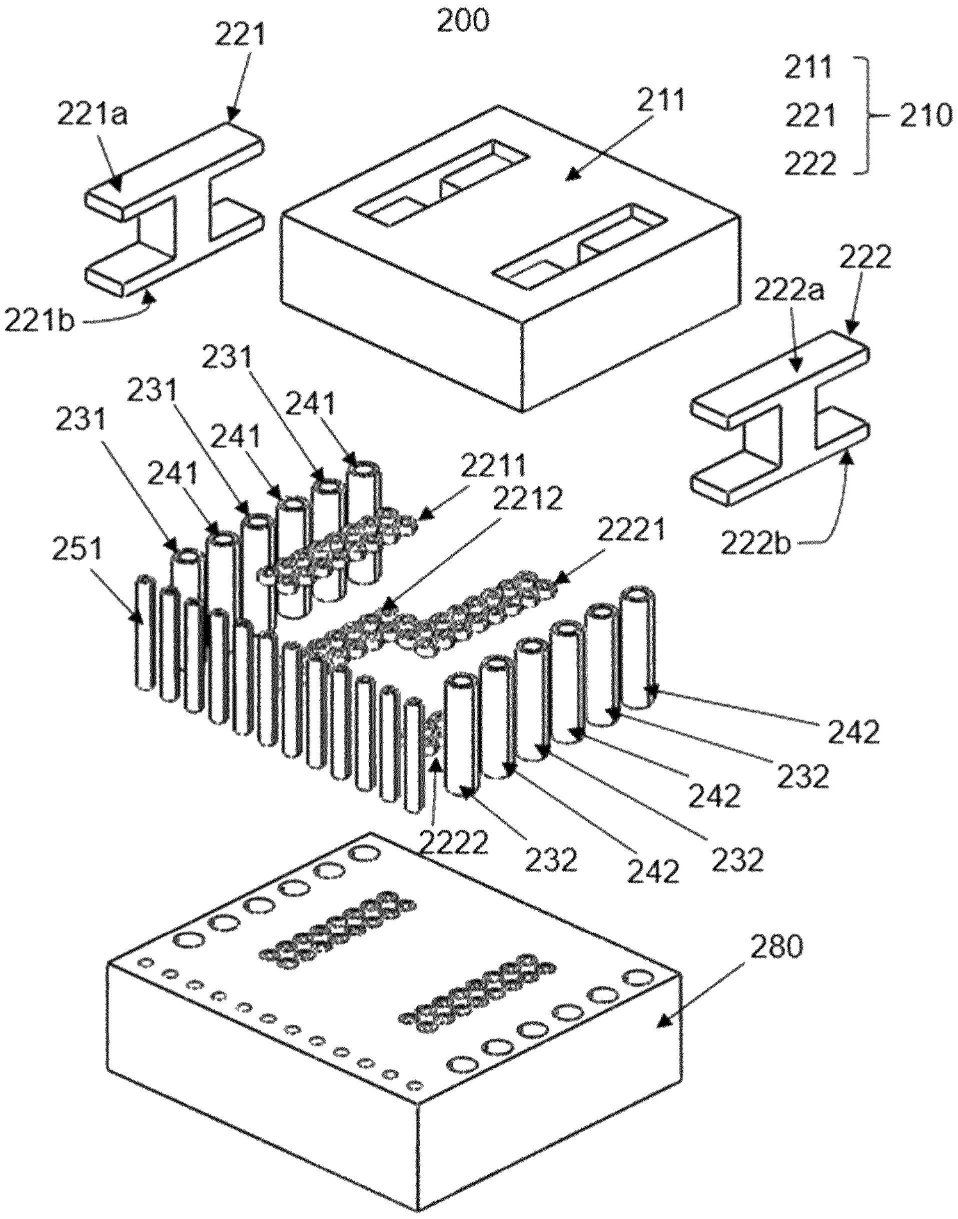

FIG. 12A is a schematic structural diagram of a two-phase VRM module according to an embodiment; and FIG. 12B is a structural exploded view of FIG. 12A; FIG. 12C is a structural exploded view of the intermediate assembly 200 of FIG. 12B. As shown in FIG. 12A, the present embodiment comprises a top assembly 100 and an intermediate assembly 200. The top assembly 100 comprises a top plate 110, an IPM unit 121, an IPM unit 122, an input capacitor 130, other passive elements 140 and a plastic package 170 for plastic packaging of the above. The intermediate assembly 200 comprises an inductor assembly 210, an intermediate PCB 280, a VIN electrical connector 231/232, a GND electrical connector 241/242, and a signal electrical connector 251 implemented by a PCB process. That is, the intermediate assembly 200 in the present embodiment is embedded in the PCB by means of a PCB process, and the power electrical connection assembly and the signal electrical connector 251 are realized by means of PCB through holes or blind holes or side wall electroplating.

As shown in FIG. 12C, the inductor assembly 210 comprises a magnetic core 211, a first winding 221 and a second winding 222. The first winding is provided with a first pin 221*a* on the top surface of the magnetic core 211; the first winding is provided with a second pin 221*b* on the bottom surface of the magnetic core 211; the second winding is provided with a first pin 222*a* on the top surface of the magnetic core 211; the second winding is provided with a second pin 222_b_ on the bottom surface of the magnetic core 211. The first pin 221_a_ of the first winding forms a bonding pad on the top surface of the intermediate PCB 280 through a blind hole 2211 of the PCB, and is used for connecting SW Pad of the IPM unit 121 on the top plate 110. The second pin 221_b_ of the first winding forms a bonding pad on the bottom surface of the intermediate PCB 280 through a blind hole 2212 of the PCB and is used for connecting an external load on the client mainboard. The first pin 222_a_ of the second winding forms a bonding pad on the top surface of the intermediate PCB 280 through a blind hole 2221 of the PCB, and is used for connecting SW Pad of the IPM unit 122 on the top plate 110. The second pin 222_b_ of the second winding forms a bonding pad on the bottom surface of the intermediate PCB 280 through the blind hole 2222 of the PCB, and is used for connecting an external load on the client mainboard. the VIN electrical connector 231 and the GND electrical connector 241 are both realized by through holes of the PCB and are arranged on the second side surface of the magnetic core 211 in a staggered mode. The VIN electrical connector 232 and the GND electrical connector 242 are both realized by through holes of the PCB and are arranged on the fourth side surface of the magnetic core 211 in a staggered mode. The signal electrical connector 251 is realized by through holes of the PCB and is arranged on the third side surface of the magnetic core 211. Preferably, due to the fact that the cross sectional area of the blind hole 2221/2222 is limited, the end face of the inductor winding can be set to be in the shape of extension and pull length, such as a rectangle, a rounded rectangle, an ellipse, a runway shape and the like, so that one inductor winding can be electrically connected with a plurality of blind hole electrical connectors arranged in an array, and the direct current impedance is reduced.

All the power electrical connectors, the signal electrical connectors 251, and the blind holes connected to the inductor windings, the shape of the blind hole is not limited to a circle, and the process is not limited to conventional processes such as hole wall copper plating. The through hole can also be solid copper, and the hole can also be square or racetrack. The purpose of the application is to reduce the impedance of the connector and reduce the loss improving efficiency.

Embodiment 11

Figure 13A:
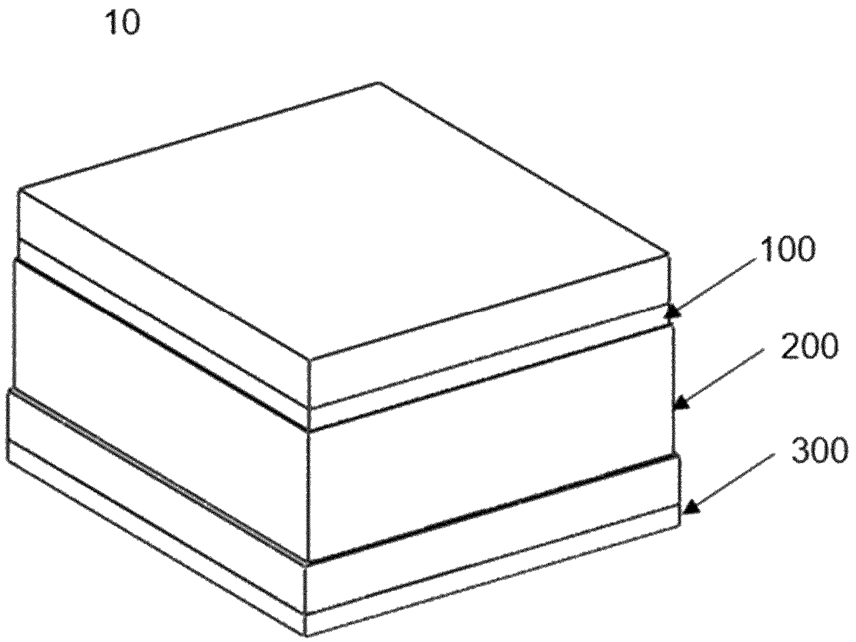
FIG. 13A to FIG. 13D are schematic diagrams of Embodiment 11.
Figure 13B:
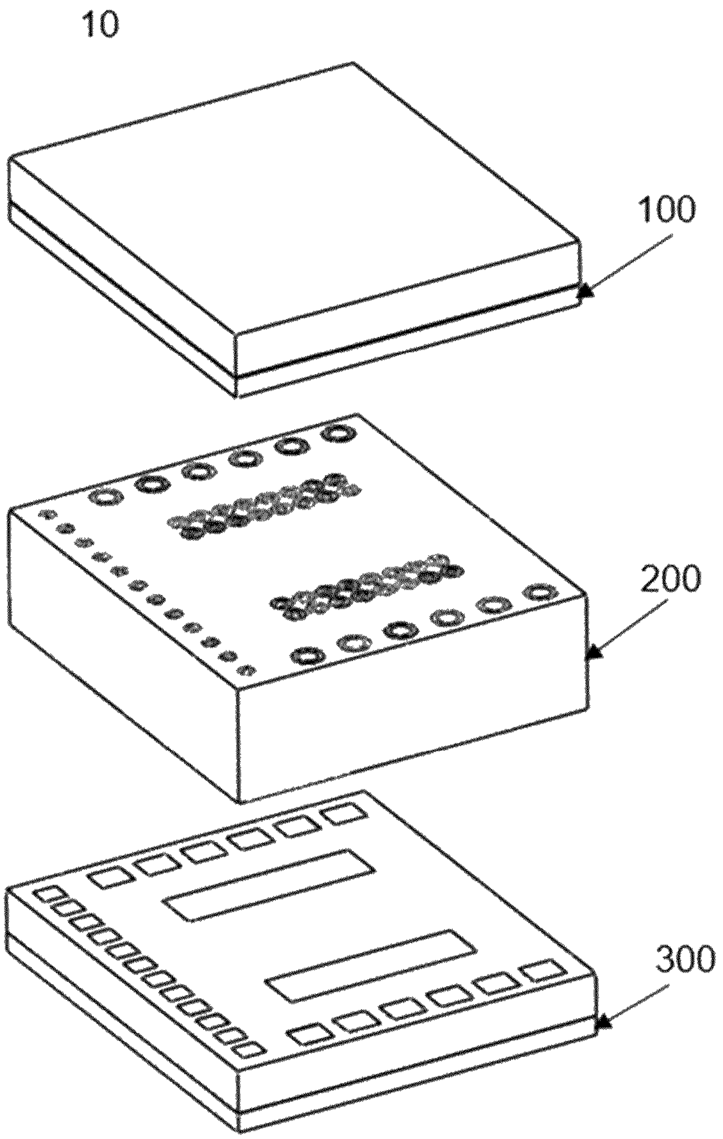
Figure 13C:
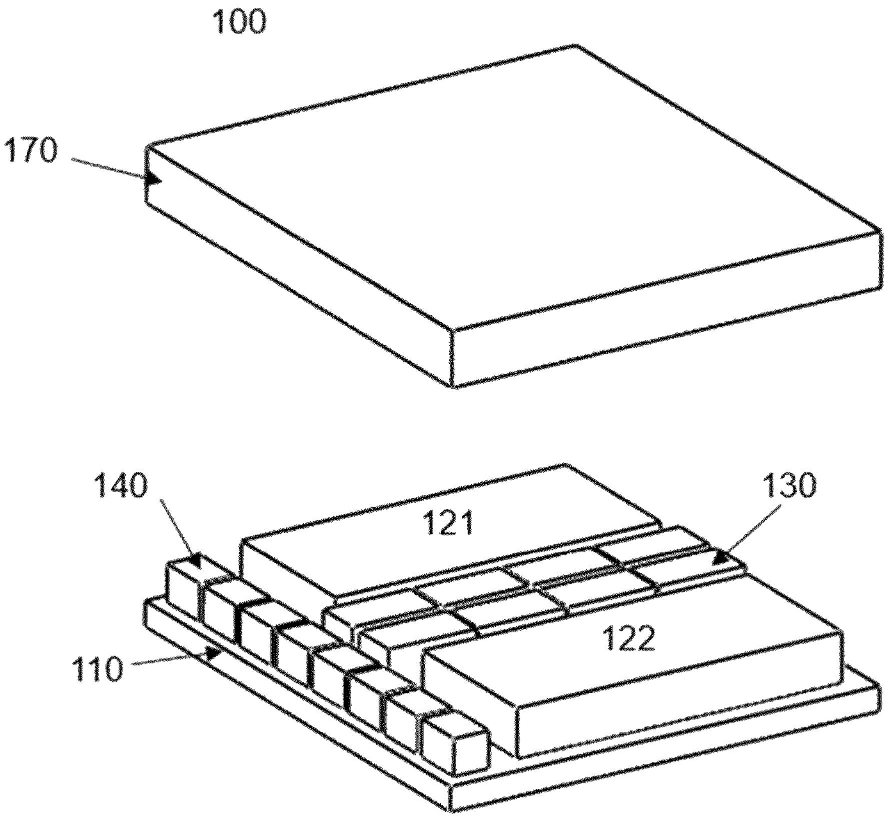
Figure 13D:
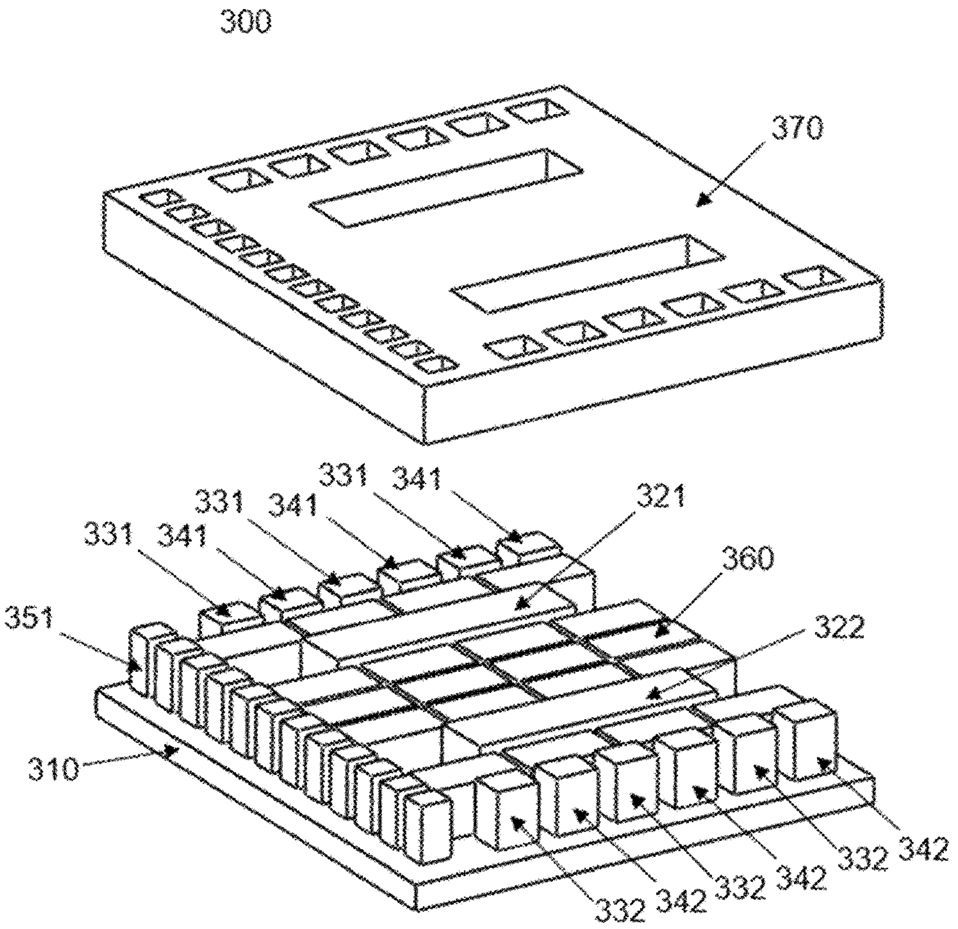

FIG. 13A is a schematic structural diagram of a two-phase VRM module according to an embodiment; and FIG. 13B is a structural exploded view of FIG. 13A; FIG. 13C is a structural exploded view of the top assembly 100 in FIG. 13B; FIG. 13D is a structural exploded view of the bottom assembly 300 in FIG. 13B. The embodiment has the same technical effect as the embodiment 10, and the difference between the embodiment and the embodiment 10 is that the bottom assembly 300 is added in the embodiment. As shown in FIG. 13D, the bottom assembly 300 comprises a bottom plate 310, a copper column 321/322/331/332/341/342/351 and an output capacitor Co 360. The copper columns 321/322 are used for being connected with an inductor winding bonding pad and a bottom plate 310 on the bottom surface of the intermediate PCB 280, and finally are connected to an external load mainboard. The copper column 331/332/341/342 is used for connecting the VIN electrical connector 231 and the GND electrical connector 241 and the bottom plate 310, and is finally connected to an external load mainboard to realize power transmission. The copper column 351 is used for connecting the signal electrical connector 251 on the intermediate assembly 200 and the external load mainboard to realize signal transmission. The output capacitor Co 360 is connected in parallel with the output ends, so that the dynamic performance of the VRM output voltage can be greatly improved.

Embodiment 12

Figure 14A:
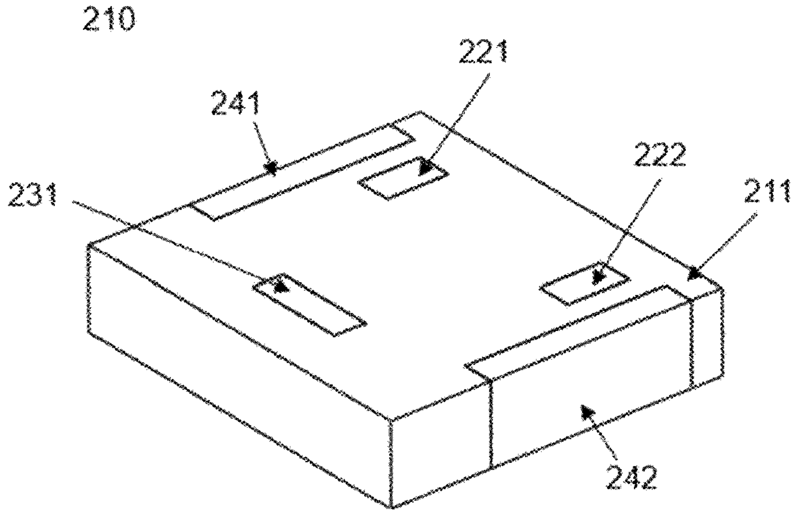
FIG. 14A to FIG. 14E are schematic diagrams of Embodiment 12
Figure 14B:
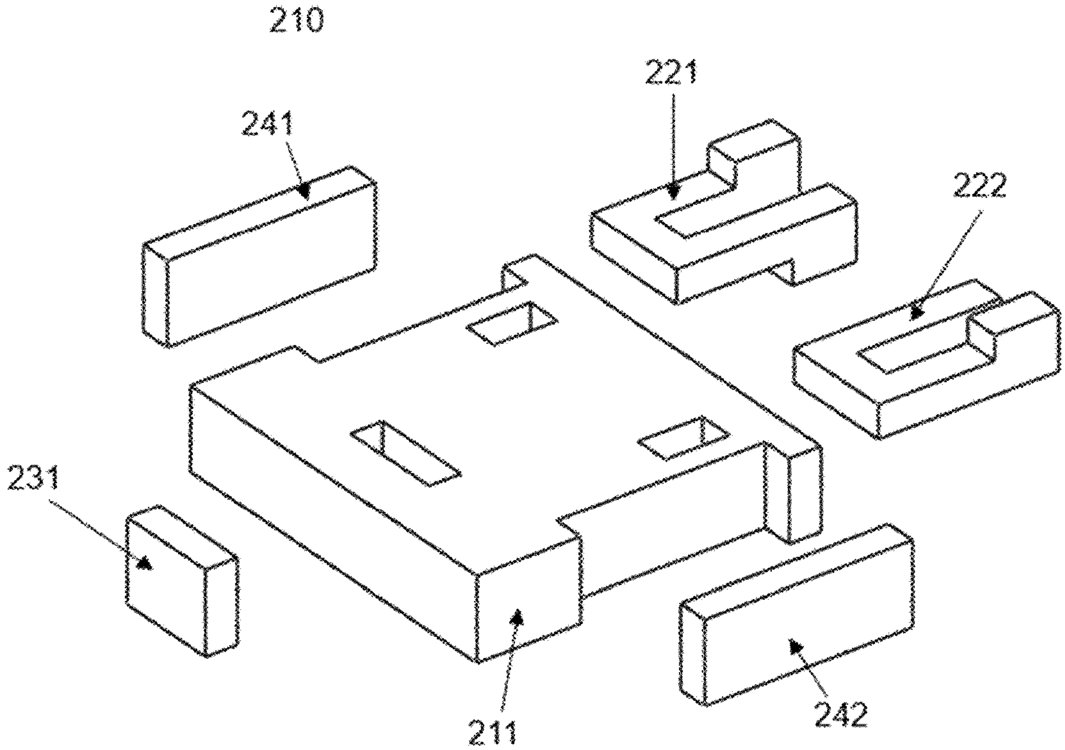
Figure 14C:
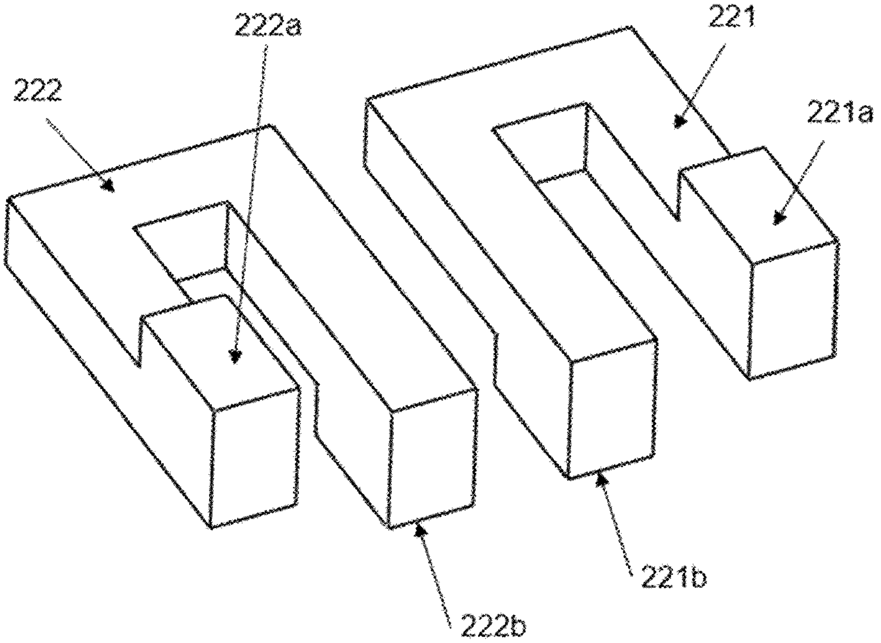

FIGS. 14A-14C illustrate embodiments of an inductor winding and a power electrical connection assembly in different shapes; FIG. 14B is a structural exploded view of FIG. 14A; FIG. 14C is a schematic structural diagram of a first winding 221 and a second winding 222.

The first winding 221 and the second winding 222 are horizontal, and the first end of the winding extends upwards to the top surface of the magnetic core 211, a first pin 221_a_/222_a_ is formed on the top surface. The second end of the winding extends downwards to the bottom surface of the magnetic core 211, and a second pin 221_b_/222_b_ is formed on the bottom surface. The first pin 221_a_/222_a_ is connected with the SW pad of the IPM, and the second pin 221_b_/222_b_ is connected with an external load. The horizontal detour "n" shape can obtain a larger inductance under the height size of the same magnetic core 211, and the large inductance can reduce ripple current, so that the alternating current loss of the switching device is reduced, an ultra-thin VRM module is facilitated, and high efficiency is maintained. Therefore, under some applications, the efficiency of the VRM module can be improved by adopting the inductance shape of the embodiment. Compared with the column shape, the inductance shape in the embodiment occupies more volume in the horizontal direction, but does not have overlapping winding sections in the vertical direction, so that the inductance height is not additionally increased, and the inductance shape is also suitable for forming an ultra-thin VRM module.

In the embodiment, the first power electrical connector arranged in the magnetic core is a rectangular copper column (equivalent to the VIN electrical connector 231 in the figure), and the second power electrical connector is a pair of rectangular copper columns (equivalent to the GND electrical connectors 241/242 in the figure). The rectangular copper column can make full use of the space without wasting the equivalent sectional area of the magnetic core, and the efficiency is improved. In the embodiment, the first pins 221_a_/222_a_ of the inductor winding are only exposed on the top surface of the magnetic core; and the second pins 221_b_/222_b_ of the inductor winding are only exposed on the bottom surface of the magnetic core.

Figure 14D:
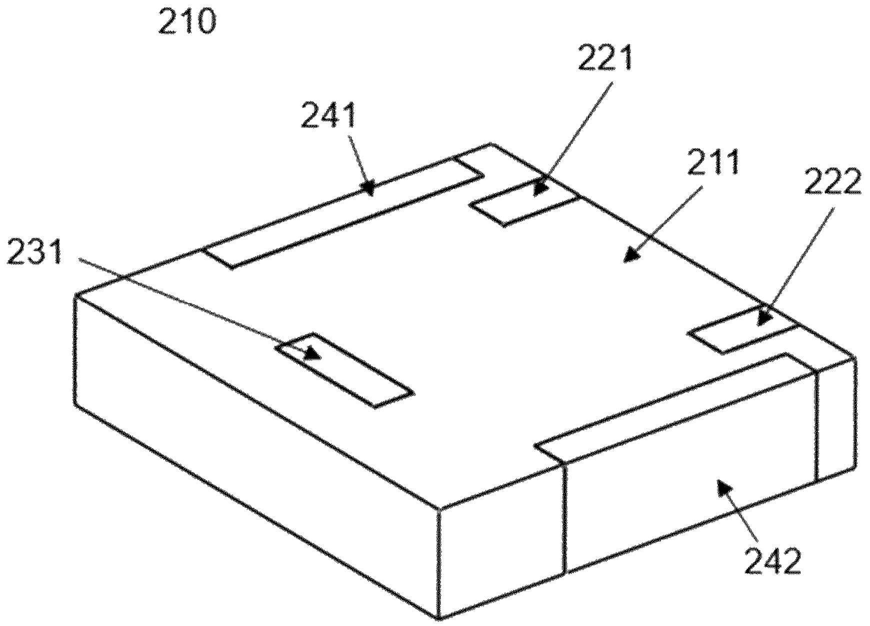
Figure 14E:
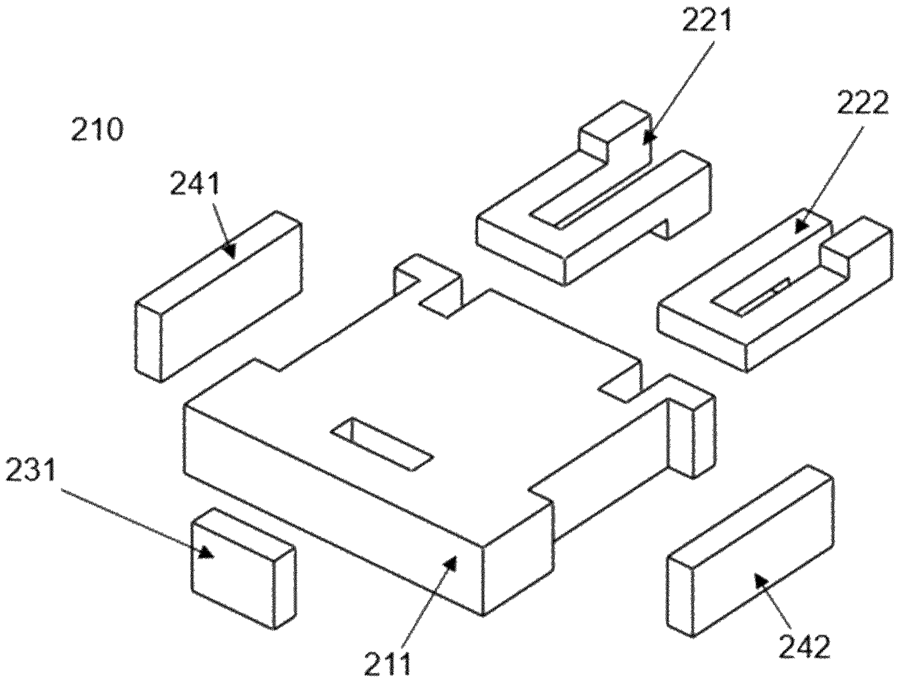

FIG. 14D is a structural form of an inductor assembly of another embodiment, and FIG. 14E is an exploded view of the structure of FIG. 14D; the inductor assembly shown in FIG. 14D has the same technical effect as the inductor assembly shown in FIG. 14A, and the difference lies in that the two ends of the first winding 221 and the two ends of the second winding 222 are close to and exposed out of the first side surface of the magnetic core 211. That is, the first pins 221_a_/222_a_ of the inductor winding are exposed on the top surface of the magnetic core and exposed to the first side surface. The second pins 221_b_/222_b_ of the inductor winding are not only exposed on the bottom surface of the magnetic core, but also exposed to the first side surface. The purpose of the arrangement is to greatly simplify the forming mode of the inductor.

Embodiment 13

Figure 15A:
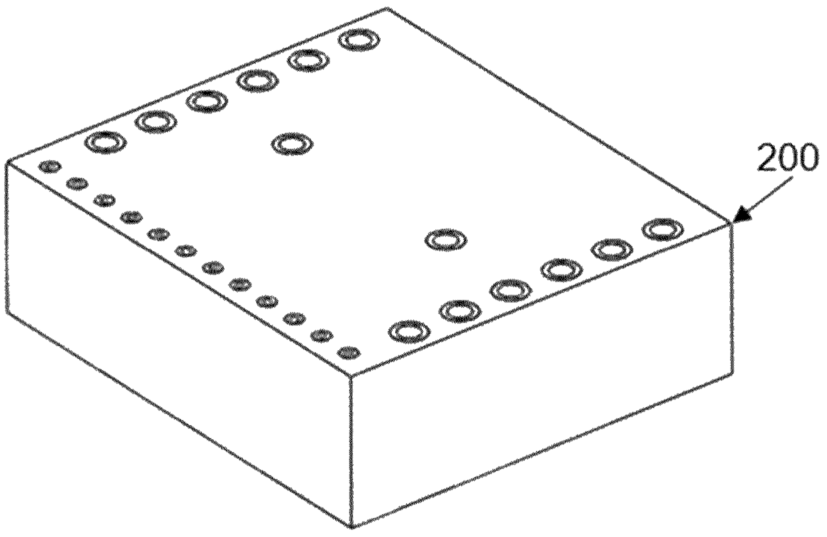
FIG. 15A to FIG. 15C are schematic diagrams of Embodiment 13.
Figure 15B:
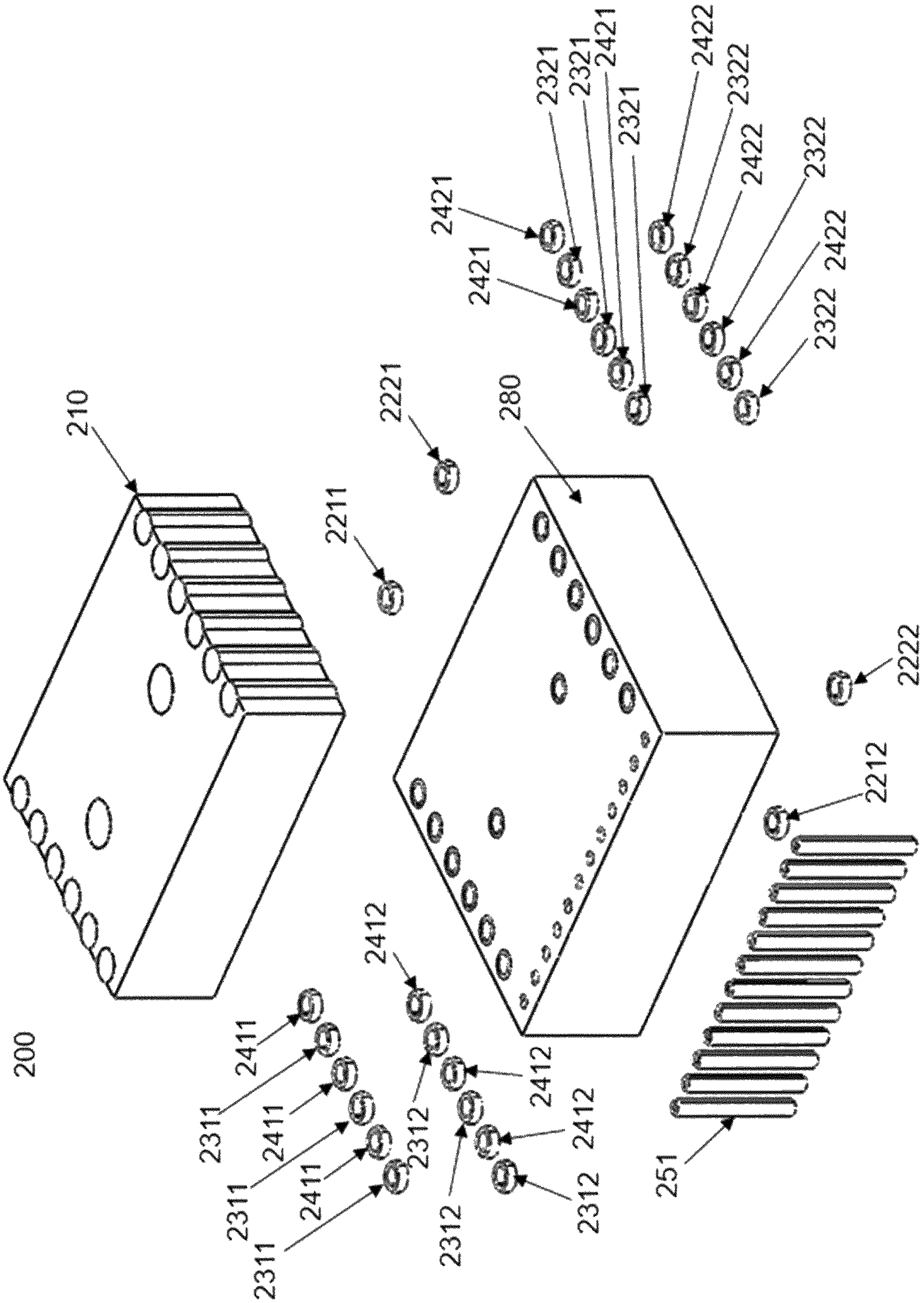
Figure 15C:
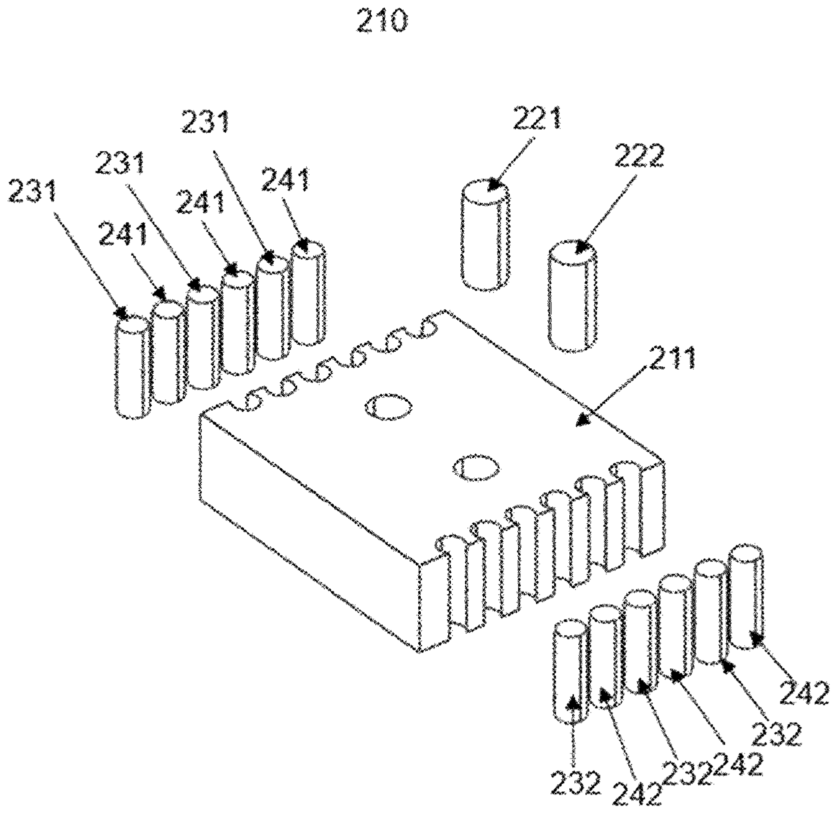

FIG. 15A is another preferred embodiment of the intermediate assembly 200 of embodiment 10; FIG. 15B is an exploded view of the structure of FIG. 15A; FIG. 15C is a structural exploded view of the inductor assembly 210 in FIG. 15B. As shown in FIGS. 15A to 15C, the magnetic core 211 and the winding are embedded in the intermediate PCB 280 through a PCB process to realize integration. The inductor in the embodiment is the same as the inductor in FIG. 11A. The first winding 221 and the second winding 222 vertically extend from the top surface of the magnetic core 211 to the bottom surface of the magnetic core 211. the VIN electrical connector 231 and the GND electrical connector 241 are alternately arranged by the copper column and are arranged on the second side surface of the magnetic core 211. The VIN electrical connector 232 and the GND electrical connector 242 are alternately arranged by the copper column and are arranged on the fourth side surface of the magnetic core 211. Compared with the embodiment 10, the power electrical connection assembly in the embodiment is mainly provided by the copper column integrated on the inductor magnetic core 211. The PCB process only connects the copper column of the power electrical connection assembly to the surface of the PCB substrate through the blind holes. For example, the VIN electrical connector 231 is connected to the top surface of the intermediate PCB 280 by the blind hole 2311 and is connected to the bottom surface of the intermediate PCB 280 by the blind hole 2312.

The copper column integrated on the magnetic core 211 has extremely low direct current impedance, so that the loss of the power electrical connection assembly can be greatly reduced; and the efficiency is improved.

Embodiment 14

Figure 16A:
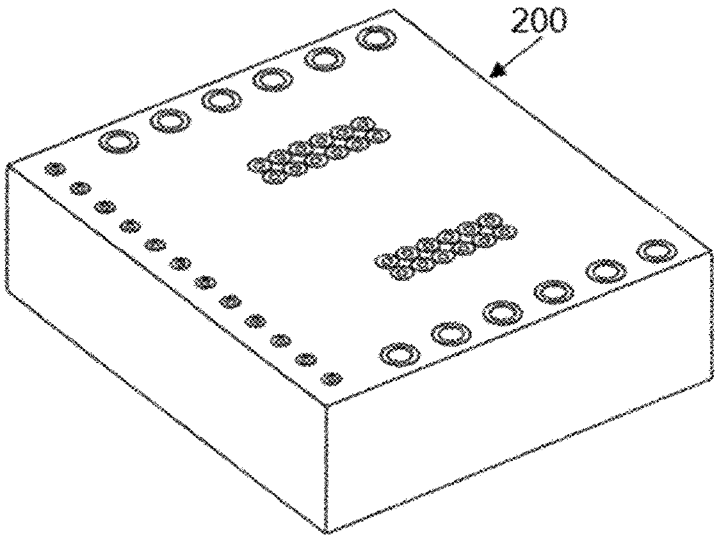
FIG. 16A to FIG. 16C are schematic diagrams of Embodiment 14.
Figure 16B:
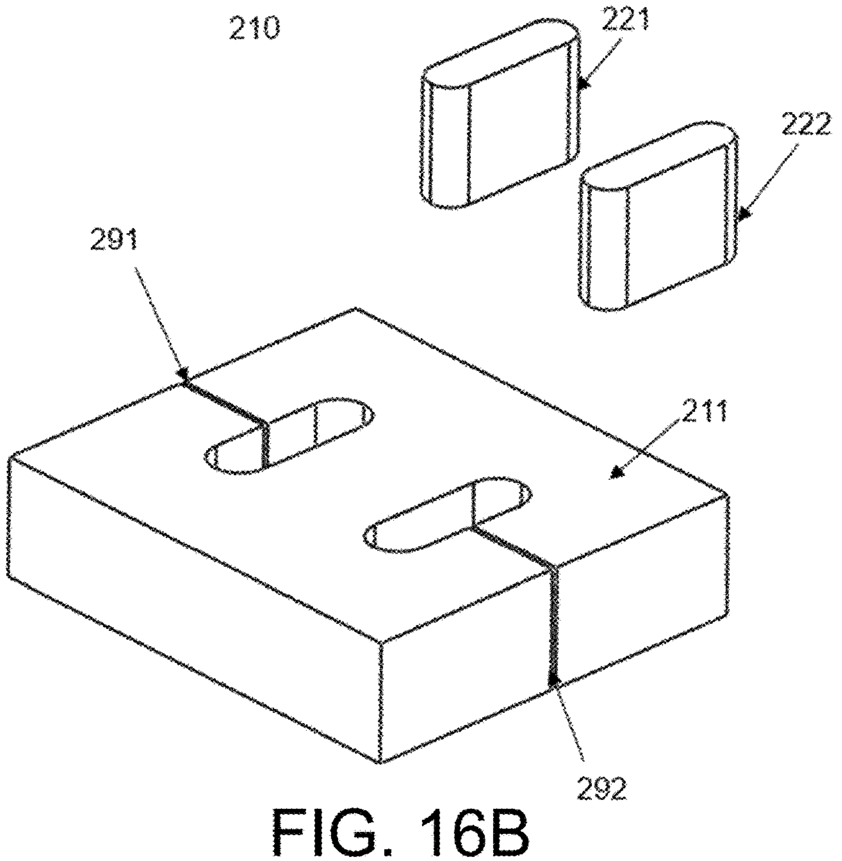

FIG. 16A is another preferred solution of the intermediate assembly 200 of Embodiment 10; FIG. 16B is a schematic structural diagram of the inductive assembly 210 in the intermediate assembly 200. The inductor assembly 210 in the embodiment has the same technical effect as Embodiment 10. The inductor assembly 210 in the embodiment comprises a magnetic core 211, a first winding 221 and a second winding 222. An air gap 291 and an air gap 292 are further formed in the magnetic core 211. The magnetic core 211 in the embodiment is formed by stacking sheet-shaped or strip-shaped magnetic materials, and is characterized in that the magnetic material has high magnetic conductivity and high saturation magnetic flux density, and the loss density of the magnetic core 211 is low. Because the magnetic conductivity is high, the magnetic core 211 needs to increase the air gap to adjust the inductance, the cross sections of the first winding 221 and the second winding 222 are in a strip shape such as a runway shape, so that after the windings are embedded into the intermediate PCB 280, more blind holes can be arranged when the PCB blind hole is connected to the surface of the PCB substrate. The impedance of the winding and the impedance of the blind hole connection are further reduced, the direct current loss of the winding is further reduced, the efficiency is improved, and the efficiency is particularly favorably improved. The magnetic core 211 is low in loss density and high in saturation magnetic flux density, a relatively small size or an ultra-thin structure can be used, large saturation current and small magnetic core loss can be achieved, and the light load efficiency is improved.

Figure 16C:
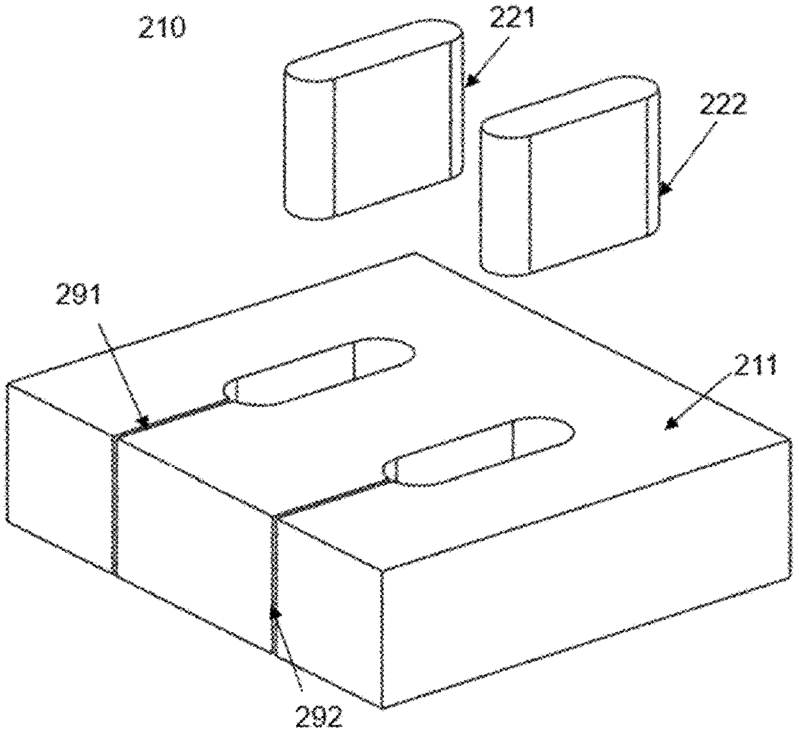

FIG. 16C is another preferred solution of the inductor assembly 210 in the present embodiment. The main difference between FIG. 16C and FIG. 16B lies in the positions of the air gaps 291 and 292. The air gaps 291/292 of the magnetic core 211 in the present embodiment are provided on the first side surface or the second side surface of the magnetic core 211. so that the purpose of arranging the air gap 291/292 to avoid the position of the power electrical connection assembly so as to reduce the eddy current loss of the edge magnetic flux of the air gap on the power electrical connection assembly is achieved, and the efficiency is improved.

Embodiment 15

According to the embodiment, the two-phase voltage reduction circuit is used for forming the VRM module for description. The module structure can be expanded to a VRM module formed by any 2N-phase voltage reduction circuit, and through configuration of the PWM signals of the 2N-phase voltage reduction circuit, the voltage waveform phase shift of the midpoint SW of the 2N-phase voltage reduction circuit bridge arm can be 360 degrees/2N or 360 degrees/N or 720 degrees/N. Due to the progress of the technology, the load current becomes larger and larger, and the actual use of a customer is also that a plurality of two-phase VRM modules are connected in parallel to form a multiphase buck conversion circuit. The multi-phase VRM module is integrated together, so that the installation space of a plurality of two-phase VRM module schemes and the benefits brought by magnetic integration can be saved. Embodiment 1 to embodiment 13 are described in a two-phase VRM module, and the embodiment is explained by taking an 8-phase VRM as an example.

Figure 17A:
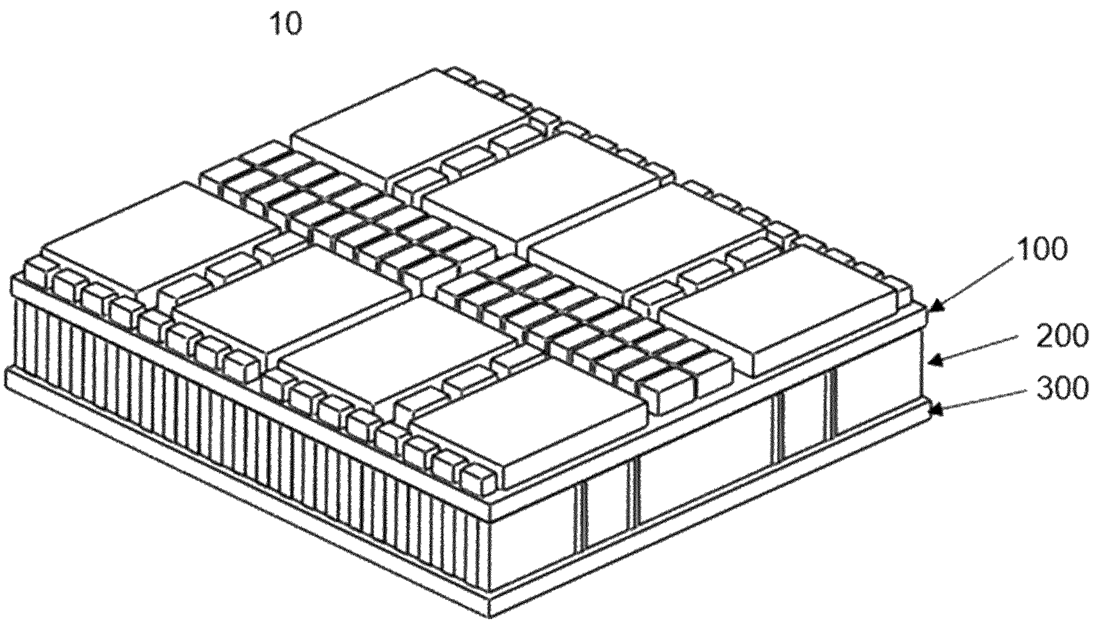
FIG. 17A to FIG. 17B are schematic diagrams of Embodiment 15.
Figure 17B:
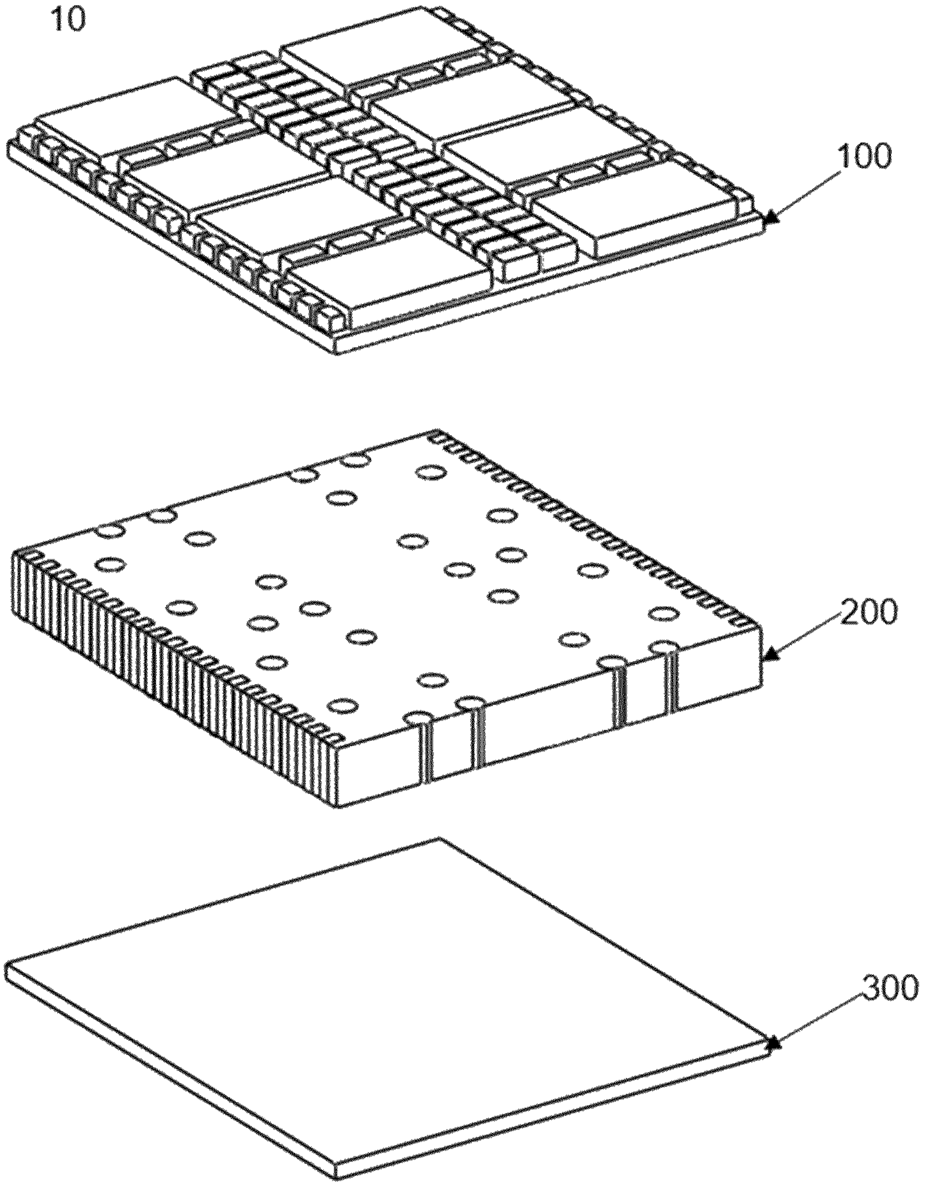

FIG. 17A is a schematic structural diagram of an 8-phase VRM module according to an embodiment; and FIG. 17B is a structural exploded view of FIG. 17A. As shown in FIG. 17A and FIG. 17B, the 8-phase VRM module of the present embodiment may be regarded as an integral magnetic core 211 formed by four embodiments 6, and the four embodiments 6 are combined together with the third side surfaces as an opposite outer side surface, so as to obtain an 8-phase VRM module. The 8-phase VRM module specifically comprises eight voltage reduction circuits. By configuring the PWM signals of the 8-phase voltage reduction circuit, the voltage waveform phase shift of the midpoint SW of the 8-phase voltage reduction circuit bridge arm can be 45 degrees or 90 degrees or 180. Compared with four two-phase VRM modules, whether the area of the magnetic core or the area of the VRM module is greatly reduced. The eight-phase VRM module is assembled on the client mainboard, so that a certain mainboard space can be saved for customers. Meanwhile, in the eight-phase windings of the magnetic core 211, direct-current magnetic flux generated by the direct-current currents of the magnetic cores between adjacent windings mutually counteract each other, further bears the same voltage phase, and the magnetic flux between the adjacent windings counteract each other, so that the section of the position magnetic core can be smaller than the other section of the magnetic core around the winding, and the size of the magnetic core 211 can be further saved as a result.

Embodiment 16

Figure 18A:
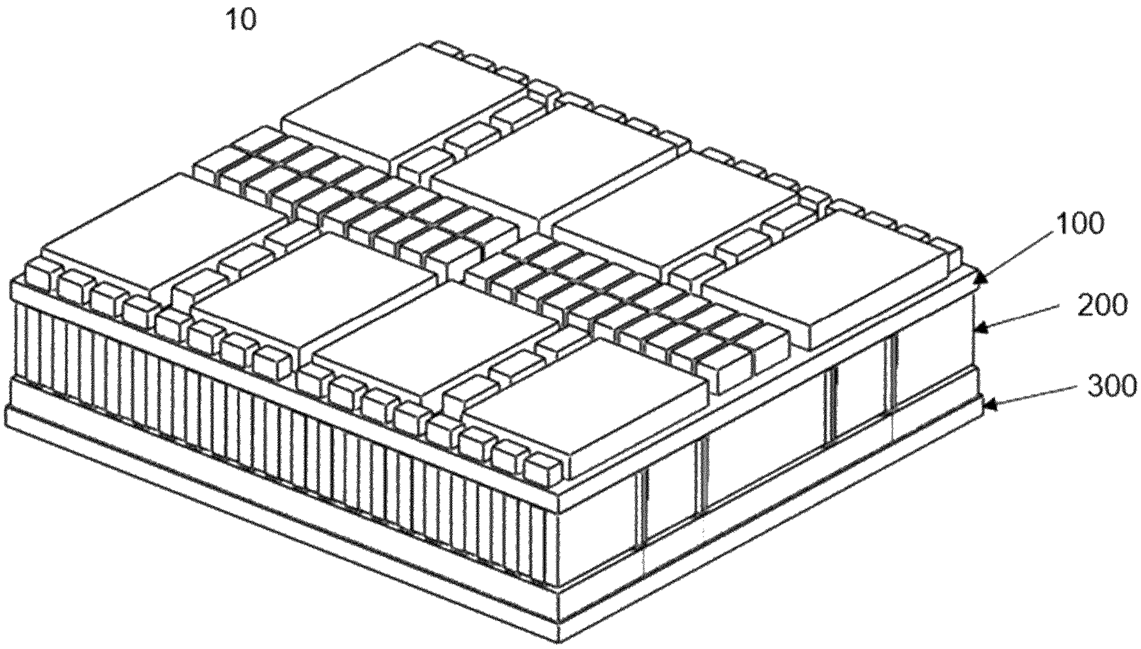
FIG. 18A to FIG. 18B are schematic diagrams of Embodiment 16.
Figure 18B:
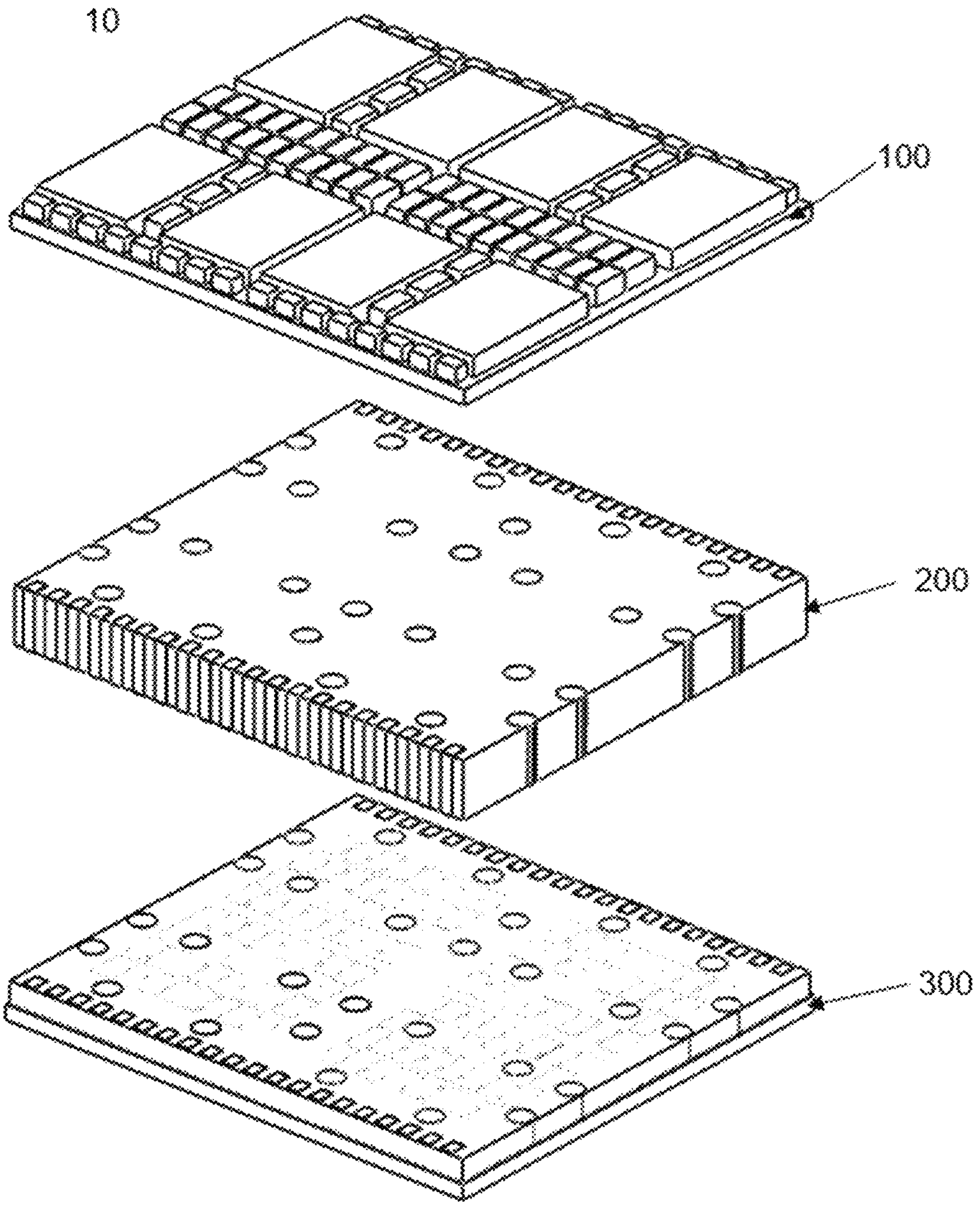

FIG. 18A is a schematic structural diagram of an 8-phase VRM module according to the embodiment, and FIG. 18B is a structural exploded view of FIG. 18A. The present embodiment has the same technical effect as Embodiment fourteenth. The difference between the present embodiment and the fourth embodiment is that the bottom assembly 300 is additionally provided with an output capacitor and an copper column. The capacitor and the copper column on the bottom plate are plastically packaged together by means of the plastic package 370.

Embodiment 17

Figure 19A:
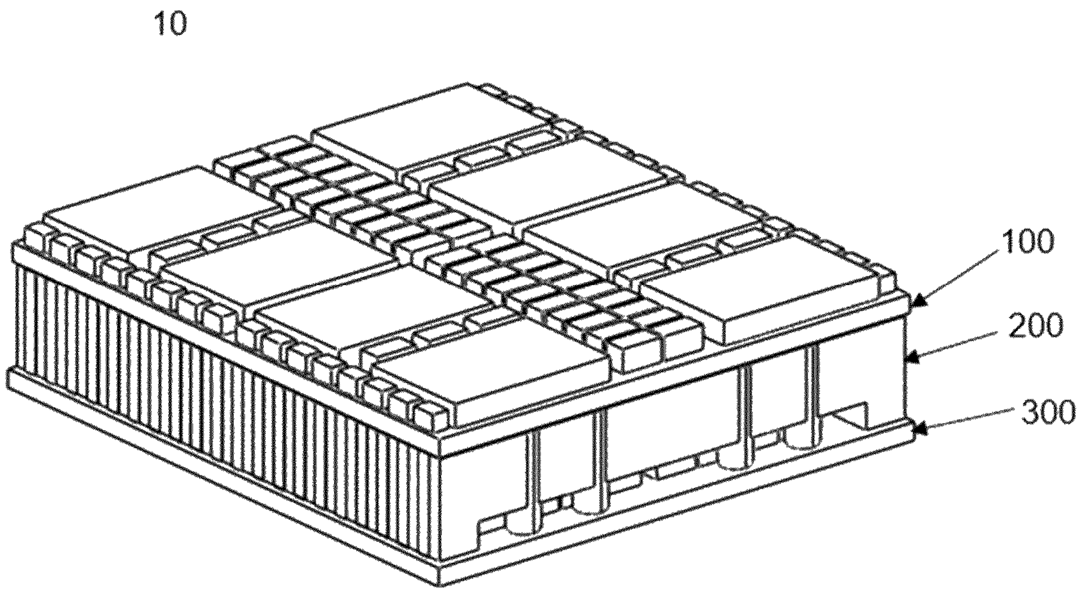
FIG. 19A to FIG. 19B are schematic diagrams of Embodiment 17.
Figure 19B:
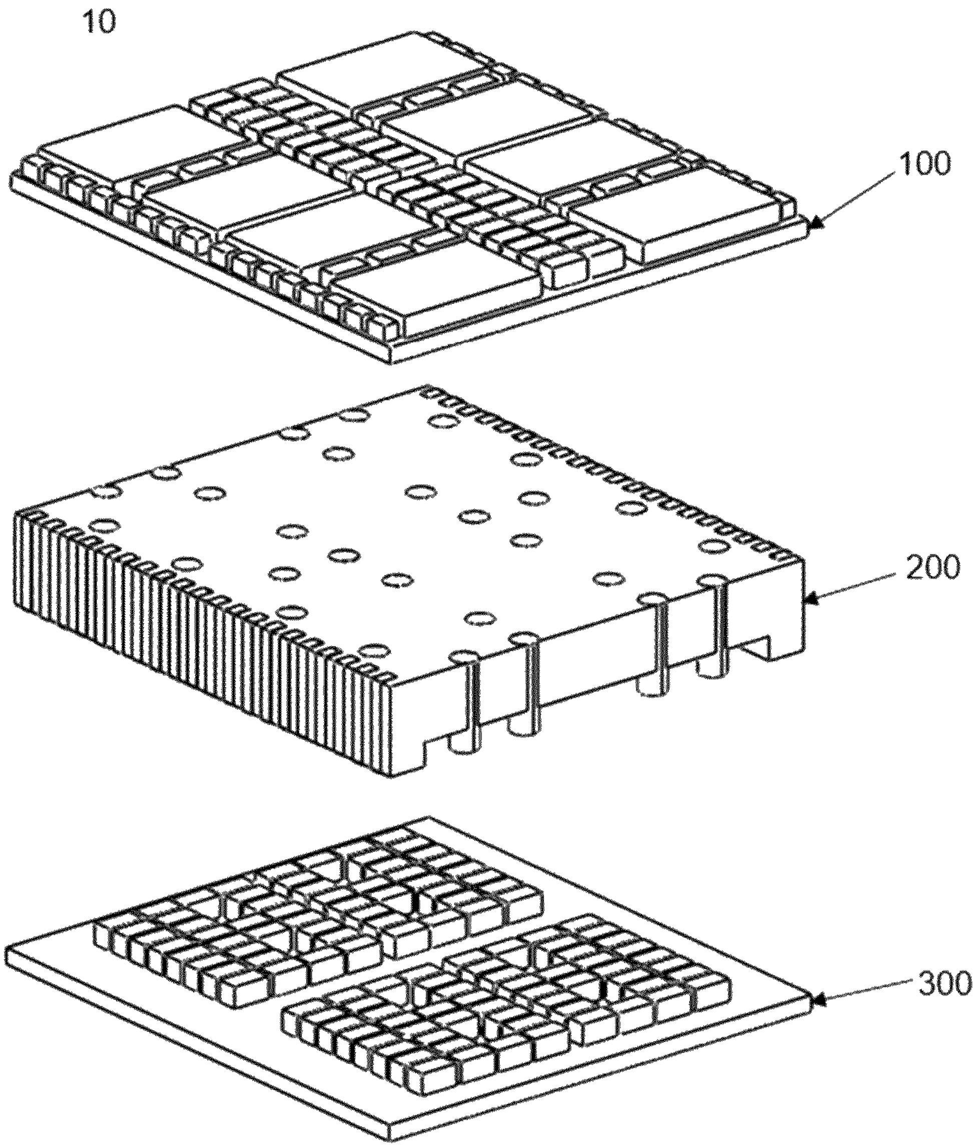

FIG. 19A is a schematic structural diagram of an 8-phase VRM module according to an embodiment, and FIG. 19B is a structural exploded view of FIG. 19A. The 8-phase VRM module of the present embodiment can be regarded as an integral magnetic core 211 formed by four structures according to Embodiment 8. Compared with four two-phase VRM modules, the eight-phase VRM module is assembled on a client mainboard, so that a certain mainboard space can be saved for customers. Meanwhile, the direct-current magnetic flux between the eight-phase windings of the magnetic core 211 counteract each other, and the size of the magnetic core 211 can be further saved. The two opposite side edges of the bottom of the magnetic core 211 (ie, the two side edges corresponding to the side surfaces provided with the signal electrical connectors 251) are provided with stepped protrusions, the reserved space of the grooves formed in the middle can be used for accommodating the output capacitor on the bottom plate, and the side surface of the magnetic core 211 can still achieve the function of the signal electrical connector 251 in an electroplating mode. The copper column does not need to be arranged on the bottom plate 310, and plastic packaging does not need to be carried out through the plastic packaging material 370. The manufacturing process is reduced, and the cost is saved.

Embodiment 18

Figure 20A:
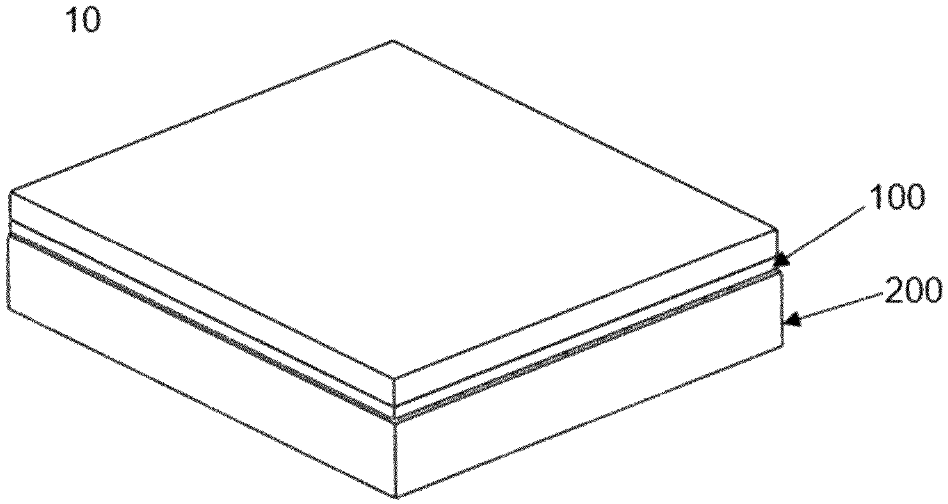
FIG. 20A to FIG. 20E are schematic diagrams of Embodiment 18.
Figure 20B:
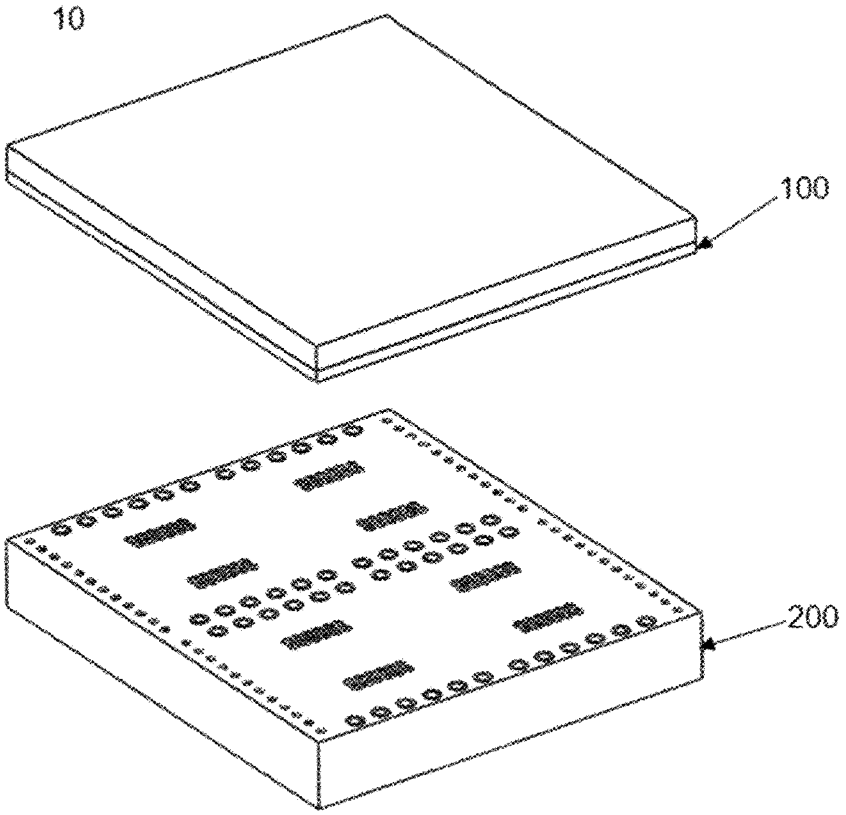
Figure 20C:
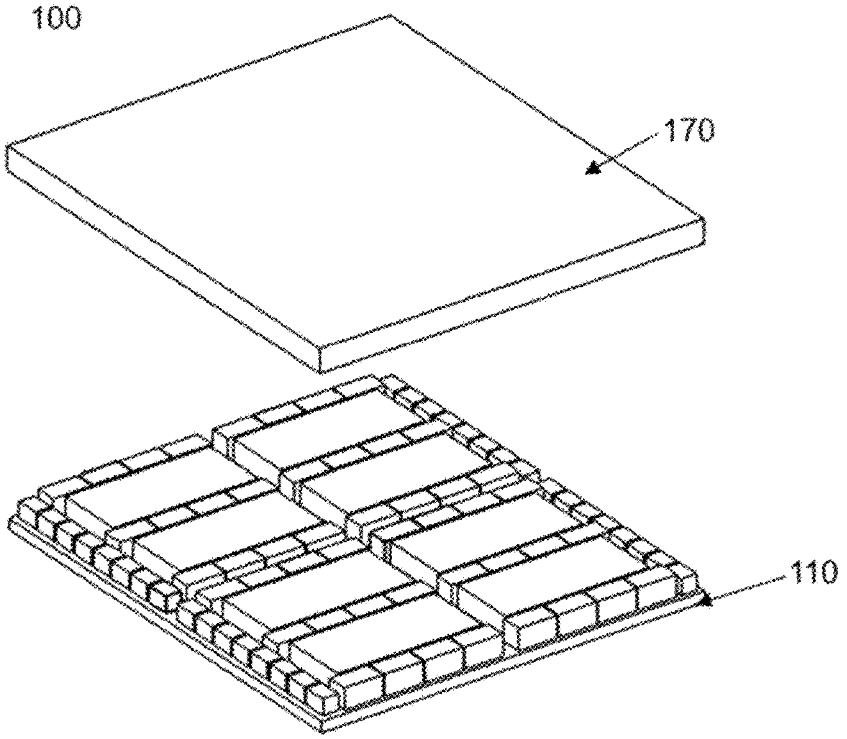
Figure 20D:
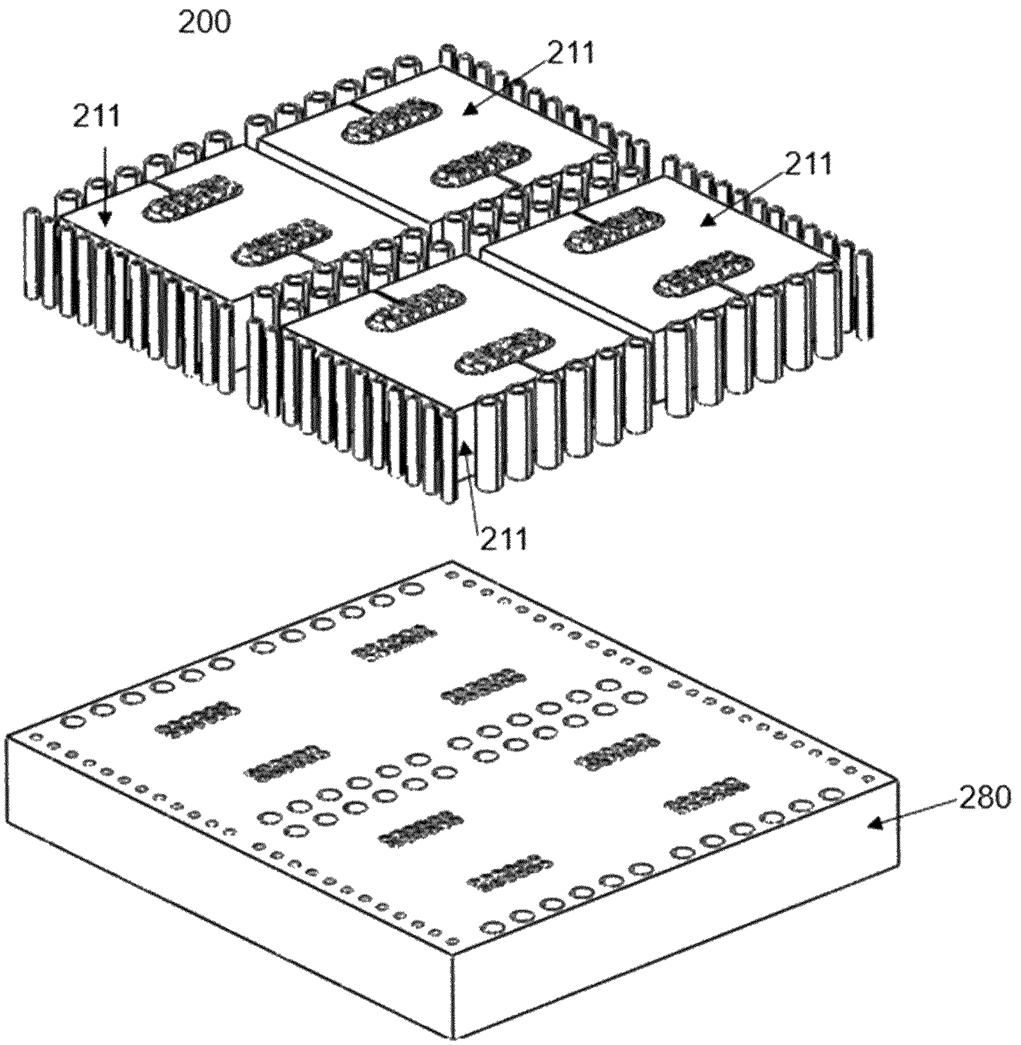
Figure 20E:
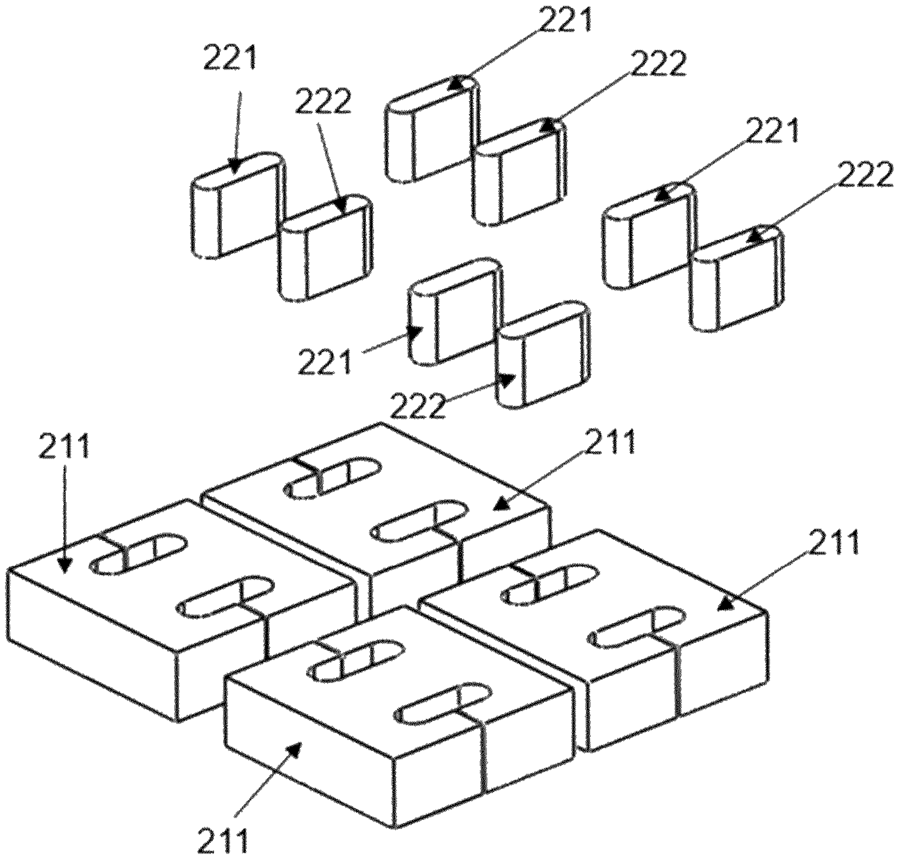

FIG. 20A is a schematic structural diagram of an 8-phase VRM module according to an embodiment; and FIG. 20B is an exploded view of the structure of FIG. 20A; FIG. 20C is a structural exploded view of the top assembly 100 in FIG. 20A; and FIG. 20D is an exploded view of the intermediate assembly 200; and FIG. 20E is a structural exploded view of the inductor assembly 210 in the intermediate assembly 200. As shown in FIGS. 20A-20E, in the present embodiment, an 8-phase VRM module is implemented by embedding four inductor assemblies 210 (specifically comprising a magnetic core 211 with an air gap as shown in FIG. 16B) shown in Embodiment 13 in an embedded manner by means of an intermediate PCB 280, so as to save space wasted by mounting a plurality of two-phase modules, and at the same time, the magnetic core 211 can be formed by one mold at a time, thereby saving the manufacturing cost of the magnetic core 211.

What is claimed is:

1. An ultra-thin voltage regulator module with high current density, comprising at least one inductor assembly, at least one top assembly and at least one power electrical connection assembly, wherein the inductor assembly is a 2N-phase ultra-thin inductor, and N is a positive integer;

wherein the inductor assembly comprises a magnetic core and an inductor winding, and the number of the inductor windings is at least the number of phases of the inductor assembly; the shape of the inductor winding is specifically an I-shaped or horizontal detour n shape;

wherein the power electric connection assembly comprises a first power electrical connector and a second power electrical connector, and top ends of the first power electrical connector and the second power electrical connector are electrically connected with the top assembly respectively;

wherein the at least one power electrical connector is embedded in the magnetic core, and/or the at least one power electrical connector is embedded partially in the magnetic core on a lateral surface; wherein the power electrical connector is configured for transferring power across the inductor assembly;

wherein the top assembly comprises a top plate and an integrated power module unit, the number of the integrated power module unit is at least the total phase number of the inductor assembly, a SW end of the integrated power module unit is vertically corresponding to the position of the inductor winding, and the SW end is electrically connected with the top of the inductor winding.

2. The ultra-thin voltage regulator module of claim 1, wherein the at least one power electrical connection assembly comprises a plurality of first power electrical connectors and a plurality of second power electrical connectors which are alternately arranged in an array.

3. The ultra-thin voltage regulator module of claim 1, wherein the height of the ultra-thin voltage regulator module is less than 6 mm.

4. The ultra-thin voltage regulator module of claim 1, further comprising a vertical plate and a signal electrical connector arranged in the vertical plate, wherein the vertical plate is arranged on at least one side of the inductor assembly, and a signal shielding layer is arranged on the side, facing the inductor assembly, of the vertical plate.

5. The ultra-thin voltage regulator module of claim 4, further comprising a control assembly, wherein the control assembly is arranged on the vertical plate or in the vertical plate, and the control assembly controls the integrated power module unit.

6. The ultra-thin voltage regulator module of claim 1, wherein the inductor assembly has a first side surface and a third side surface opposite to each other, the third side surface is provided with a signal electrical connector, a distance between the inductor winding and the first side surface is less than a distance between the inductor winding and the third side surface, and a top end of the signal electrical connector is electrically connected to a top component.

7. The ultra-thin voltage regulator module of claim 6, wherein the inductor assembly is in a mirror symmetry shape, one symmetrical surface of the inductor assembly is a first symmetric surface, the inductor assembly is provided with a first side surface and a third side surface which are parallel to the first symmetric surface, signal electrical connectors are arranged on the first side surface and the third side surface, and a distance between the inductor winding and the first symmetric surface is smaller than the distance between the inductor winding and the first side surface or the third side surface.

8. The ultra-thin voltage regulator module of claim 6, wherein the signal electrical connector comprises an analog signal electrical connector, and the first power electrical connector or the second power electrical connector is disposed at a position inside the magnetic core adjacent to the analog signal electrical connector.

9. The ultra-thin voltage regulator module of claim 1, further comprising a bottom assembly, the bottom assembly being arranged at a bottom of the inductor assembly and electrically connected to the inductor assembly, and the bottom assembly being used for wiring when the ultra-thin voltage regulator module is electrically connected to an external load.

10. The ultra-thin voltage regulator module of claim 9, wherein the bottom assembly comprises a bottom plate, a bottom capacitor and a bottom metal column, the bottom capacitor and the bottom metal column are arranged on the bottom plate, a spacing area used for containing a bottom capacitor is arranged between a top surface of the bottom plate and a bottom surface of the inductor assembly, and two ends of the bottom metal column are electrically connected with the bottom plate and the inductor assembly respectively.

11. The ultra-thin voltage regulator module of claim 10, an interval area is filled with a plastic package material.

12. The ultra-thin voltage regulator module of claim 9, wherein the bottom assembly comprises a bottom plate and a bottom capacitor arranged on a bottom plate, a spacing area used for containing a bottom capacitor is arranged between a top face of the bottom plate and a bottom surface of the inductor assembly, and a lower end of the inductor winding and a lower end of the power electrical connector assembly protrude downwards to a bottom surface of the inductor assembly and extend to the bottom plate.

13. The ultra-thin voltage regulator module of claim 9, wherein the inductor assembly is provided with a first side surface and a third side surface which are opposite to each other, and the bottom assembly comprises a bottom plate and a bottom capacitor arranged on the bottom plate;

wherein the bottom of the inductor assembly is provided with a step protruding part at the side edge of the third side surface, a signal electrical connector is arranged on the third side surface, the top end and the bottom end of the signal electrical connector are electrically connected with the top assembly and the bottom plate respectively, and a spacing area used for containing a bottom capacitor is formed between the non-step protruding part at the bottom of the inductor assembly and the bottom plate.

14. The ultra-thin voltage regulator module of claim 1, wherein at least one of the power electrical connection assemblies comprises a first power electrical connector and a second power electrical connector disposed adjacent to each other.

15. The ultra-thin voltage regulator module of claim 14, wherein the magnetic core comprises a first magnetic material area and a second material area, the magnetic conductivity of the second material area is smaller than that of the first magnetic material area, the inductor winding is arranged in the first magnetic material area, and the at least one power electrical connection assembly is arranged in the second material area.

16. The ultra-thin voltage regulator module of claim 1, wherein at least one first power electrical connector and at least one second power electrical connector form a first input power loop, and the first input power loop is arranged around at least a portion of the magnetic core;

at least one first power electrical connector and the at least one second power electrical connector form a second input power loop, and the first power electrical connector and the second power electrical connector forming the second input power loop are disposed adjacent to at least one side of the magnetic core in pairs;

a first power electrical connector in the first input power loop and a first power electrical connector in the second input power loop are connected in parallel;

a second power electrical connector in the first input power loop and a second power electrical connector in the second input power loop are connected in parallel.

17. The ultra-thin voltage regulator module of claim 16, wherein the magnetic core has a first side surface and a third side surface opposite to each other, and the magnetic core further has a second side surface and a fourth side surface which are respectively adjacent to the third side surface;

a second power electrical connector in the first input power loop is disposed on the second side and/or the fourth side;

a first power electrical connector in the first input power loop is disposed on the third side and/or within the magnetic core.

18. The ultra-thin voltage regulator module of claim 17, wherein the shape of the inductor winding is specifically a horizontally detour zigzag shape, and two ends of the inductor winding are exposed out of the first side surface of the magnetic core.

19. The ultra-thin voltage regulator module of claim 16, further comprising a vertical plate and a signal electrical connector arranged in the vertical plate, the vertical plate is arranged on at least one side of the inductor assembly, and a signal shielding layer is arranged on the side, facing the inductor assembly, of the vertical plate;

wherein the signal electrical connector and the first power electrical connector and the second power electrical connector forming the second input power loop are jointly arranged in the vertical plate in an array mode.

20. The ultra-thin voltage regulator module of claim 1, further comprising an intermediate PCB, wherein the inductor assembly is embedded in the intermediate PCB, wherein the inductor assembly is electrically connected to an upper surface and a lower surface of the intermediate PCB by means of a blind hole electrical connector provided in the intermediate PCB, wherein the upper surface of the intermediate PCB is electrically connected to the top assembly.

21. The ultra-thin voltage regulator module of claim 20, the inductor winding is specifically I-shaped;

wherein the cross section of the inductor winding is one of a rectangle, a rounded rectangle, an oval and a runway shape, or the end face of the inductor winding extends into one of a rectangle, a rounded rectangle, an ellipse and a runway shape;

one end face of each inductor winding is electrically connected with a plurality of blind hole electrical connectors arranged in an array.

22. The ultra-thin voltage regulator module of claim 20, wherein at least a part of the first power electrical connector and at least a part of the second power electrical connector are arranged in a through hole of the intermediate PCB, and the first power electrical connector and the second power electrical connector are alternately arranged in an array.

23. The ultra-thin voltage regulator module of claim 20, a signal electrical connection through hole is used for signal electrical connection is further formed in the intermediate PCB.

24. The ultra-thin voltage regulator module of claim 20, wherein the magnetic core is formed by laminating a sheet-shaped magnetic material or a strip-shaped magnetic material.

25. The ultra-thin voltage regulator module of claim 24, wherein the sheet-shaped magnetic material or the strip-shaped magnetic material is a material with high magnetic permeability and high saturation magnetic flux density, the magnetic core is provided with an air gap, and the air gap is arranged at a position avoiding the power electrical connection assembly.

26. The ultra-thin voltage regulator module of claim 1, further comprising a cylindrical auxiliary winding, wherein the number of the cylindrical auxiliary windings corresponds to the inductor winding, and each cylindrical auxiliary winding is arranged adjacent to the corresponding inductor winding;

wherein the auxiliary winding is connected in series through a auxiliary winding electrical connector to form a trans-inductor voltage regulator loop.

27. The ultra-thin voltage regulator module of claim 26, a third material area is arranged between the cylindrical auxiliary winding and the corresponding inductor winding;

wherein the third material region is an insulating non-magnetic conductive material, or the third material region is a material that is insulated and has a magnetic permeability of less than 10.

28. The ultra-thin voltage regulator module of claim 1, wherein the top assembly further comprises a top capacitor, and at least a part of the top capacitor is arranged around the integrated power module unit.

29. The ultra-thin voltage regulator module of claim 28, wherein the top assembly further comprises a plastic package body, and the plastic package body covers the integrated power module unit, the top capacitor and the upper surface of the top plate.

30. An inductor assembly, comprising a magnetic core, an inductor winding and at least one power electrical connection assembly, wherein the inductor assembly is a 2N-phase ultra-thin inductor, and N is a positive integer;

wherein the number of the inductor windings is at least the number of phases of the inductor assembly; the shape of the inductor winding is specifically an I-shaped or horizontal detour n shape;

wherein the power electrical connection assembly comprises a first power electrical connector and a second power electrical connector, and the ends of the first power electrical connector and the second power electrical connector are electrically connected with some other assemblies respectively;

wherein the at least one power electrical connector is embedded in the magnetic core, and/or the at least one power electrical connector is embedded partially in the magnetic core on a lateral surface; wherein the power electrical connector is configured for transferring power across the inductor assembly.

31. The inductor assembly of claim 30, wherein the inductor assembly has a first side surface and a third side surface opposite to each other, the third side surface is provided with a signal electrical connector, a distance between the inductor winding and the first side surface is less than a distance between the inductor winding and the third side surface, and ends of the signal electrical connector is electrically connected to some other components.

32. The inductor assembly of claim 31, wherein the inductor assembly is in a mirror symmetry shape, one symmetrical surface of the inductor assembly is a first symmetric surface, the inductor assembly is provided with a first side surface and a third side surface which are parallel to the first symmetric surface, signal electrical connectors are arranged on the first side surface and the third side surface, and the distance between the inductor winding and the first symmetric surface is smaller than the distance between the inductor winding and the first side surface or the third side surface.

33. The inductor assembly of claim 30, wherein the magnetic core comprises a first magnetic material area and a second material area, the magnetic conductivity of the second material area is smaller than that of the first magnetic material area, the inductor winding is arranged in the first magnetic material area, and the at least one power electrical connection assembly is arranged in the second material area.

34. The inductor assembly of claim 30, wherein the magnetic core is formed by laminating a sheet-shaped magnetic material or a strip-shaped magnetic material; the sheet-shaped magnetic material or the strip-shaped magnetic material is a material with high magnetic permeability and high saturation magnetic flux density, the magnetic core is provided with an air gap, and the air gap is arranged at a position avoiding the power electrical connection assembly.

35. The inductor assembly of claim 30, further comprising a cylindrical auxiliary winding, wherein the number of the cylindrical auxiliary windings corresponds to the inductor winding, and each cylindrical auxiliary winding is arranged adjacent to the corresponding inductor winding;

wherein the auxiliary winding is connected in series through a auxiliary winding electrical connector to form a trans-inductor voltage regulator loop;

wherein a third material area is arranged between the cylindrical auxiliary winding and the corresponding inductor winding;

wherein the third material region is an insulating non-magnetic conductive material, or the third material region is a material that is insulated and has a magnetic permeability of less than 10.

36. The inductor assembly of claim 30, wherein the inductor assembly is embedded in an intermediate PCB; The inductor assembly is electrically connected to an upper surface and a lower surface of the intermediate PCB by means of a blind hole electrical connector provided in the intermediate PCB;

wherein one end face of each inductor winding is electrically connected with a plurality of blind hole electrical connectors arranged in an array;

wherein at least a part of the first power electrical connector and at least a part of the second power electrical connector are arranged in a through hole of the intermediate PCB, and the first power electrical connector and the second power electrical connector are alternately arranged in an array.

* * * * *